(12) United States Patent
Haynes et al.

(10) Patent No.: US 11,262,087 B2
(45) Date of Patent: Mar. 1, 2022

(54) EVAPORATIVE COOLER

(71) Applicant: Seeley International Pty Ltd, Lonsdale (AU)

(72) Inventors: Daniel Robert Haynes, Park Holme (AU); Finn Gascoigne Woodhouse, Hawthorndene (AU); Ian Howard Pendergrast, Woodcroft (AU); Lorinda Yvonne Abeyarathna, Black Forest (AU); Robert William Gilbert, Willunga (AU); Shane Antony Harris, Glenelg South (AU); Shoji Sinclair, Seacliff (AU)

(73) Assignee: Seeley International Pty Ltd, Lonsdale (AU)

(*) Notice: Subject to any disclaimer, the term of this patent is extended or adjusted under 35 U.S.C. 154(b) by 234 days.

(21) Appl. No.: 16/285,743

(22) Filed: Feb. 26, 2019

(65) Prior Publication Data
US 2019/0186764 A1 Jun. 20, 2019

Related U.S. Application Data

(63) Continuation-in-part of application No. 16/119,099, filed on Aug. 31, 2018, now Pat. No. 10,859,278.
(Continued)

(51) Int. Cl.
*F24F 6/04* (2006.01)
*F24F 5/00* (2006.01)
*F24F 6/00* (2006.01)

(52) U.S. Cl.
CPC .............. *F24F 6/04* (2013.01); *F24F 5/0035* (2013.01); *F24F 2006/008* (2013.01);
(Continued)

(58) Field of Classification Search
CPC ...... F24F 5/0035; F24F 6/04; F24F 2006/008; F24F 2006/046; F24F 2221/16; F24F 2221/52
(Continued)

(56) References Cited

U.S. PATENT DOCUMENTS 2,281,799 A 5/1942 Quave
2,856,166 A 10/1958 Goettl
(Continued)

FOREIGN PATENT DOCUMENTS

CN 203605437 U 5/2014
GB 2101729 A 1/1983
(Continued)

OTHER PUBLICATIONS

International Search Report (PCT/ISA/210), dated May 18, 2020, issued by Australian Patent Office for PCT/AU2020/050169 (8 pages).
(Continued)

*Primary Examiner* — Charles S Bushey
(74) *Attorney, Agent, or Firm* — Katherine Koenig; Koenig IP Works, PLLC

(57) ABSTRACT

An evaporative cooler having a pressurized water distribution system that provides even water distribution to evaporative media pads within the evaporative cooler, even when the evaporative pads are canted and/or are not in perfect alignment. In one embodiment, the evaporative cooler includes a weatherproof sealing assembly that is transitionable between an open position and a closed position. In one embodiment, the evaporative cooler includes a reservoir having a plurality of ribs on a bottom surface to facilitate seating the evaporative cooler on a roof during installation. A method of installing an evaporative cooler including
(Continued)

mounting at least a portion of the evaporative cooler to a dropper before securing the dropper to the roof.

5 Claims, 31 Drawing Sheets

Related U.S. Application Data

(60) Provisional application No. 62/552,805, filed on Aug. 31, 2017.

(52) U.S. Cl.
CPC ..... *F24F 2006/046* (2013.01); *F24F 2221/16* (2013.01); *F24F 2221/52* (2013.01)

(58) Field of Classification Search
USPC ............... 261/30, 106, 107, DIG. 3, DIG. 43
See application file for complete search history.

(56) References Cited

U.S. PATENT DOCUMENTS

| | | | | |
|---|---|---|---|---|
| 3,283,478 A | * | 11/1966 | Katzman et al. | F24F 6/06 96/284 |
| 3,687,424 A | * | 8/1972 | Katzman | F24F 6/04 261/72.1 |
| 3,738,621 A | | 6/1973 | Anderson | |
| 4,338,264 A | | 7/1982 | Seeley | |
| 4,351,781 A | | 9/1982 | Blatter | |
| 4,460,520 A | | 7/1984 | Wrightson | |
| 4,602,487 A | | 7/1986 | Seeley | |
| 4,658,600 A | * | 4/1987 | Kelley | F24F 6/04 165/60 |
| 5,399,299 A | * | 3/1995 | Stengel | F24F 6/04 261/104 |
| 5,715,698 A | * | 2/1998 | Calton | F24F 5/0007 62/309 |
| 5,971,370 A | | 10/1999 | Galabinski | |
| 6,131,889 A | * | 10/2000 | Birdsell | F24F 6/04 261/106 |
| 6,134,909 A | | 10/2000 | Lyu | |
| 6,332,332 B1 | | 12/2001 | O'Brien | |
| 6,338,461 B1 | * | 1/2002 | Wallace | F24F 13/32 248/237 |
| 6,361,006 B1 | * | 3/2002 | Wallace | F16B 5/0614 248/230.7 |
| 6,450,485 B1 | | 9/2002 | Harrison et al. | |
| 6,487,870 B2 | * | 12/2002 | Paxton | F24F 7/025 62/259.1 |
| 6,669,119 B1 | | 12/2003 | Harrison et al. | |
| 6,945,519 B2 | * | 9/2005 | Parker | F24F 6/043 261/26 |
| 7,232,076 B2 | | 6/2007 | Harrison et al. | |
| 7,992,406 B1 | * | 8/2011 | Reece | F28D 5/00 62/314 |
| 10,859,278 B2 | * | 12/2020 | Haynes | F24F 6/04 |
| 2006/0070390 A1 | | 4/2006 | Reinders | |
| 2006/0191278 A1 | * | 8/2006 | Cooke | F24F 5/0035 62/259.4 |
| 2016/0116194 A1 | | 4/2016 | Townsend | |
| 2019/0186764 A1 | | 6/2019 | Haynes et al. | |

FOREIGN PATENT DOCUMENTS

| | | |
|---|---|---|
| WO | 9840678 A1 | 9/1998 |
| ZA | 200102528 B | 11/2001 |

OTHER PUBLICATIONS

Written Opinion of the International Searching Authority (ISA/AU) for corresponding Application No. PCT/IB2018/056681, dated Nov. 5, 2018, consisting of 4 pages.

Extended European Search Report for corresponding Application No. EP 18849501.4 dated May 4, 2021, consisting of 9 pages.

\* cited by examiner

EVAPORATIVE COOLER

CROSS-REFERENCE TO RELATED APPLICATIONS

This Application is a continuation-in-part of and claims priority to U.S. patent application Ser. No. 16/119,099, filed Aug. 31, 2018, entitled EVAPORATIVE COOLER WITH PRESSURIZED WATER DISTRIBUTION SYSTEM, which is related to and claims priority to U.S. Provisional Patent Application Ser. No. 62/552,805, filed Aug. 31, 2017, entitled EVAPORATIVE COOLER WITH PRESSURIZED WATER DISTRIBUTION SYSTEM, the entirety of both of which is incorporated herein by reference.

STATEMENT REGARDING FEDERALLY SPONSORED RESEARCH OR DEVELOPMENT

N/A

TECHNICAL FIELD

This disclosure relates to an evaporative cooler having a pressurized water distribution system. This disclosure also relates to modifications for an evaporative cooler that are compatible with a pressurized water distribution system, including canted evaporative media pads, angled louvers for an evaporative media retention frame, a single-piece ventilated lid for the evaporative cooler that allows for vertical air intake, and dropper that facilitates installation of the evaporative cooler.

BACKGROUND

Evaporative coolers reduce the temperature of air through direct evaporative cooling. To achieve cooling, air is drawn through the sides of the housing of the evaporative cooler and over one or more wet evaporative media pads, thereby evaporating water within the evaporative media pads and reducing the temperature of the passing air.

In order to wet the evaporative media pads, evaporative coolers also include a water distribution system. Typically, water from a reservoir at the bottom of the evaporative cooler is drawn to the top of the evaporative cooler by a pump, from where the water is distributed by gravity through a limited number of distribution holes downward and into the evaporative media pads. Water that exits the evaporative media pads is collected within the reservoir and recirculated through the system by the pump. As the water is distributed by gravity, the evaporative media pads must be carefully installed, making sure the evaporative media pads are absolutely vertically aligned (at an angle of 0° from vertical) and horizontally aligned with each other. Any variation in height or angle of installation will reduce the efficiency of the evaporative cooler and risk water carryover into air streams within and from the evaporative cooler.

FIG. 1 shows a currently known evaporative cooler 10 in more detail. The currently known evaporative cooler 10 generally includes a housing 12 with a plurality of sides 14 (for example, four sides 14), a lid 16, and a reservoir 18, a retaining frame 20, at least one evaporative media pad 22 within the retaining frame 20, and a gravity distribution element 24 of a water distribution system that is located beneath the lid 16 and above the evaporative media pad(s) 22. The gravity distribution element 24 includes a water channel 26 in fluid communication with one or more outlets 28 from where the water is released to flow downward onto the evaporative media pad(s) 22. The water channel 26 is typically slanted downward to enhance distribution of the water by gravity. In most currently known evaporative coolers 10, water is gravity fed to the water channel 26 through only four distribution points. As discussed above, the retaining frame 20 is configured to retain the evaporative media pad(s) 22 in a vertical position (that is, in a position that is parallel to, or at an angle of 0°) relative to the direction of gravitational flow of water from the gravity distribution element 24. Any variation of this configuration may adversely affect the efficiency of the currently known evaporative cooler 10. Further, the retaining frame 20 is affixed to or integrated with the inner surfaces of the sides 14 of the housing 12, thereby positing the evaporative media pad(s) 22 immediately adjacent to the sides 14 of the housing 12.

Currently known evaporative coolers 10 also include a header block 30 immediately above, and typically in contact with, the evaporative media pad(s) 22 and the gravity distribution element 24 typically extends a distance to the header block 30 (for example, about 20 mm). The header block 30 is used to prevent air bypass and diffuse water that clumps together as falls or flows between the gravity distribution element 24 and the header block 30. The gravity distribution element 24 has a height of between approximately 124 mm and approximately 144 mm and the header block 30 has a height of approximately 30 mm. Thus, the total height required in currently known evaporative coolers 10 to supply water to the evaporative media pad(s) 22 is up to approximately 174 mm, which can affect the aesthetics of the design and/or limit the locations in which the evaporative cooler may be used.

Additionally, as noted above, the evaporative media pad(s) 22 in currently known evaporative coolers 10 are mounted or positioned immediately adjacent to the inner surfaces of the sides 14 of the housing 12, due to the configuration of the retaining frame 20. Not only does this configuration reduce airflow through and around the evaporative media pad(s) 22, but it also complicates manufacture and assembly of the housing. As a further result of this configuration, the evaporative media pad(s) 22 do not extend below the sides 14 of the housing 12 down into the reservoir 18, where the evaporative media pad(s) 22 would be in contact with the water within the reservoir 18. Even if a portion of the evaporative media pad(s) 22 did extend below the sides 14 of the housing 12, the lack of airflow holes in the reservoir 18 of the housing 12 means that such a portion of the evaporative media pad 22 would not be exposed to airflow, since the evaporative media pad(s) 22 are attached directly to the housing 12. Thus, this gap 34 between the bottom of the evaporative media pad(s) 22 and the bottom of the reservoir 18 represents wasted space that produces no cooling effect. FIG. 22 shows the gap 34 between a mounted evaporative media pad 22 and the bottom of the reservoir 18 in a currently known evaporative cooler 10.

Further, as shown in FIGS. 29 and 30, currently known evaporative coolers 10 are mounted a distance from the roof 36 or surface of the building or structure, exposing the roof jack, ductwork, and/or dropper 38. Such mounting is required for currently known evaporative coolers 10, as the evaporative media pad(s) 22 must be in a vertical position relative to the direction of gravitational flow of water from the gravity distribution element 24. To achieve even distribution of water onto the evaporative media pad(s) 22, the currently known evaporative cooler 10 must be mounted such that the lid 16 is horizontal. Although some currently known evaporative coolers 10 include an angled reservoir 18 that comes closer to matching the contour of the roof 36, they still have an angular/boxy appearance and exposed ductwork and/or dropper 38 and are only suited to accommodate a single roof angle. Additionally, electrical and plumbing conduits 40 to the currently known evaporative coolers 10 run on the outside of the roof 36, which is unattractive and exposes the conduits 40 to weather and damage.

SUMMARY

Some embodiments advantageously provide an evaporative cooler having a pressurized water distribution system that provides even water distribution to evaporative media pads within the evaporative cooler, even when the evaporative pads are canted and/or are not in perfect alignment; an evaporative cooler having a weatherproof sealing assembly that is transitionable between an open position and a closed position; an evaporative cooler having one or more features that facilitate installation of the evaporative cooler onto a roof of a building; and/or a method of installing the evaporative cooler to the roof of the building. In one embodiment, a pressurized water distribution system for an evaporative cooler comprises: a pressurized flow path portion including at least one pressurized water channel, a plurality of outlet holes, and at least one inlet hole; a plurality of caps, each of the plurality of caps being configured to direct a flow of fluid from a corresponding one of the plurality of outlet holes; and a non-pressurized flow path portion including at least one non-pressurized flow path in fluid communication with at least one of the plurality of outlet holes.

In one aspect of the embodiment, the pressurized water distribution system further comprises a water distribution system lid, the water distribution system lid at least partially defining the at least one pressurized water channel, the plurality of outlet holes, and the at least one inlet hole.

In one aspect of the embodiment, each of the plurality of caps is rotatably couplable to the water distribution system lid.

In one aspect of the embodiment, each of the plurality of caps includes a first hooked portion and a second hooked portion and the water distribution system lid includes a first post and a second post proximate each of the plurality of outlet holes, the first and second hooked portions being releasably engageable with the first and second posts. In one aspect of the embodiment, the first and second hooked portions are radially opposed to each other and the first and second posts are radially opposed to each other.

In one aspect of the embodiment, the at least one pressurized water channel includes a plurality of pressurized water channels, each of the plurality of pressurized water channels being in fluid communication with a corresponding one of the plurality of outlet holes, the water distribution system lid defining a plurality of non-pressurized gravity distribution water channels. In one aspect of the embodiment, each of the plurality of caps is configured to direct a flow of fluid from a corresponding one of the plurality of outlet holes into at least one of the plurality of non-pressurized gravity distribution water channels.

In one embodiment, a weatherproof sealing assembly for an evaporative cooler system comprises: at least one flap assembly, each of the at least one flap assembly being transitionable between a closed position, a first open position, and a second open position.

In one aspect of the embodiment, the at least one flap assembly is in the first open position when a flow of air therethrough is in a first direction and the at least one flap assembly is in the second open position when the flow of air therethrough is in a second direction opposite the first direction.

In one aspect of the embodiment, each of the at least one flap assembly includes: an axis of rotation; a frame portion; and a flap rotatably coupled to the fame portion, the frame portion and the flap being independently rotatable relative to each other and transitionable between the closed position, the first open position, and the second open position.

In one aspect of the embodiment, the at least one flap assembly includes a first flap assembly and a second flap assembly, the first flap assembly comprising a first frame portion, a first flap, and a first axis of rotation, and the second flap assembly comprising a second frame portion, a second flap, and a second axis of rotation. In one aspect of the embodiment: when the weatherproof sealing assembly is in the closed position, the first flap assembly and the second flap assembly are at least substantially coplanar; when the weatherproof sealing assembly is in the first open position, the first flap assembly and the second flap assembly are not coplanar, the first flap assembly being rotated about the first axis of rotation to open in a first direction relative to a plane in which the weatherproof sealing assembly lies when the weatherproof sealing assembly is in the closed position and the second flap assembly being rotated about the second axis of rotation to open in the first direction relative to the plane in which the weatherproof sealing assembly lies when the weatherproof sealing assembly is in the closed position; and when the weatherproof sealing assembly is in the second open position, the first frame portion and the second frame portion are at least substantially coplanar, the first flap being rotated to open toward a second direction opposite the first direction relative to the plane in which the weatherproof sealing assembly lies when the weatherproof sealing assembly is in the closed position, and the second flap being rotated to open toward the second direction relative to the plane in which the weatherproof sealing assembly lies when the weatherproof sealing assembly is in the closed position.

In one aspect of the embodiment, the first flap assembly further includes a first longitudinal axis and the second flap assembly further includes a second longitudinal axis, the first axis of rotation and the second axis of rotation being at least substantially parallel to each other and to the first longitudinal axis and to the second longitudinal axis.

In one aspect of the embodiment, the first flap at least partially defines a first edge of the first flap assembly and the second flap at least partially defines a first edge of the second flap assembly, the first edge of the first flap assembly being immediately adjacent the first edge of the second flap assembly when the weatherproof sealing assembly is in the closed position.

In one embodiment, a method of installing a cooling system on a roof of a building comprises: coupling a reservoir of the cooling system to a dropper; and then inserting the dropper into an installation aperture in the roof such that a bottom surface of the reservoir is in contact with an exterior surface of the roof.

In one aspect of the embodiment, the method further comprises securing at least a portion of the dropper to a structure of the roof. In one aspect of the embodiment, the method further comprises assembling the cooling system while the reservoir is coupled to the dropper and the dropper is secured to the structure of the roof.

In one embodiment, a reservoir for an evaporative cooler comprises: a bottom surface, the bottom surface including a dropper aperture and a plurality of ribs extending from the bottom surface at at least one location proximate the dropper aperture, each of the plurality of ribs having a free edge that is a distance from the bottom surface.

In one aspect of the embodiment, the plurality of ribs includes: a first plurality of ribs on opposite sides of the dropper aperture and extending in a first direction; and a second plurality of ribs on opposite sides of the dropper aperture and extending in a second direction that is different than the first direction.

In one embodiment, an evaporative cooler comprises: a housing including a top surface and at least one side surface; and a lid, the lid defining the top surface and the at least one side surface, the lid including a plurality of airflow apertures on the top surface.

In one aspect of the embodiment, the plurality of airflow apertures are arranged in a density of approximately 10 to approximately 15 airflow inlets per 6 in$^2$.

In one aspect of the embodiment, the housing further includes a reservoir, the lid being hingedly connected to the reservoir.

In one embodiment, an evaporative cooler mounted to a roof of a building comprises: a first surface having a first height; a second surface having a second height; a third surface extending between the first surface and the second surface, the third surface being at least substantially parallel to the roof, the third surface having a first width; and a fourth surface opposite the third surface and extending between the first surface and the second surface, the fourth surface having a second width that is different than the first width, the roof lying in a plane, the third surface being positioned a predetermined distance from the roof, the first surface being oriented at a first angle from the plane in which the roof lies and the second surface being oriented at a second angle from the plane in which the roof lies, the first angle and the second angle being different.

In one aspect of the embodiment, the first height is approximately 815 mm, the second height is approximately 475 mm, and the first width is approximately 1500 mm.

In one aspect of the embodiment, the first angle is approximately 60° and the second angle is approximately 102°.

In one aspect of the embodiment, the predetermined distance is between approximately 0 mm and approximately 50 mm. In one aspect of the embodiment, the predetermined distance is between approximately 5 mm and approximately 10 mm.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
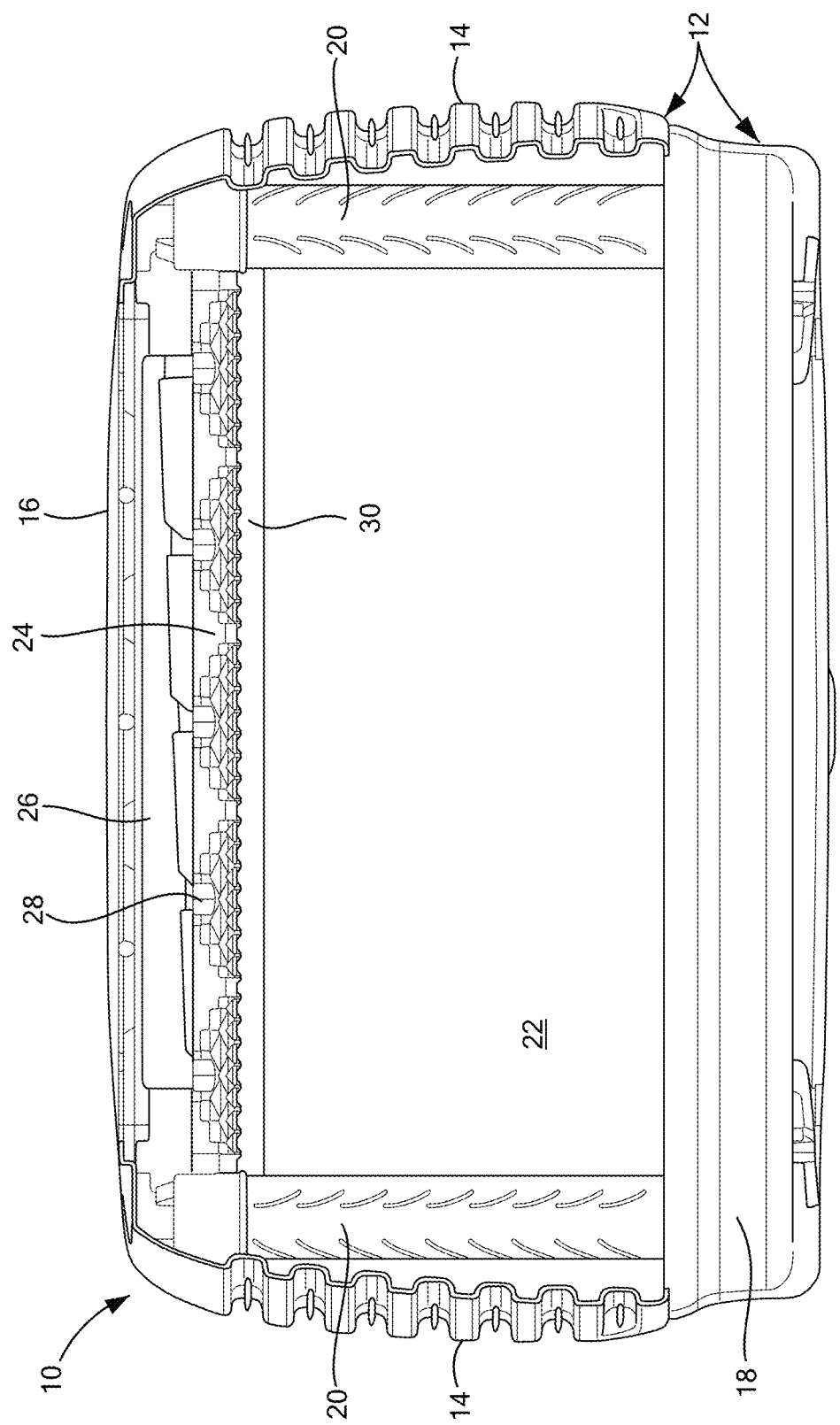
FIG. 1 shows a cross-sectional view of an evaporative cooler of the prior art.
Figure 2:
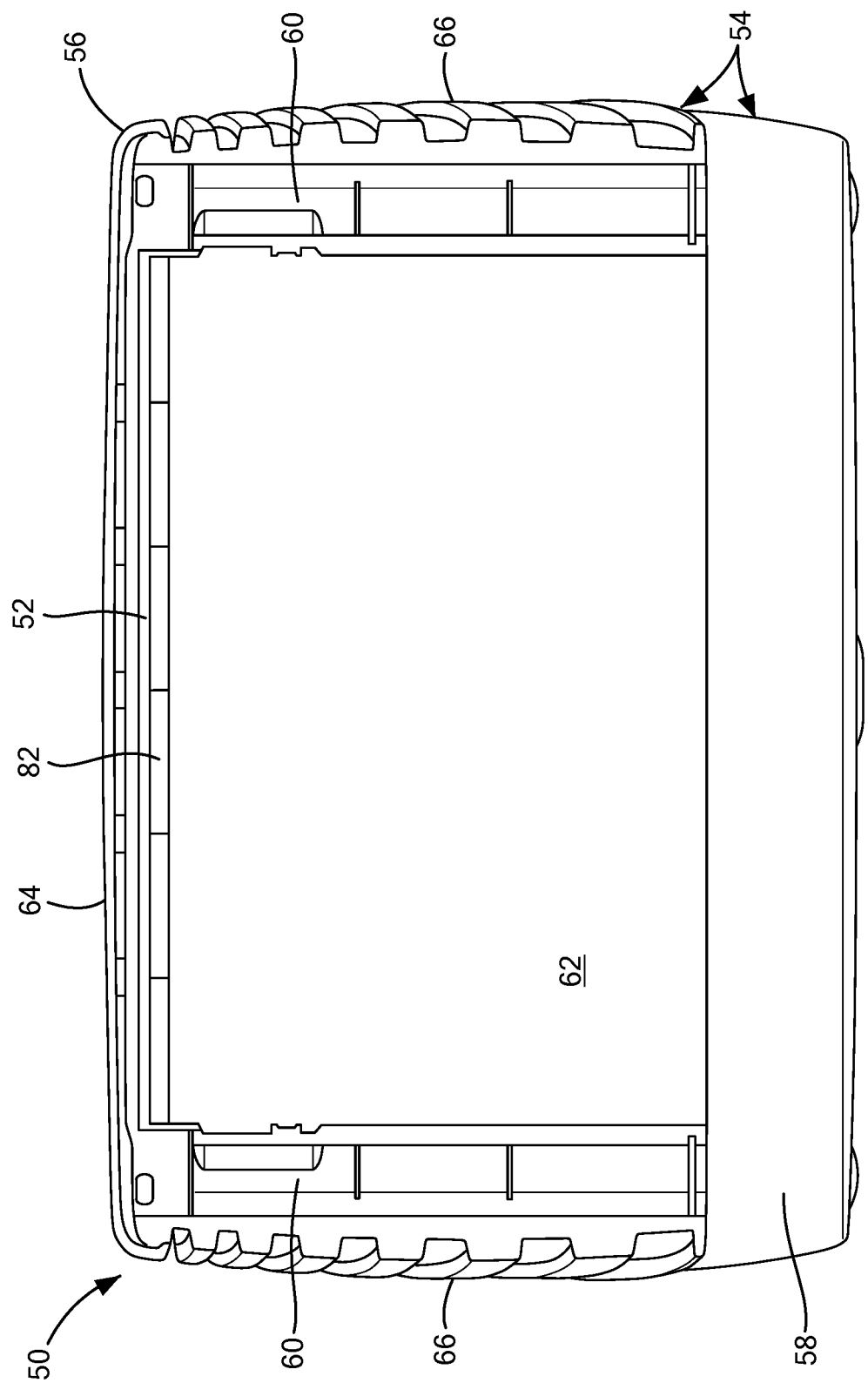
FIG. 2 shows a cross-sectional view of a first embodiment of an evaporative cooler having a pressurized water distribution system in accordance with the present disclosure.

The system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring to FIGS. 2-18, a first embodiment and a second embodiment of an evaporative cooler of the present disclosure are shown. Unlike currently known evaporative coolers, the evaporative coolers shown in FIGS. 2-18 each include a pressurized water distribution system, which is discussed in greater detail below. Although the evaporative coolers disclosed herein are described as being used with water, it will be understood that other evaporative fluids may be used in addition to or instead of water. In one embodiment, the pressurized water distribution system includes a distribution assembly (that distributes water through a combination of pressure and gravity) that has a height of approximately 65 mm (±20 mm). The evaporative coolers disclosed here do not include a header block or a gap between the distribution assembly and the evaporative media pad(s). Thus, the total height required to supply water to the evaporative media pad(s) is the same as the total height of the distribution assembly, or, in one embodiment, approximately 65 mm. By not only reducing the height of the distribution component over currently known water distribution systems, but also eliminating the 30-mm header block, the total height of the evaporative cooler may be reduced by approximately 109 mm. Alternatively, the total height of the evaporative cooler may be maintained, but larger evaporative media pad(s) may be used, thereby increasing the active cooling area and cooling capacity. In one embodiment, the active cooling area of the evaporative media pad(s) may be increased by as much as 24% when a pressurized water distribution system as described herein is used. Additionally, as is discussed in greater detail below, use of a pressurized water distribution system also reduces or eliminates the need for precise vertical positioning of the evaporative media pad(s), which may reduce time and complexity of installing, repairing, and/or replacing of the evaporative cooler. In fact, in some embodiments, an evaporative cooler including the pressurized water distribution system described herein may be installed at angles of up to between 5° and 45° from horizontal.

Referring now to FIGS. 2-8, the first embodiment of the evaporative cooler 50 including a pressurized water distribution system 52 is shown. In addition to the pressurized water distribution system 52, the evaporative cooler 50 generally includes a housing 54 with a housing lid 56 and a reservoir 58, and a retaining frame 60 configured to retain at least one evaporative media pad 62. The housing lid 56 may define at least a top surface 64 of the evaporative cooler 50, and may optionally further define at least one side surface 66 of the evaporative cooler 50. In one embodiment, the housing lid 56 is a unitary structure composed of a single piece of material and defines a top surface 64 and four side surfaces 66 of the evaporative cooler 50, and is coupled to, and, optionally, in contact with, the reservoir 58 when the evaporative cooler 50 is assembled. Although not shown in FIGS. 2-8, the first embodiment of the evaporative cooler 50 may further include additional components, such one or more sensors, electronic controls, float valves, filters, a fan and fan motor, belts, pulleys, an auxiliary pump for draining the reservoir, ductwork, roof jacks, and/or other system components.

Figure 3:
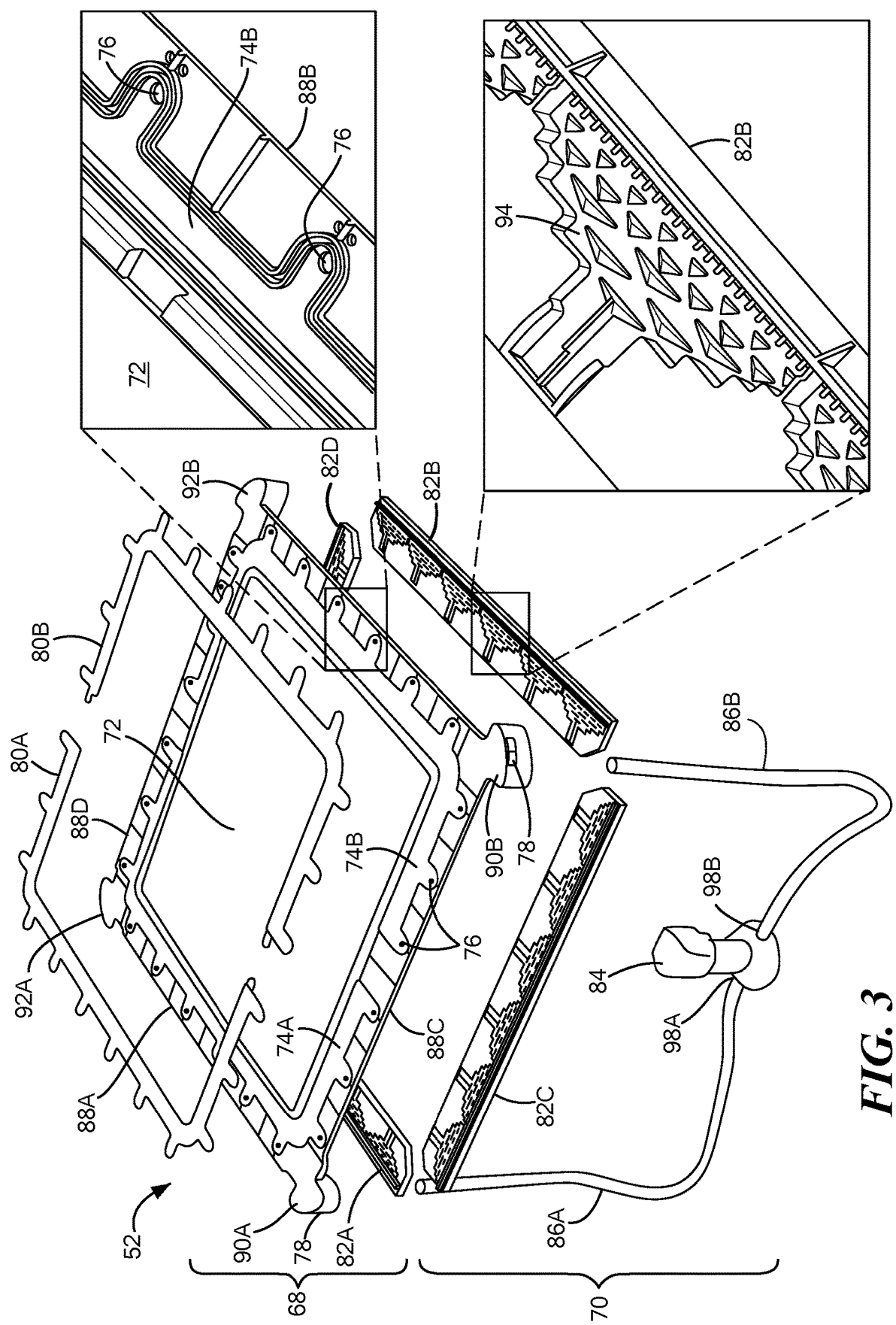
FIG. 3 shows an exploded view of the pressurized water distribution system of the evaporative cooler of FIG. 2 in accordance with the present disclosure.

Referring to FIG. 3, an exploded view of the pressurized water distribution system 52 is shown. The pressurized water distribution system 52 generally includes a distribution assembly 68 and a supply assembly 70. The distribution assembly 68 includes a pressurized portion and a non-pressurized flow path portion. The distribution assembly 68 includes a water distribution system lid 72 including or defining a pressurized manifold that includes at least one pressurized water channel 74 that is in fluid communication with a plurality of outlet holes 76 and at least one inlet hole 78. The distribution assembly 68 further includes at least one manifold cover 80 configured to enclose the at least one pressurized water channel 74, but not the plurality of outlet holes 76 or the at least one inlet hole 78. Put another way, each manifold cover 80 is configured to enclose a corresponding pressurized water channel 74, with the plurality of outlet holes 76 and the at least one inlet hole 78 remaining unobstructed when the manifold cover 80 is coupled to the water distribution system lid 72. The distribution assembly 68 further includes at least one gravity distribution element 82 defining at least one non-pressurized flow path. As used herein, water conduits through which water flows primarily by gravity are non-pressurized conduits. The supply assembly 70 includes a pump 84 and a plurality of hoses 86. Water pumped into the pressurized manifold through the at least one inlet hole 78 is pressurized by the pump 84 and the enclosed pressurized water supply manifold. As discussed in greater detail below, water is delivered to the evaporative media pad(s) by a combination of momentum created by the pump and enclosed pressurized water supply manifold, and gravity.

Figure 5:
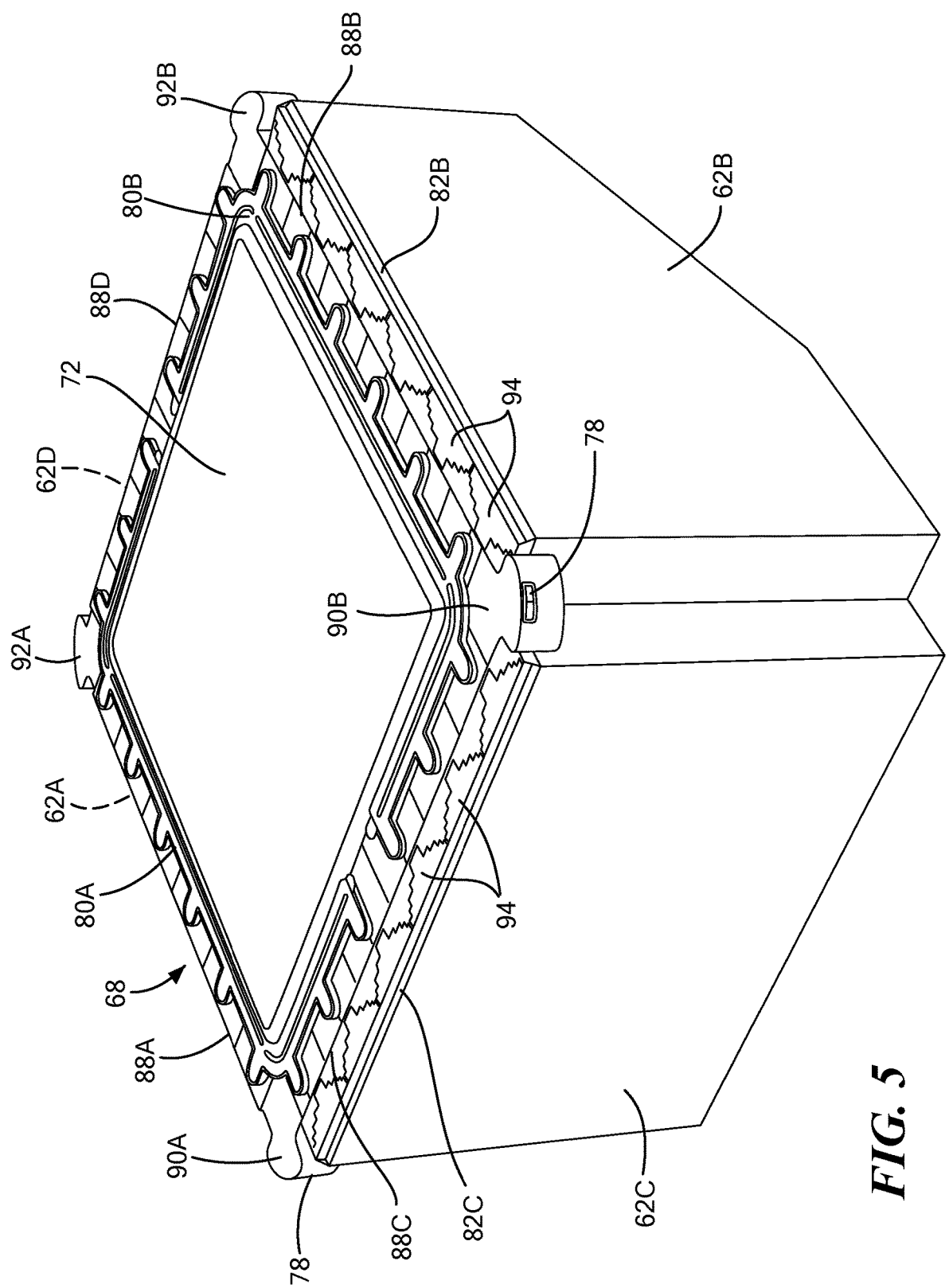
FIG. 5 shows a top perspective view of the pressurized water distribution system and evaporative media pads of the evaporative cooler of FIG. 2 in accordance with the present disclosure.
Figure 6:
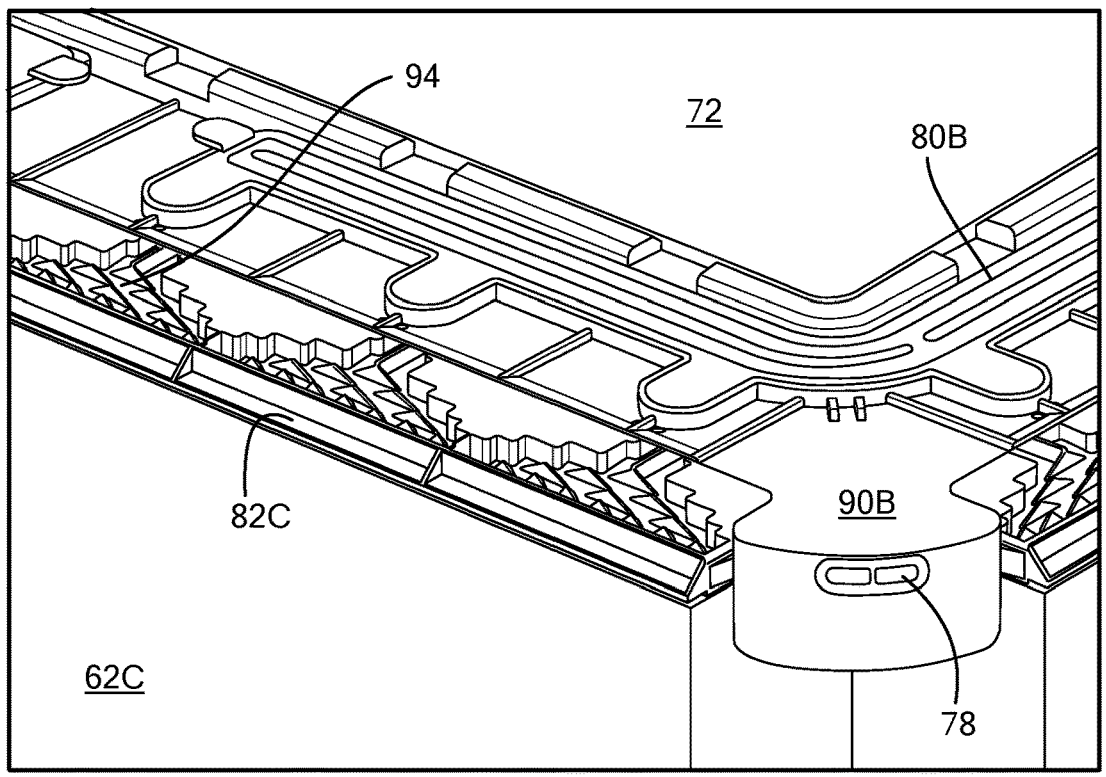
FIG. 6 shows a close-up view of a portion of the pressurized water distribution system and evaporative media pads of the evaporative cooler of FIG. 2 in accordance with the present disclosure.

The water distribution system lid 72 is sized and configured to be received within the housing 54. In one embodiment, such as that shown in FIG. 3, the water distribution system lid 72 is square or rectangular with a first edge 88A, a second edge 88B opposite the first edge 88A, a third edge 88C between the first 88A and second 88B edges, and a fourth edge 88D opposite the third edge 88C and between the first 88A and second 88B edges. In one embodiment, the water distribution system lid 72 includes a water inlet portion 90 located at at least one corner of the water distribution system lid 72. In one embodiment, the water distribution system lid 72 includes a first water inlet portion 90A at a first corner between the first edge 88A and the third edge 88C, and includes a second water inlet portion 90B at a second corner between the second edge 88B and the third edge 88C. Each of the first 90A and second 90B water inlet portions extends beyond each adjacent edge, such that the first 90A and second 90B water distribution portions are not located above any of the evaporative media pad(s) 62 (for example, as shown in FIGS. 5 and 6). Optionally, to maintain symmetry of the water distribution system lid 72, the water distribution system lid 72 may also include a first protruding portion 92A at a third corner between the first edge 88A and the fourth edge 88D and a second protruding portion 92B at a fourth corner between the second edge 88B and the fourth edge 88D, and the protruding portions 92A, 92B may each have a size and configuration equal to that of the water inlet portions 90A, 90B, except that the protruding portions 92A, 92B do not include at least one inlet hole 78. The water distribution system lid 72 may be composed of a rigid or semi-rigid material, such as high-density polyethylene (HDPE), low-density polyethylene (LDPE), polypropylene (PP), polyvinyl chloride (PVC), or the like.

The plurality of outlet holes 76 and the pressurized water channel(s) 74 are included in or defined by a perimeter portion of the water distribution system lid 72 In one embodiment, the plurality of outlet holes 76 includes six evenly spaced outlet holes 76 proximate each of the first 88A, second 88B, third 88C, and fourth 88D edges (twenty-four total outlet holes 76). However, it will be understood that the water distribution system lid 72 may include any suitable number, configuration, and/or arrangement of outlet holes 76. Further, each outlet hole 76 has a diameter that is large enough to prevent or reduce the likelihood of blockage by sediment or other particulates in the water being circulated through the pressurized water distribution system 52. In one embodiment, each outlet hole 76 has a diameter of approximately 8 mm (±0.5 mm). In another embodiment, each outlet hole has a diameter of between approximately 4 mm and approximately 5 mm (±0.5 mm).

In one embodiment, the at least one pressurized water channel 74 is also included or defined by the perimeter portion of the water distribution system lid 72. In one embodiment, the water distribution system lid 72 includes or defines a first pressurized water channel 74A and a second pressurized water channel 74B, with the first pressurized water channel 74A being in fluid communication with all of the plurality of outlet holes 76 proximate the first edge 88A (for example, six outlet holes 76), a first half of the plurality of outlet holes 76 proximate the third edge 88C (for example, three outlet holes 76), and a first half of the plurality of outlet holes 76 proximate the fourth edge 88D (for example, three outlet holes 76). Similarly, in this configuration, the second pressurized water channel 74B is in fluid communication with all of the plurality of outlet holes 76 proximate the second edge 88B (for example, six outlet holes 76), a second half of the plurality of outlet holes 76 proximate the third edge 88C (for example, three outlet holes 76 proximate the third edge 88C different than the three outlet holes 76 in fluid communication with the first pressurized water channel 74A), and a second half of the plurality of outlet holes 76 proximate the fourth edge 88D (for example, three outlet holes 76 proximate the fourth edge 88D different than the three outlet holes 76 in fluid communication with the first pressurized water channel 74A). The first pressurized water channel 74A is also in fluid communication with the at least one inlet hole 78 in the first water inlet portion 90A and the second pressurized water channel 74B is also in fluid communication with the at least one inlet hole 78 in the second water inlet portion 90B.

Figure 7:
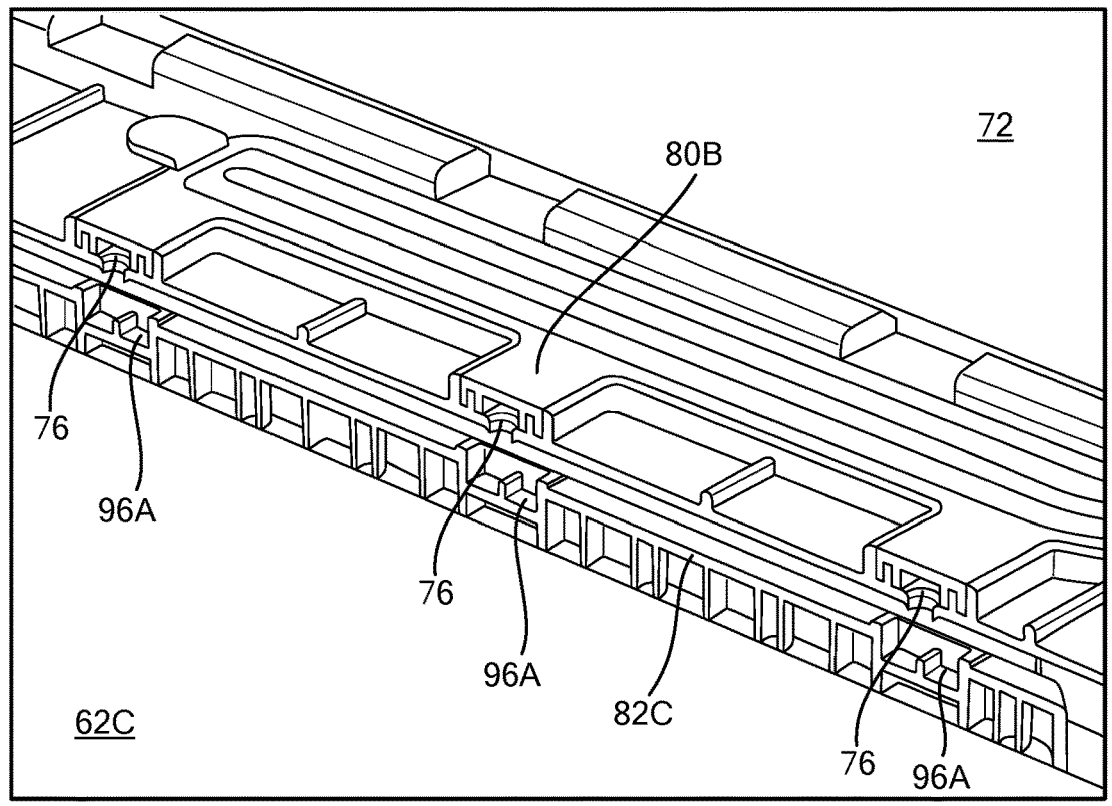
FIG. 7 shows a cross-sectional view of a portion of the pressurized water distribution system and evaporative media pads of the evaporative cooler of FIG. 2 in accordance with the present disclosure.

The distribution assembly 68 of the pressurized water distribution system 52 further includes at least one manifold cover 80 that is sized and configured to enclose the at least one pressurized water channel 74 in the water distribution system lid 72, but not the at least one inlet hole 78 or the plurality of outlet holes 76, such that water may enter the pressurized water channel(s) 74 only through the at least one inlet hole 78 and water may exit the pressurized water channel(s) 74 only through the plurality of outlet holes 76. Put another way, the manifold cover 80 is configured to enclose the portion of the pressurized manifold between the at least one inlet hole 78 and the plurality of outlet holes 76. The manifold cover(s) 80 are composed of a compressible or semi-compressible, resilient material, such as rubber, silicone rubber, foam, neoprene, or the like. Further, the manifold cover(s) 80 are configured to be removably coupled to the water distribution system lid 72, such as by friction fit, clamps, or other suitable methods of attachment, to facilitate removal, repair, replacement, and/or cleaning of the water distribution system lid 72. In one non-limiting example, as is shown in FIG. 7, the manifold cover(s) 80 and the pressurized water channel(s) 74 (or the portion of the water distribution system lid 72 adjacent the pressurized water channel(s) 74) may have a matably engageable tongue-and-groove configuration that allows for a friction fit between the manifold cover(s) 80 and corresponding pressurized water channel(s) 74 and/or water distribution system lid 72. In one embodiment, the distribution assembly 68 includes a first manifold cover 80A that is sized and configured to at least partially enclose the first pressurized water channel 74A and a second manifold cover 80B that is sized and configured to at least partially enclose the second pressurized water channel 74B (for example, as shown in FIG. 3). Alternatively, the manifold cover 80 may be permanently coupled to, integrated with, or defined by the water distribution system lid 72. In one embodiment, the manifold cover 80 may be plastic welded, adhered, or otherwise coupled to the water distribution system lid 72. In another embodiment, the water distribution system lid may be manufactured as a single piece to define the pressurized manifold (for example, the pressurized water channel(s) 74) and the manifold cover 80.

The distribution assembly 68 of the pressurized water distribution system 52 further includes at least one gravity distribution element 82 (which may also be referred to herein as at least one water spreader). The gravity distribution element(s) 82 define at least one non-pressurized flow path and are configured to be in fluid communication with the pressurized water channel(s) 74 and the evaporative media pad(s) 62. Thus, when the evaporative cooler 50 is assembled, the water distribution system lid 72 and gravity distribution element(s) 82 are located between the housing lid 56 and the evaporative media pad(s) 62. The distribution assembly 68 may include an equal number of evaporative media pads 62 and gravity distribution elements 82, such that each gravity distribution element 82 is located directly adjacent to and, in some embodiments, in contact with, a corresponding one of the evaporative media pads 62. Put another way, each evaporative media pad 62 is located directly subjacent a corresponding one of the gravity distribution elements 82, without a header block, when the evaporative cooler 50 is in use. In some embodiments, the water distribution system lid 72 may be located a predetermined distance from the upper edge or top of each of the evaporative media pads 62 when the evaporative cooler 50 is assembled. In one embodiment, the predetermined distance is between approximately 0.2 mm (±0.2 mm) and approximately 2 mm (±0.2 mm). In another embodiment, the predetermined distance is less than at most 2 mm.

In one embodiment, the evaporative cooler 50 includes four evaporative media pads 62 and four gravity distribution elements 82, with each gravity distribution element 82 being directly above and, in some embodiments, in contact with, a corresponding evaporative media pad 62. For example, the distribution assembly 68 may include a first gravity distribution element 82A in fluid communication with the outlet holes 76 proximate the first edge 88A of the water distribution system lid 72, a second gravity distribution element 82B in fluid communication with the outlet holes 76 proximate the second edge 88B of the water distribution system lid 72, a third gravity distribution element 82C in fluid communication with the outlet holes 76 proximate the third edge 88C of the water distribution system lid 72, and a fourth gravity distribution element 82D in fluid communication with the outlet holes 76 proximate the fourth edge 88D of the water distribution system lid 72. In one embodiment, when the evaporative cooler 50 is assembled, the first 82A, second 82B, third 82C, and fourth 82D gravity distribution elements are located directly above a first 62A, second 62B, third 62C, and fourth 62D evaporative media pad, respectively. The retaining frame 60 may be configured to retain the four evaporative media pads 62A-62D such that the evaporative media pads 62 are approximately 90° from each other, forming a box shape. The box shape defines an inner chamber, within which a fan, fan motor, and other system components may be located.

Figure 4:
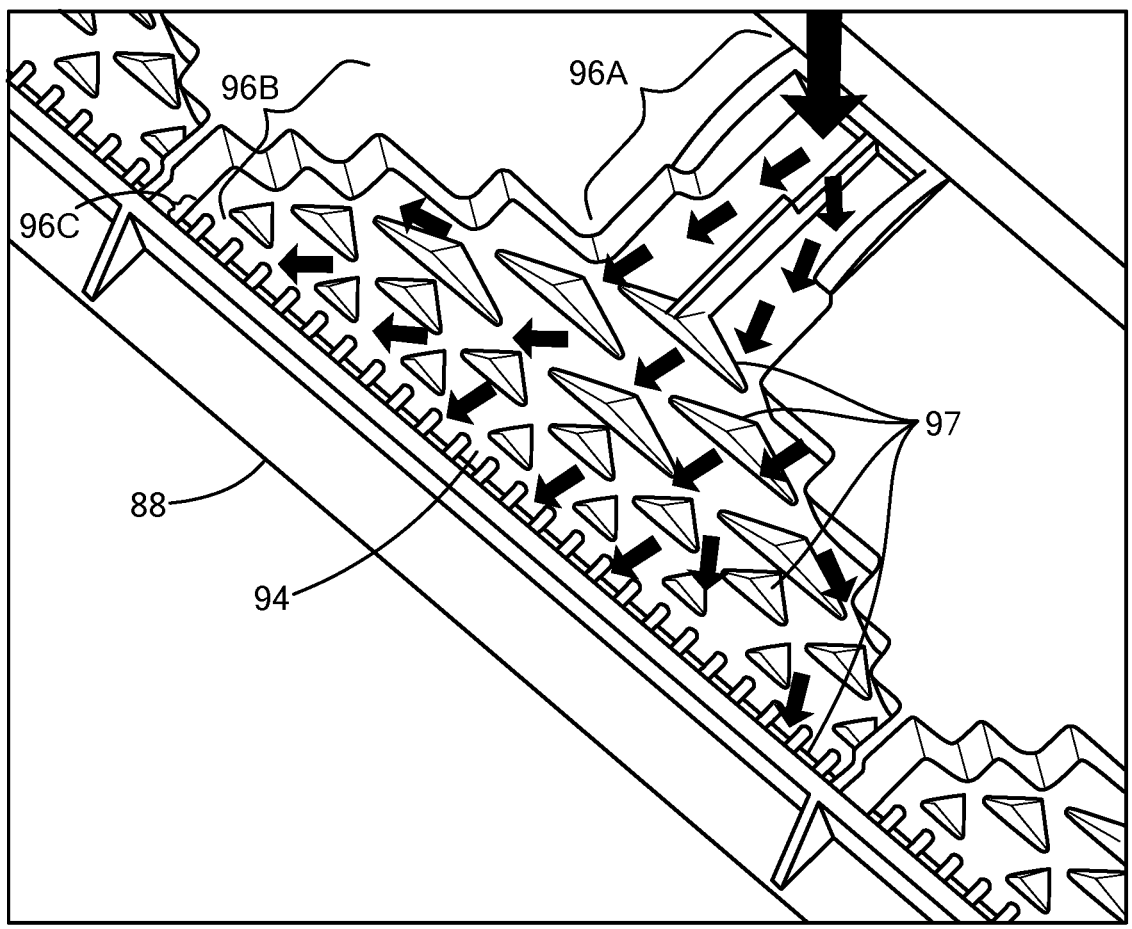
FIG. 4 shows a close-up view of an upper surface of a gravity distribution element of the pressurized water distribution system of the evaporative cooler of FIG. 2 in accordance with the present disclosure.

In one embodiment, each gravity distribution element 82 has an elongate shape that is configured to extend between adjacent water inlet portions 90 and/or protruding portions 92 (for example, as shown in FIG. 5). Further, each gravity distribution element 82 includes an upper surface with a plurality of distribution features 94 that provide an even delivery of water to the evaporative media pad(s) 62 (for example, as shown in FIG. 4). In one embodiment, the water distribution system lid 72 includes six outlet holes 76 proximate each of the first 88A, second 88B, third 88C, and fourth 88D edges, and each of four gravity distribution elements 82A-82D includes six distribution features 94, each distribution feature 94 including an upstream portion 96A, a midstream portion 96B, and a downstream portion 96C. Each gravity distribution element 82 is configured such that at least a portion of the upstream portion 96A is located immediately adjacent to a corresponding outlet hole 76 in the water distribution system lid 72 when the evaporative cooler 50 is assembled (for example, as shown in FIGS. 6 and 7). When the evaporative cooler 50 is in use, at least a portion of the upstream portion 86A is located beneath (directly subjacent to) a corresponding outlet hole 76. At least a portion of the upper surface of each gravity distribution element 82 may extend beyond its corresponding edge 88. Further, each gravity distribution element 82 may be composed of rigid or semi-rigid material, such as high-density polyethylene (HDPE), low-density polyethylene (LDPE), polypropylene (PP), polyvinyl chloride (PVC), acrylonitrile-butadiene-styrene (ABS), acrylonitrile-styrene-acrylate (ASA), cellulose flock, cellulose fiber, or the like.

As shown in FIG. 4, each distribution feature 94 is configured such that an amount of water entering the distribution feature 94 from the corresponding outlet hole 76 is progressively divided into an increasing number of non-pressurized flow paths (or gradually spread over an increasing area) by an increasing number of protrusions or ridges 97 in the distribution feature as the water passes from the upstream portion 96A to the midstream portion 96B and on to the downstream portion 96C. In one embodiment, the flow of water is divided into two non-pressurized flow paths in the upstream portion 96A, and is then is divided into an increasing number of non-pressurized flow paths in the midstream portion 96B and then the downstream portion 96C, until the flow of water is evenly spread along the length of the gravity distribution element 82 (for example, until the flow of water is evenly spread across all six distribution features 94), which may generally correspond to a width of the corresponding evaporative media pad 62. Thus, the evaporative media pad 62 receives an evenly distributed supply of water.

The supply assembly 70 includes a pump 84 that may be located within the housing 54, such as within the reservoir 58. In one embodiment, the supply assembly 70 also includes a first hose 86A and a second hose 86B. A first end of the first hose 86A is coupled to a first pump outlet 98A and a second end of the first hose 86A is coupled to the at least one inlet hole 78 in the first water inlet portion 90A. A first end of the second hose 86B is coupled to a second pump outlet 98B and a second end of the second hose 86B is coupled to the at least one inlet hole 78 in the second water inlet portion 90B. Thus, in one embodiment, the pump 84 is configured to supply water to each of the first 74A and second 74B pressurized water channels.

Unlike currently known water distribution systems, water is effectively pressurized within the enclosed pressurized water channel(s) 74 of the pressurized water distribution systems 52 disclosed herein. The pump 84 and enclosed pressurized water channel(s) 74 provide momentum pressure to the water, with the outlet holes 76 further metering water flow within the pressurized water channel(s) 74 by providing restriction to the water flow. The force created by the pump 84 and pressurization of water within the enclosed pressurized water channel(s) 74, in combination with the restriction of the outlet holes 76, provides the water with a high enough flow rate and/or pressure to ensure even distribution throughout the manifold and onto the evaporative media pad(s) 62 without relying on gravity alone. Put another way, the delivery of pressurized water from the pressurized water distribution system 52 to the gravity distribution element 72 gives the water a high enough flow rate that the gravity distribution element 72 can be shorter (or thinner) than in currently known systems and still provide the same flow of water to the evaporative media pad(s) 62.

When the pressurized water distribution system 52 is assembled, the distribution assembly 68, which includes the water distribution system lid 72 with manifold, manifold cover(s) 80, and gravity distribution element(s) 82, has a height of approximately 65 mm (±20 mm). This height is less than that of gravity distribution elements 24 of currently known water distribution systems, typically approximately 124 mm. Further, when the evaporative cooler 50 is assembled, the evaporative cooler 50 does not include a header block (for example, a header block having a height of approximately 30-mm) and a gap between the distribution assembly 68 and the evaporative media pad(s) 62 and/or the height or thickness of the water distribution system is reduced. Therefore, the distribution assembly 68 of the pressurized water distribution system 52 disclosed herein may reduce the overall height required to delivery water to the evaporative media pad(s) 62 by approximately 109 mm. This allows for the use of larger evaporative media pads 62 (and, therefore, an increase in the active cooling area of the evaporative media pad(s) 62) and/or an evaporative cooler 50 with smaller dimensions that currently known evaporative coolers 10.

Figure 8:
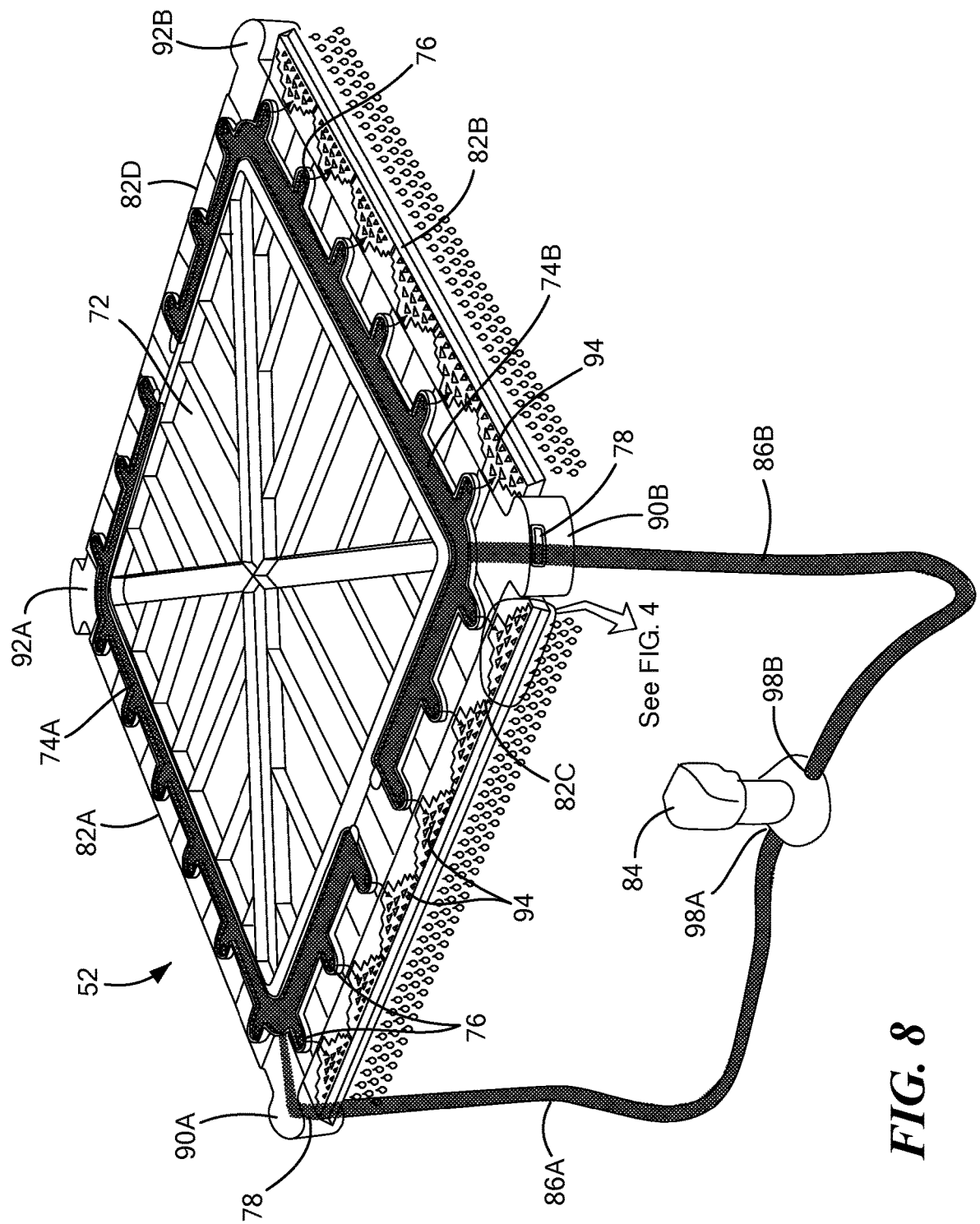
FIG. 8 shows a perspective interior view of the pressurized water distribution system of the evaporative cooler of FIG. 2 during use in accordance with the present disclosure.

Referring to FIG. 8, an interior view of the pressurized water distribution system 52 of the evaporative cooler 50 is shown during use. In one configuration, the pump 84 intakes water from the reservoir 58, then divides the water into two flow paths: one flow path into a first hose 86A and a second flow path into a second hose 86B. In the first flow path, water flows through the first hose 86A into at least one inlet hole 78 in a first water inlet portion 90A. From the at least one inlet hole 78, water in the first flow path flows into a first pressurized water channel 74A of the manifold, and then into a first plurality of outlet holes 76. From the first plurality of outlet holes 76, water in the first flow path flows into a plurality of non-pressurized flow paths created by the plurality of distribution features 94 of at least one gravity distribution element 82. Within each distribution feature 94, water is continually divided as it passes from an upstream portion 96A to a midstream portion 96B, then to downstream portion 96C, from where the water is evenly distributed on at least one evaporative media pad 62. In one embodiment, water from the first flow path is distributed onto three of four evaporative media pads 62 (for example, onto the entire width of a first evaporative media pad 62A, and onto a portion of the width of each of a third 62C and fourth 62D evaporative media pad). In the second flow path, water flows through the second hose 86B into at least one inlet hole 78 in a second water inlet portion 90B. From the at least one inlet hole 78, water in the second flow path flows into a second pressurized water channel 74B of the manifold. Water in the second flow path then flows from the second pressurized water channel 74B through a second plurality of outlet holes 76. From the second plurality of outlet holes 76, water in the second flow path flows into a plurality of non-pressurized flow paths created by a plurality of distribution features 94 of at least one gravity distribution element 82. Within each distribution feature 94, water is continually divided as it passes from an upstream portion 96A to a midstream portion 96B, then to downstream portion 96C, from where the water is evenly distributed on at least one evaporative media pad 62. In one embodiment, water from the second flow path is distributed onto three of four evaporative media pads 62 (for example, onto the entire width of a second evaporative media pad 62B, and onto a portion of the width of each of the third 62C and fourth 62D evaporative media pads). Thus, the collective amount of water flowing through the two flow paths is evenly distributed onto all four evaporative media pads 62.

Referring now to FIGS. 9-18, the second embodiment of the evaporative cooler 100 including a pressurized water distribution system 102 is shown. In addition to the pressurized water distribution system 102, the evaporative cooler 100 generally includes a housing 104 with a housing lid 106 and a reservoir 108, and an internal retaining frame 110 configured to retain at least one evaporative media pad 112. The housing lid 106 may define a least a top surface 114 of the evaporative cooler 100, and may optionally further define at least one side surface 116 of the evaporative cooler 100. In one embodiment, the housing lid 106 is a unitary structure composed of a single piece of material and defines a top surface 114 and four side surfaces 116 of the evaporative cooler 100, and is coupled to, and, optionally, in contact with, the reservoir 108 when the evaporative cooler 100 is assembled. Further, as discussed in greater detail below, in one embodiment, the housing lid 106 also includes a plurality of airflow inlets 118 (put another way, the housing lid is perforated on the top surface 114 and, in some embodiments, at least one of the four side surfaces 116). The evaporative cooler 100 also includes a fan 120 and fan motor 122 at least partially located within an aperture in the reservoir 108 that is connected to ductwork into the building or structure on which the evaporative cooler 100 is mounted. Although not shown in FIGS. 9-18, the second embodiment of the evaporative cooler 100 may further include additional components, such one or more sensors, electronic controls, float valves, filters, belts, pulleys, an auxiliary pump for draining the reservoir, ductwork, roof jacks, and/or other system components.

Figure 9:
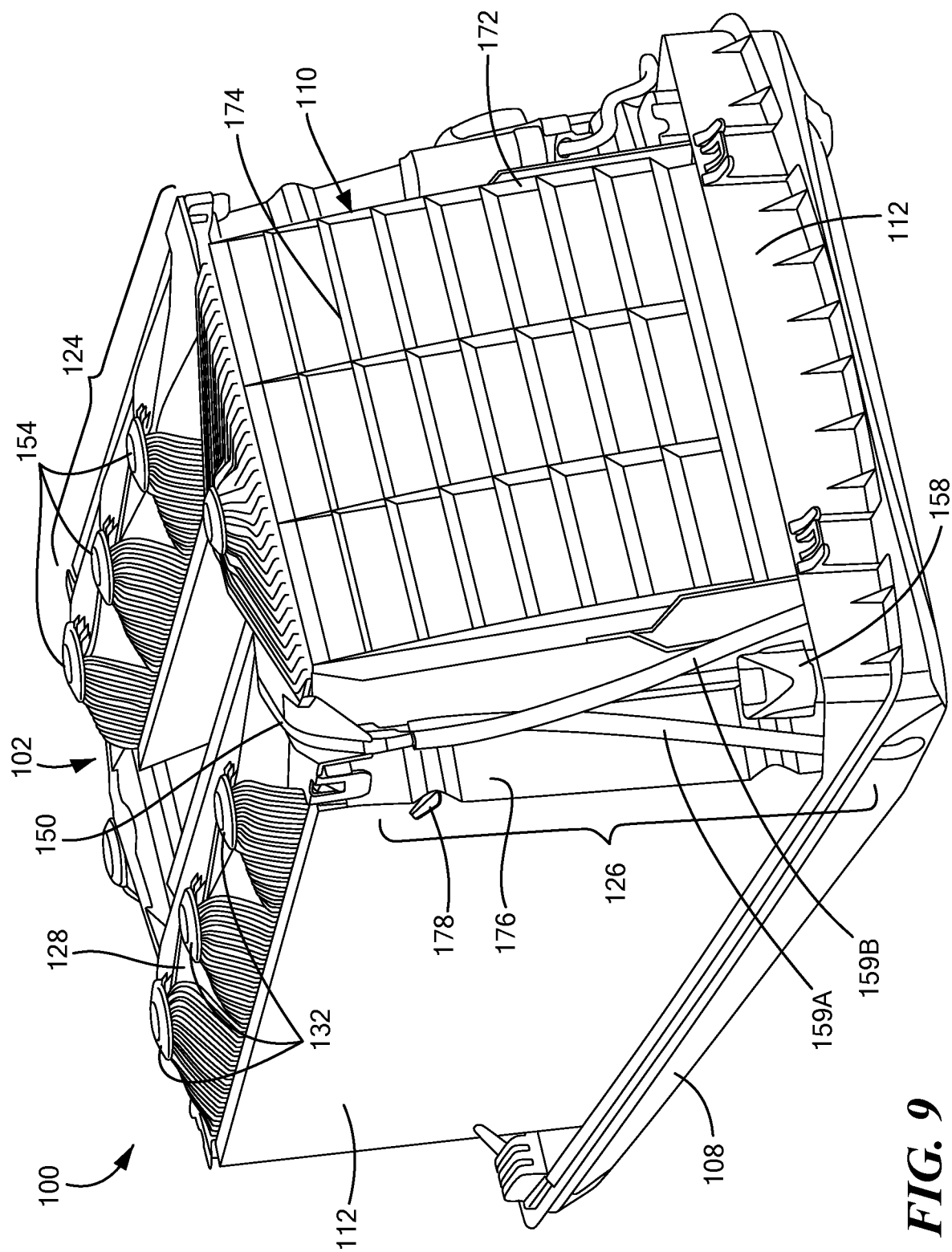
FIG. 9 shows a perspective view of an interior of a second embodiment of an evaporative cooler having a pressurized water distribution system in accordance with the present disclosure.
Figure 11:
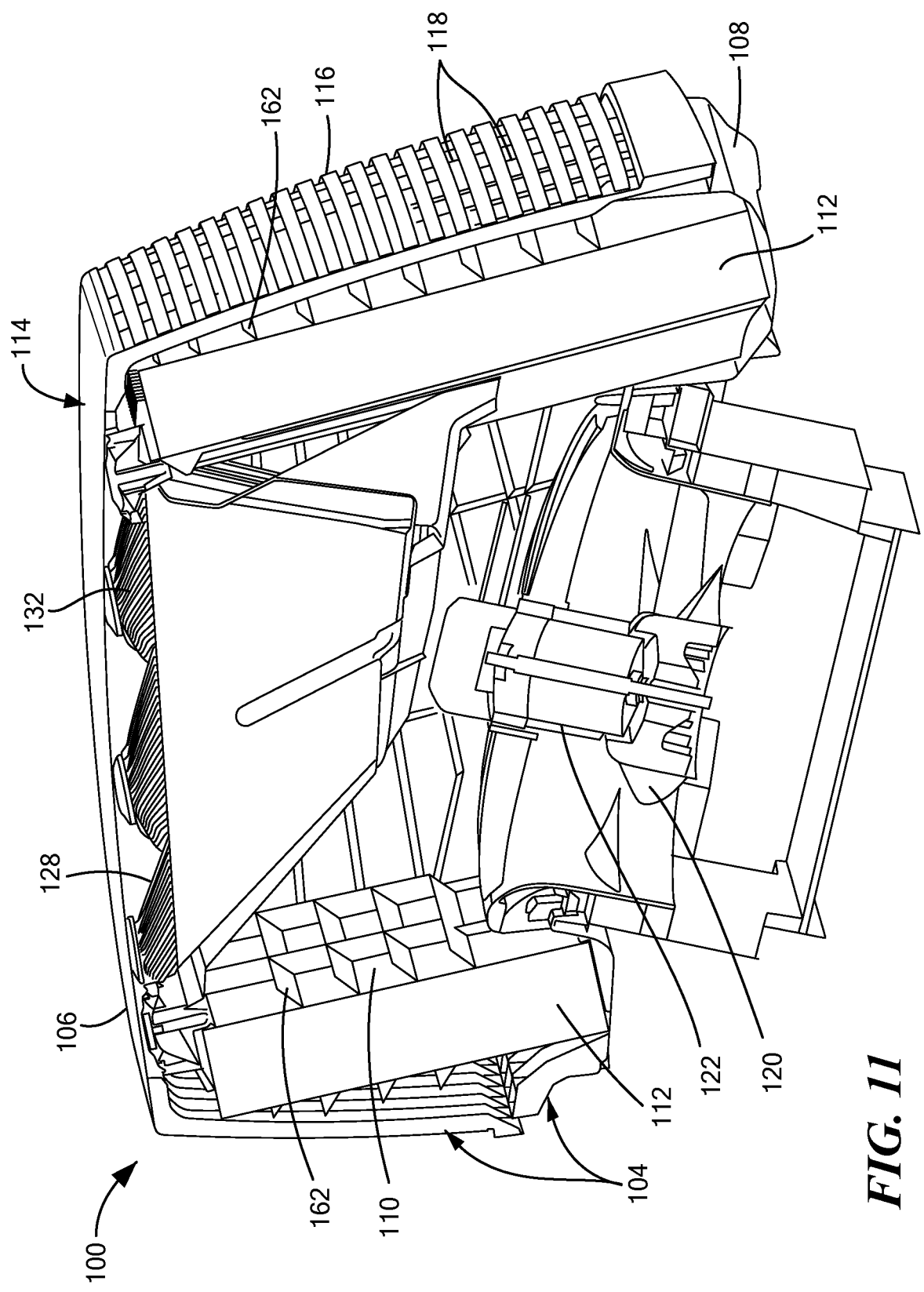
FIG. 11 shows a further cross-sectional view of the evaporative cooler of FIG. 9 in accordance with the present disclosure.
Figure 12:
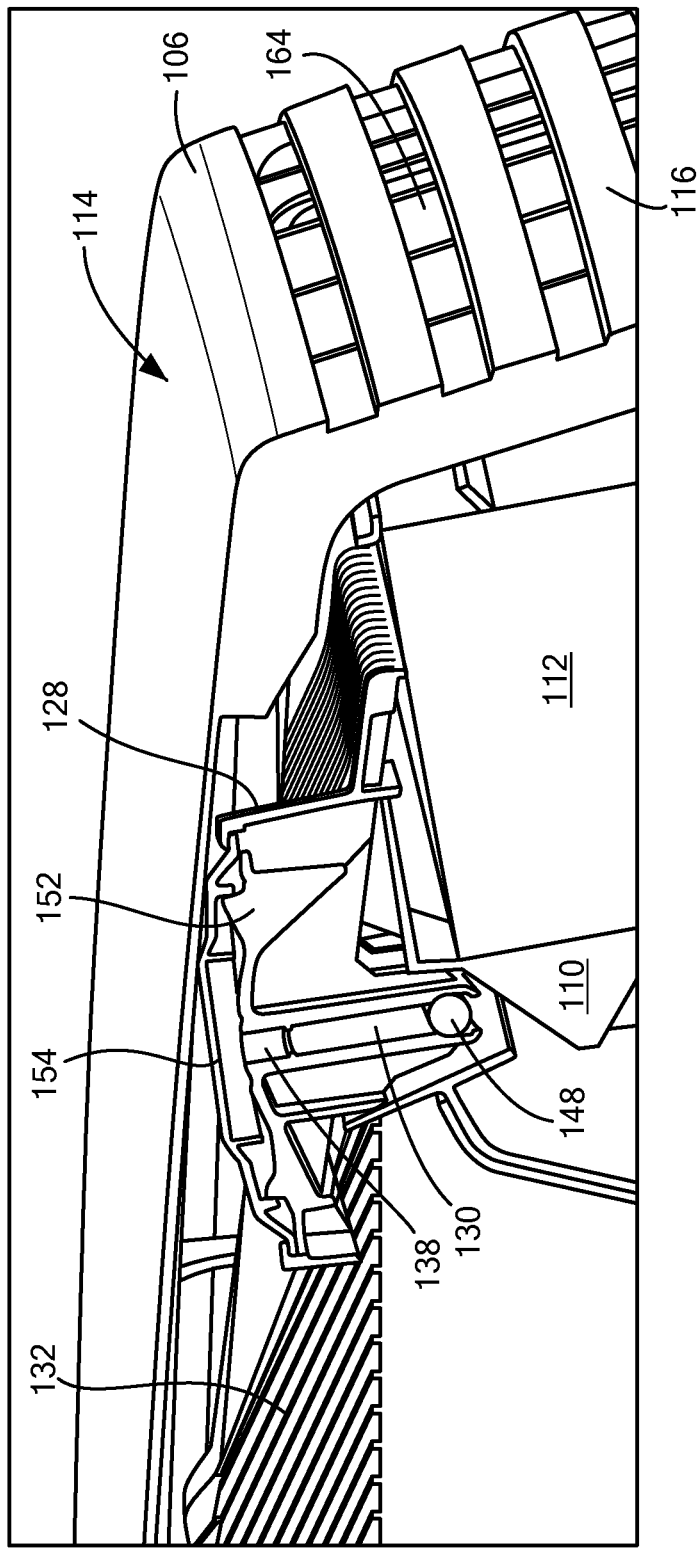
FIG. 12 shows a cross-sectional view of a portion of the pressurized water distribution system of the evaporative cooler of FIG. 9 in accordance with the present disclosure.
Figure 13:
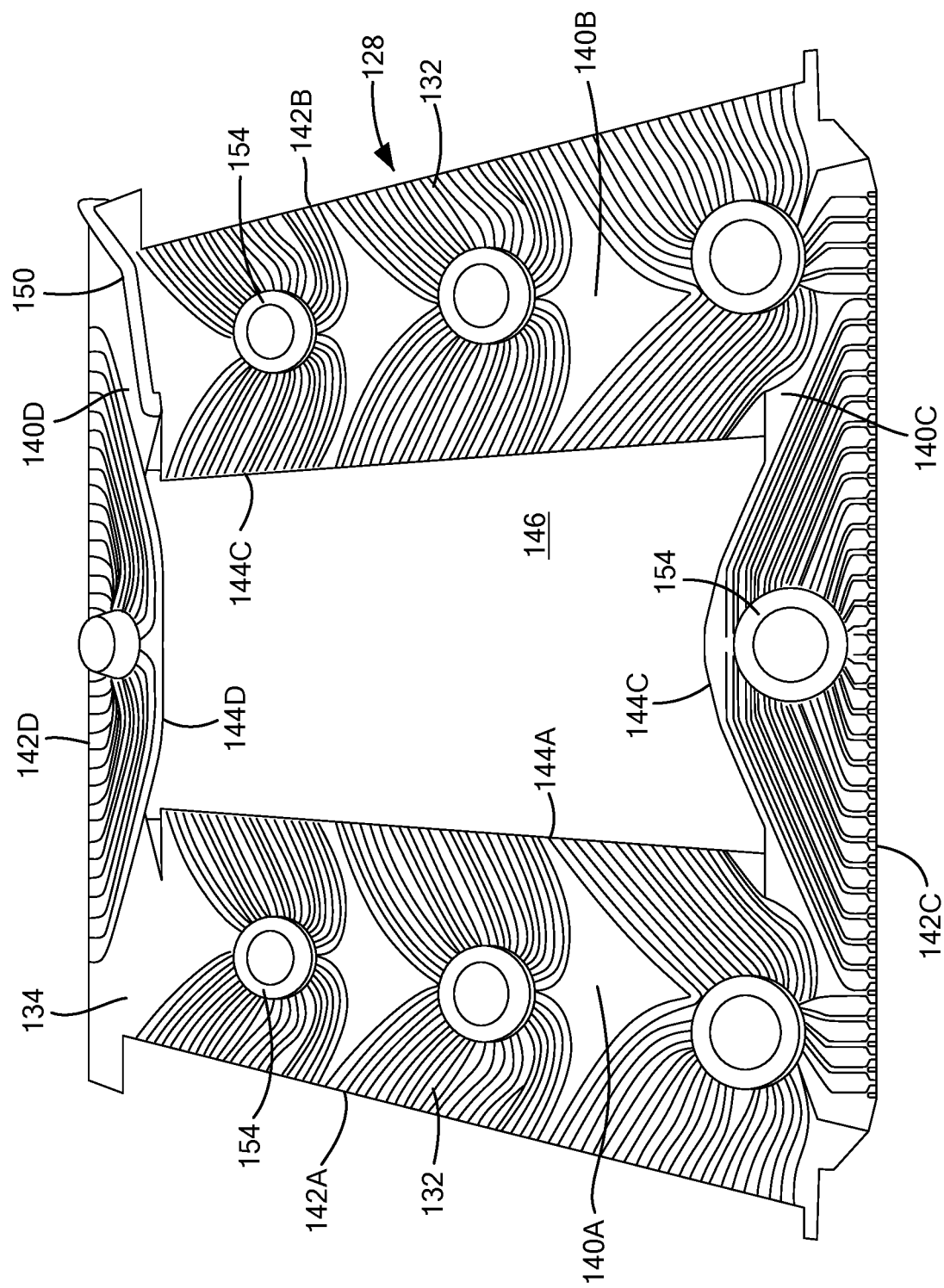
FIG. 13 shows an upper surface of a water distribution system lid of the pressurized water distribution system of the evaporative cooler of FIG. 9 in accordance with the present disclosure.
Figure 14:
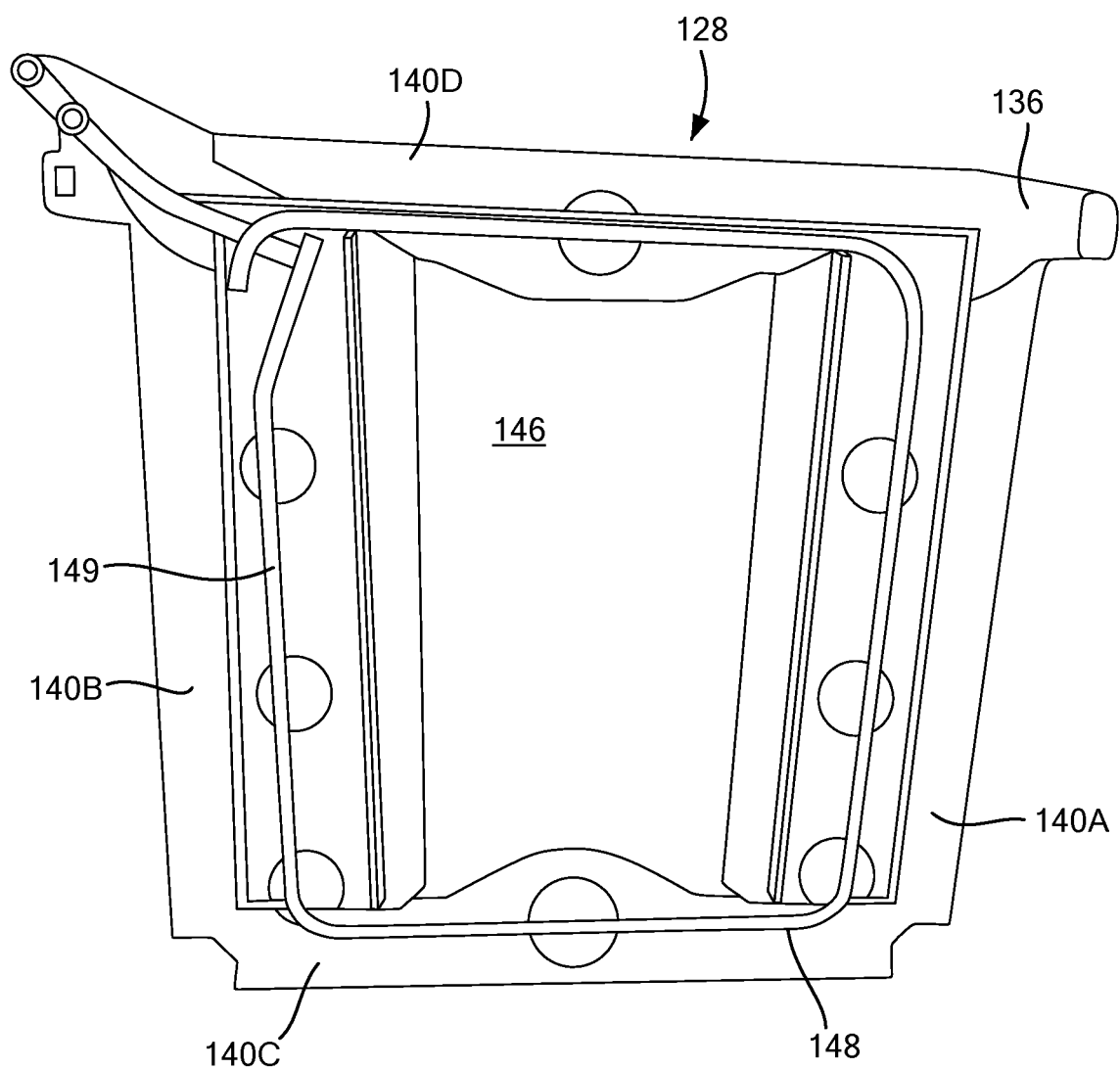
FIG. 14 shows a lower surface of the water distribution system lid of the pressurized water distribution system of the evaporative cooler of FIG. 9 in accordance with the present disclosure.

Referring to FIG. 9, the second embodiment of the evaporative cooler 100 having a pressurized water distribution system 102 is shown without the housing lid 106. Similar to the pressurized water distribution system 52 of the first embodiment of an evaporative cooler 50 shown in FIGS. 2-8, the pressurized water distribution system 102 of the second embodiment of an evaporative cooler 100 shown in FIGS. 9-18 generally includes a distribution assembly 124 and a supply assembly 126. The distribution assembly 124 includes a pressurized flow path portion and a non-pressurized flow path portion. The distribution assembly 124 includes a water distribution system lid 128 including or defining a pressurized manifold that includes at least one pressurized water channel 130 (for example, as shown in FIG. 12), and also including or defining at least one gravity distribution water channel 132 that is not pressurized. The non-pressurized gravity distribution channel(s) 132 are in fluid communication with at least one pressurized water channel 130. In one embodiment, the water distribution system lid 128 has a first (upper) surface 134 and a second (lower) surface 136, the upper surface 134 including or defining a plurality of non-pressurized gravity distribution water channels 132 and the water distribution system lid 128 further including or defining a plurality of pressurized water channels 130 extending between the upper 134 and lower 136 surfaces. A first configuration or pattern of non-pressurized gravity distribution water channels 132 is shown in FIGS. 9, 11, 13, and 17, and a second configuration or pattern of non-pressurized gravity distribution water channels 132 is shown in FIG. 18. As the water distribution system lid 128 is manufactured to include a plurality of non-pressurized gravity distribution water channels 132 without the need for additional components, the water distribution system lid 128 may be referred to as including integrated gravity distribution elements. The water distribution system lid 128 also includes a plurality of outlet holes 138. In one embodiment, the water distribution system lid 128 has a rectangular, or at least substantially rectangular, shape, with a first side 140A defining a first outer edge 142A and first inner edge 144A, a second side 140B defining a second outer edge 142B and second inner edge 144B, a third side 140C defining a third outer edge 142C and third inner edge 144C, and a fourth side 140D defining a fourth outer edge 142D and fourth inner edge 144D, which sides surround a center aperture 146 (for example, as shown in FIGS. 13 and 14). In one embodiment, the first 140A and second 140B sides are longer than the third 140C and fourth 140D sides. In one embodiment, the water distribution system lid includes eight outlet holes 138, with three outlet holes 138 being in each of the longer first 140A and second 140B sides and one outlet hole 138 being in each of the shorter third 140C and fourth 140D sides. However, it will be understood that the water distribution system lid 128 may include any suitable number and/or configuration of outlet holes 138. Each outlet hole 138 has a diameter that is large enough to prevent or reduce the likelihood of blockage by sediment or other particulates in the water being circulated through the pressurized water distribution system. In one embodiment, each outlet hole 138 has a diameter of approximately 8 mm (±0.5 mm). In another embodiment, each outlet hole 138 has a diameter of between approximately 4 mm and approximately 5 mm (±0.5 mm).

The water distribution system lid 128 also includes at least one water supply channel 148 that is included in, defined by, retained within, coupled to, or otherwise on or in the lower surface 136 of the water distribution system lid 128. The water supply channel 148 is pressurized, and therefore may be referred to as being part of the pressurized manifold. The water supply channel(s) 148 includes at least one inlet hole (not shown) and at least one outlet hole (not shown), such that each of the at least one outlet hole of the water supply channel 148 is in fluid communication with a corresponding one of the plurality of outlet holes 138 in the water distribution system lid 128. In one embodiment, the lower surface of the water distribution system lid 128 defines a water supply channel 148 that completely or at least partially surrounds the center aperture 146 of the water distribution system lid 128. In such a configuration, the water distribution system lid 128 further includes a water supply channel cover 149 that is sized and configured to enclose the water supply channel(s) such that water may enter the water supply channel 148 only through the at least one inlet hole and water may exit the water supply channel 148 only through the plurality of outlet holes (from where the water passes into the plurality of outlet holes 138 in the water distribution system lid 128), as discussed above regarding the first embodiment of the evaporative cooler 50. The water supply channel cover 149 may be composed of a compressible or semi-compressible, resilient material, such as rubber, silicone rubber, foam, neoprene, or the like. In one embodiment, the water supply channel cover 149 is an elongate piece of rubber, foam, or similar material that at least partially received within the water supply channel(s) 148 (for example, as shown in FIG. 4. Further, the water supply channel cover 149 is configured to be removably coupled to the water distribution system lid 128, such as by friction fit, clamps, or other suitable methods of attachment, to facilitate removal, repair, replacement, and/or cleaning of the water distribution system lid 128. In another embodiment (not shown), the water supply channel is a hose or tubing that includes at least one inlet hole and at least one outlet hole. For example, the water supply channel 148 may be coupled to affixed to the lower surface 136 of the water distribution system lid 128, and may include a plurality of outlet holes each being configured to align with a corresponding one of the plurality of outlet holes 138 of the water distribution system lid 128 when the distribution assembly 124 is assembled. In this configuration, the water supply channel 148 may be tubing composed of a flexible and resilient material, such as rubber, silicone rubber, flexible plastic, or the like. In either embodiment, the distribution assembly 124 optionally further includes an inlet conduit 150 that is in fluid communication with the water supply channel 148.

In one embodiment, the upper surface 134 of the water distribution system lid 128 defines a dome, hump, or other raised area 152 at each of the plurality of outlet holes 138. In one embodiment, the upper surface 134 of the water distribution system lid 128 further defines a plurality of non-pressurized gravity distribution water channels 132 that are symmetrically or asymmetrically radially arranged around the base or border of each raised area 152, and extend to an inner edge 144 and an outer edge 142 of the water distribution system lid 128 that are proximate the raised area 152 from which they extend. Additionally or alternatively, the non-pressurized gravity distribution water channels 132 extend over the raised areas 152 from a location proximate or immediately proximate each outlet hole 138 (for example, as shown in FIGS. 17 and 18).

Figure 15:
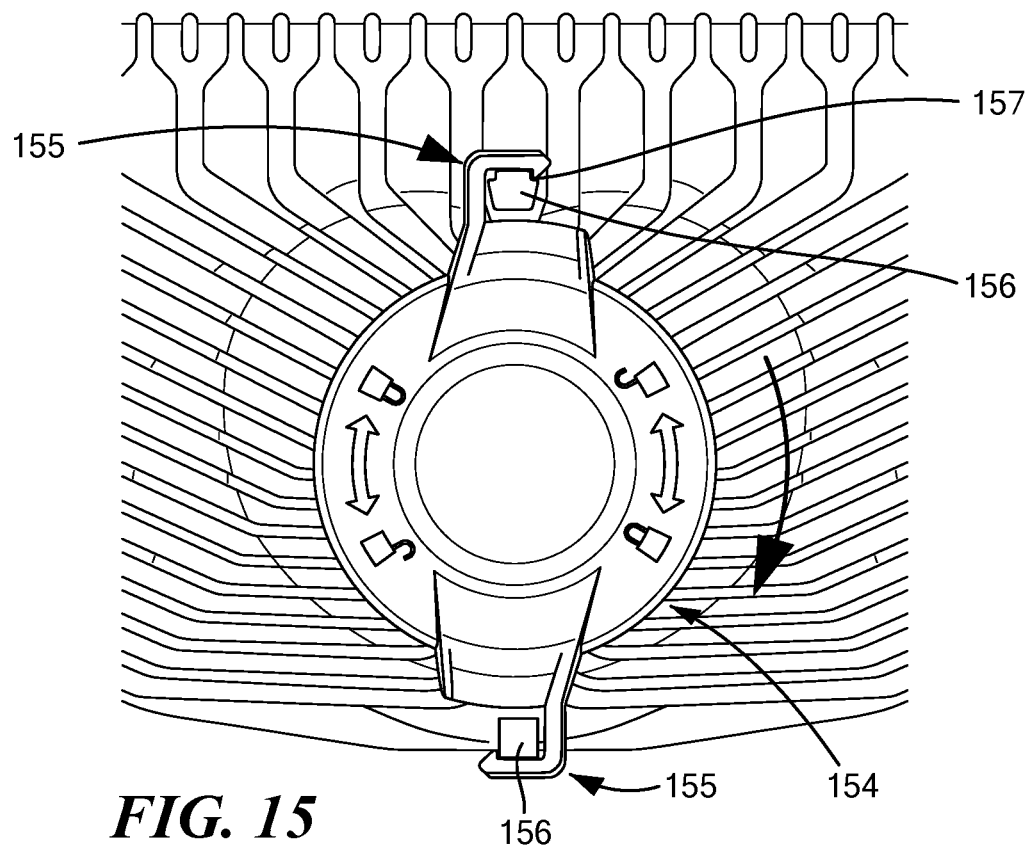
FIG. 15 shows a quick-release cap in a locked position in accordance with the present disclosure.
Figure 16:
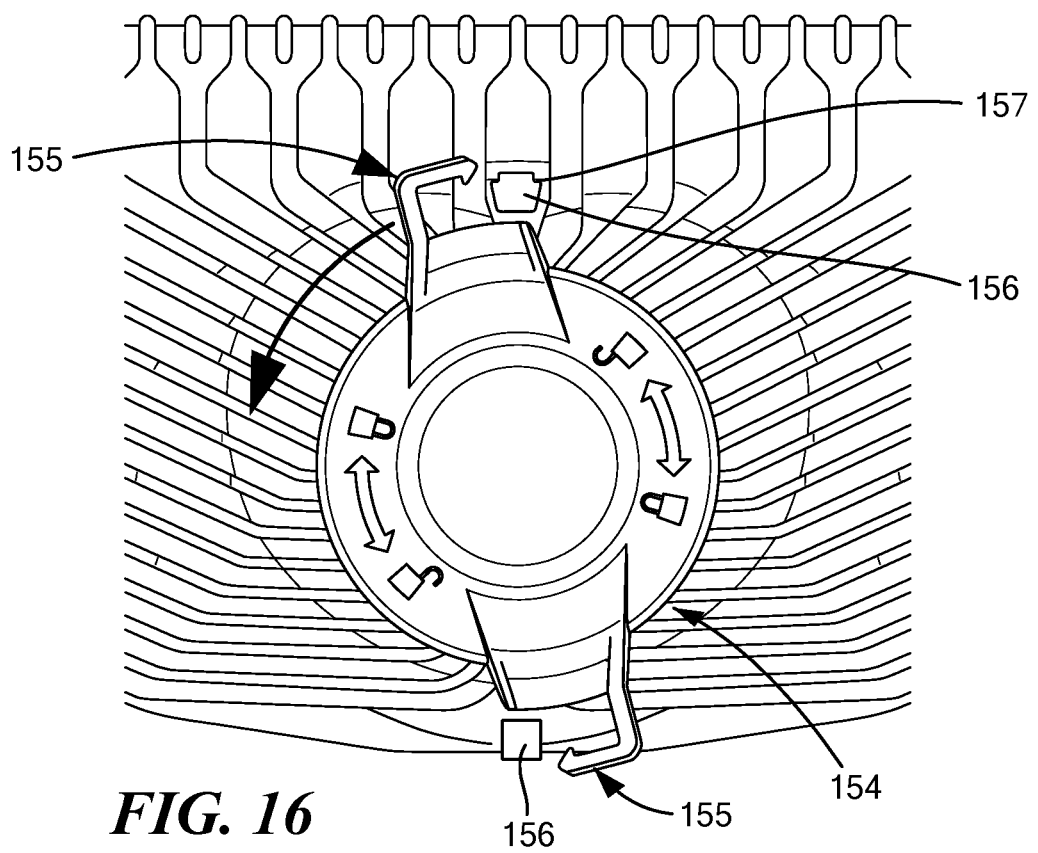
FIG. 16 shows the quick-release cap of FIG. 15 in an unlocked position in accordance with the present disclosure.

The water distribution system lid 128 further includes a cap 154 at each of the plurality of outlet holes 138 that is sized and configured to fit over at least a portion of the raised area 152, at least over the outlet hole 138. In fact, the outlet holes 138 are obscured in by the caps 154 in FIGS. 9-11, 13, and 15-17. FIG. 18 shows an outlet hole without a cap 154 for illustration, although it will be understood that a cap 154 may be included when the evaporative cooler 100 is in use. The cap helps evenly distribute and direct water flowing from the outlet hole 138 into the plurality of non-pressurized gravity distribution water channels 132 extending from the raised area 152 surrounding the outlet hole 138. The caps 154 may be removably coupled to the water distribution system lid 128, such as by a hinge and lock, friction fit, clamp, or other suitable mechanical coupling. In one embodiment, shown in FIGS. 15 and 16, each cap 154 is a quick-release cap that is easily secured and removed from the water distribution system lid 128. In one non-limiting example, each cap 154 includes threading on an inner surface (not shown) that is rotatably engageable with a complementary threading on the upper surface 134 of the water distribution system lid 128 (for example, the threading may be on the raised areas 152 surrounding each outlet hole 138), such that the caps 154 may be screwed onto, and thereby secured to, the water distribution system lid 128 by rotating the caps 154 in a clockwise direction. FIG. 15 shows the cap 154 in a first or locked position. Likewise, the caps 154 may be removed or disengaged from the water distribution system lid 128 to expose the outlet holes 138 by rotating the caps 154 in a counterclockwise direction. FIG. 16 shows the cap 154 in a second or unlocked position. Additionally or alternatively, each cap includes at least one hooked portion 155 that radially extends from the cap 154 and is engageable with a corresponding post 156 that protrudes from the upper surface 134 of the water distribution system lid 128. In one embodiment, each cap 154 includes a pair of opposing hooked portions 155 (that is, two hooked portions 155 that extend from the cap 154 at locations that are approximately 180° from each other) and the upper surface 134 of the water distribution system lid 128 includes a pair of opposing posts 156 (that is, two posts 156 that are approximately 180° from each other). Each hooked portion 155 is sized and configured to securely engage a corresponding post 156, such as by friction fit. Additionally or alternatively, each post 156 may have a groove 157A that is sized and configured to receive a finger protrusion 157B on corresponding hook portion 155. Additionally or alternatively, each post 156 may have a flange at the free end that has a larger outer diameter than the aperture formed by the corresponding hooked portion 155 and prevents the corresponding hooked portion 155 from separating from the post 156 unless the cap 154 is rotated in a counterclockwise direction. In this manner, each cap 154 may be quickly and easily removed for cleaning the holes 138, gravity distribution water channels 132, the caps 154 themselves, and/or other components.

Figure 17:
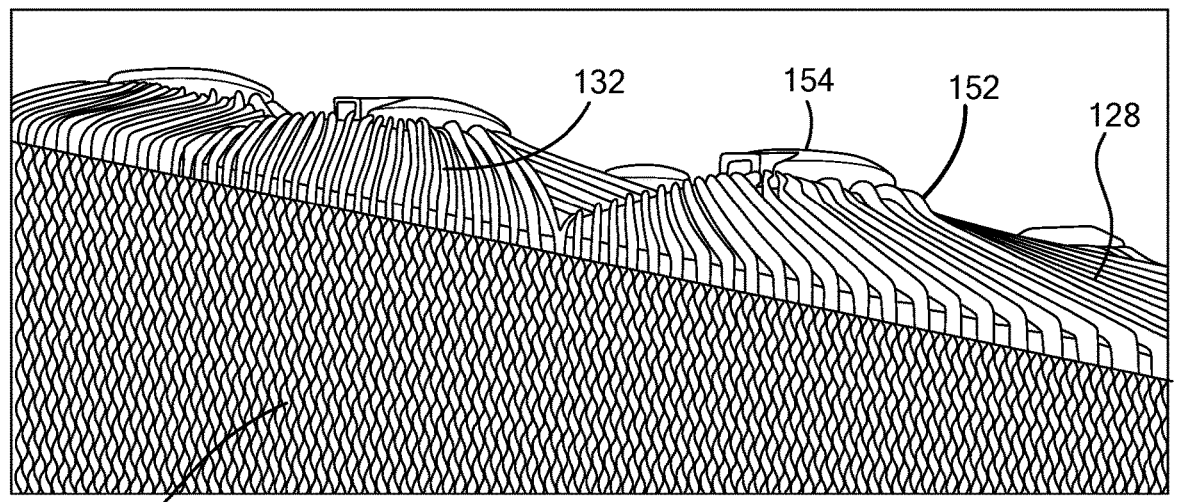
FIG. 17 shows a close-up view of the water distribution system lid of the pressurized water distribution system of the evaporative cooler of FIG. 9 in accordance with the present disclosure, the water distribution system lid positioned directly above an evaporative media pad and having a first configuration of non-pressurized gravity distribution water channels.
Figure 18:
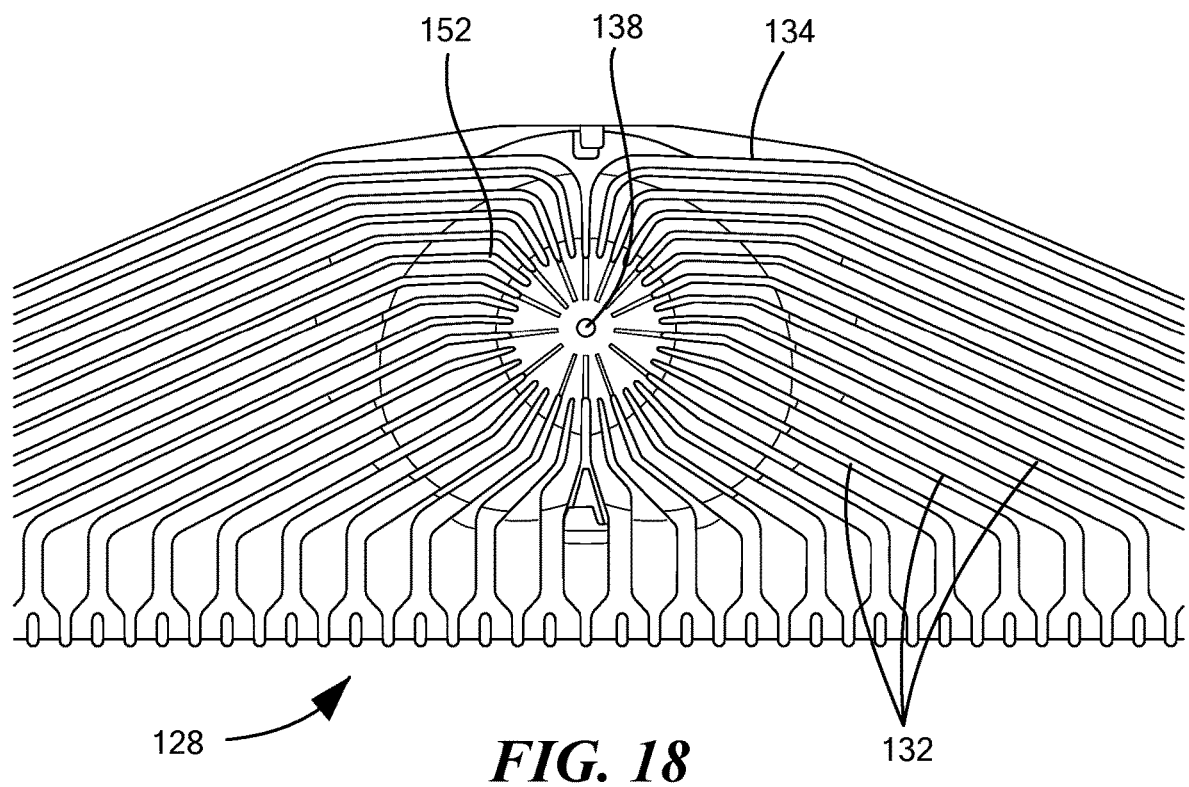
FIG. 18 shows a close-up view of the water distribution system lid of the pressurized water distribution system of the evaporative cooler of FIG. 9 in accordance with the present disclosure, the water distribution system lid having a second configuration of non-pressurized gravity distribution water channels.

As is shown in FIG. 17, the water distribution system lid 128 is located directly adjacent to the evaporative media pad(s) 112. Put another way, the evaporative media pad(s) 112 are located directly subjacent the water distribution system lid 128, without a header, when the evaporative cooler 100 is in use. In one embodiment, the evaporative cooler 100 includes at least four evaporative media pads 112, with one evaporative media pad 112 being directly beneath one of the sides 140 of the water distribution system lid 128. The internal retaining frame 110 and water distribution system lid 128 may be configured such that the water distribution system lid 128 is located a predetermined distance from the upper edge or top of each of the evaporative media pads 112. In one embodiment, the predetermined distance is less than 10 mm.

Referring again to FIG. 9, the supply assembly 126 includes a pump 158 that may be located within the housing 104, such as within the reservoir 108, and at least one hose 159. In one embodiment, the supply assembly 126 includes a first hose 159A and a second hose 159B, each having a first end coupled to an outlet of the pump 158 and a second end coupled to the inlet conduit 150 of the distribution assembly 124. Alternatively, if the distribution assembly 124 does not include an inlet conduit 150, the second end of each hose 159 is instead coupled to an inlet of the pressurized manifold.

During use, the pump 158 intakes water from the reservoir 108, which may surround the aperture, then delivers the water to the hose(s) 159, from where the water flows into the water supply channel 148. From the water supply channel 148, the water flows through the outlet holes 138 in the water distribution system lid 128, and is then evenly distributed into the plurality of non-pressurized gravity distribution water channels 132 extending from the raised areas 152 surrounding the outlet holes 138. Water then flows from the non-pressurized gravity distribution water channels 132 over or through the inner 144 and outer 142 edges of the water distribution system lid 128, and onto the evaporative media pad(s) 112.

Unlike currently known water distribution systems, water is effectively pressurized within the enclosed pressurized water channel(s) 130 of the pressurized water distribution systems 102 disclosed herein. The pump 158 and enclosed pressurized water channel(s) 74 provide momentum pressure to the water, with the outlet holes 138 further metering water flow within the pressurized water supply channel(s) 130 by providing restriction to the water flow. The force created by the pump 158 and pressurization of water within the enclosed pressurized water channel(s) 130, in combination with the restriction of the outlet holes 138, provides the water with a high enough flow rate and/or pressure to ensure even distribution without relying on gravity alone.

When the pressurized water distribution system 102 is assembled, the distribution assembly 124 has a height of approximately 65 mm (±20 mm). This height is less than that of gravity distribution elements of currently known water distribution systems, which are typically approximately 124 mm. Further, when the evaporative cooler 100 is assembled, the evaporative cooler 100 does not include a header block (for example, a header block having a height of approximately 30-mm) and has a thinner water distribution system. Therefore, the distribution assembly 124 of the pressurized water distribution system 102 disclosed herein may reduce the overall height required to delivery water to the evaporative media pad(s) 112 by approximately 109 mm. This allows for the use of larger evaporative media pads 112 (and, therefore, an increase in the active cooling area of the evaporative media pad(s) 112) and/or an evaporative cooler 100 with smaller dimensions that currently known evaporative coolers 10. Additionally or alternatively, this configuration may also allow for the use of additional or supplemental evaporative media pads 112A.

Figure 10:
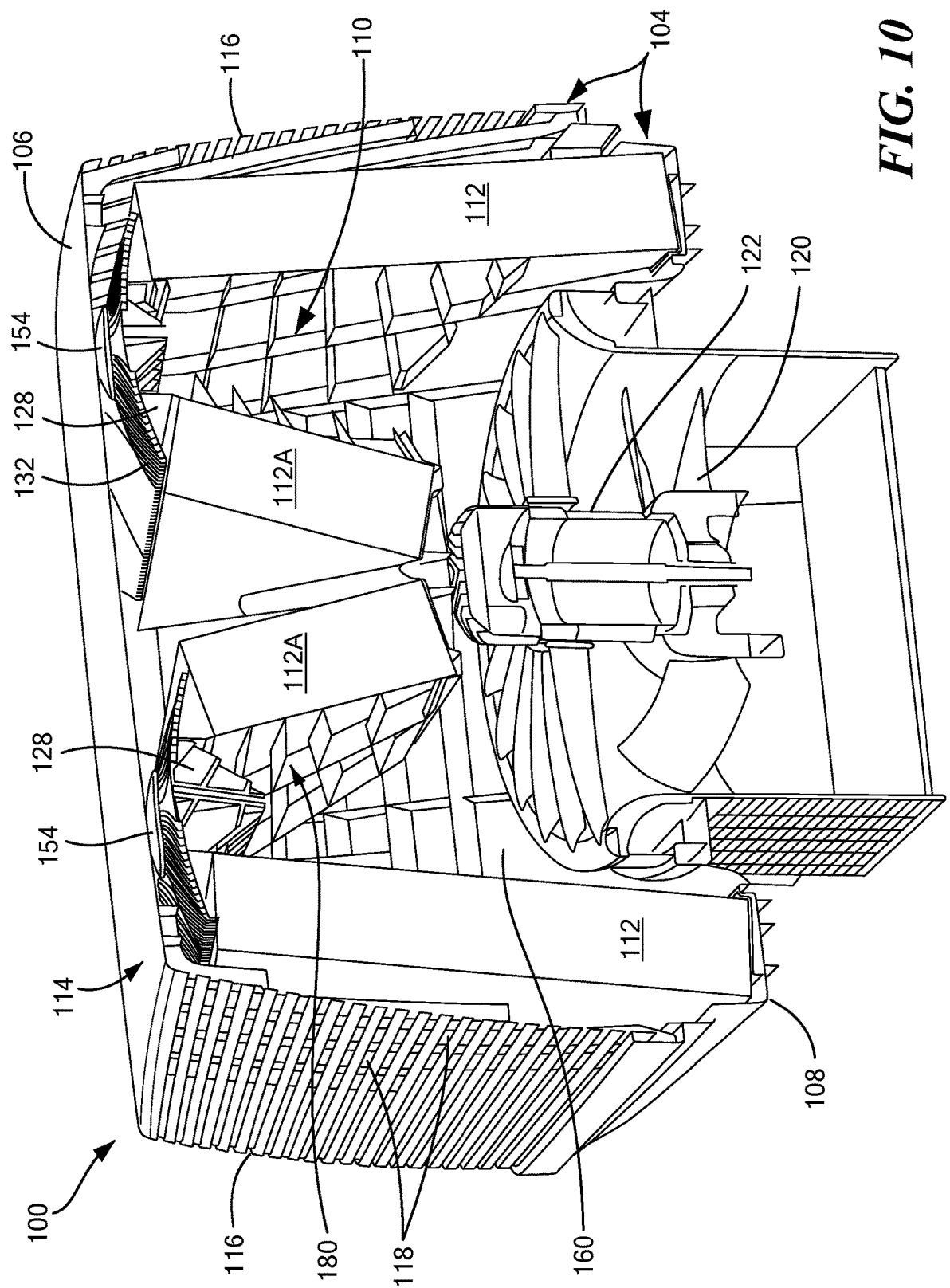
FIG. 10 shows a cross-sectional view of the evaporative cooler of FIG. 9 in accordance with the present disclosure.
Figure 20:
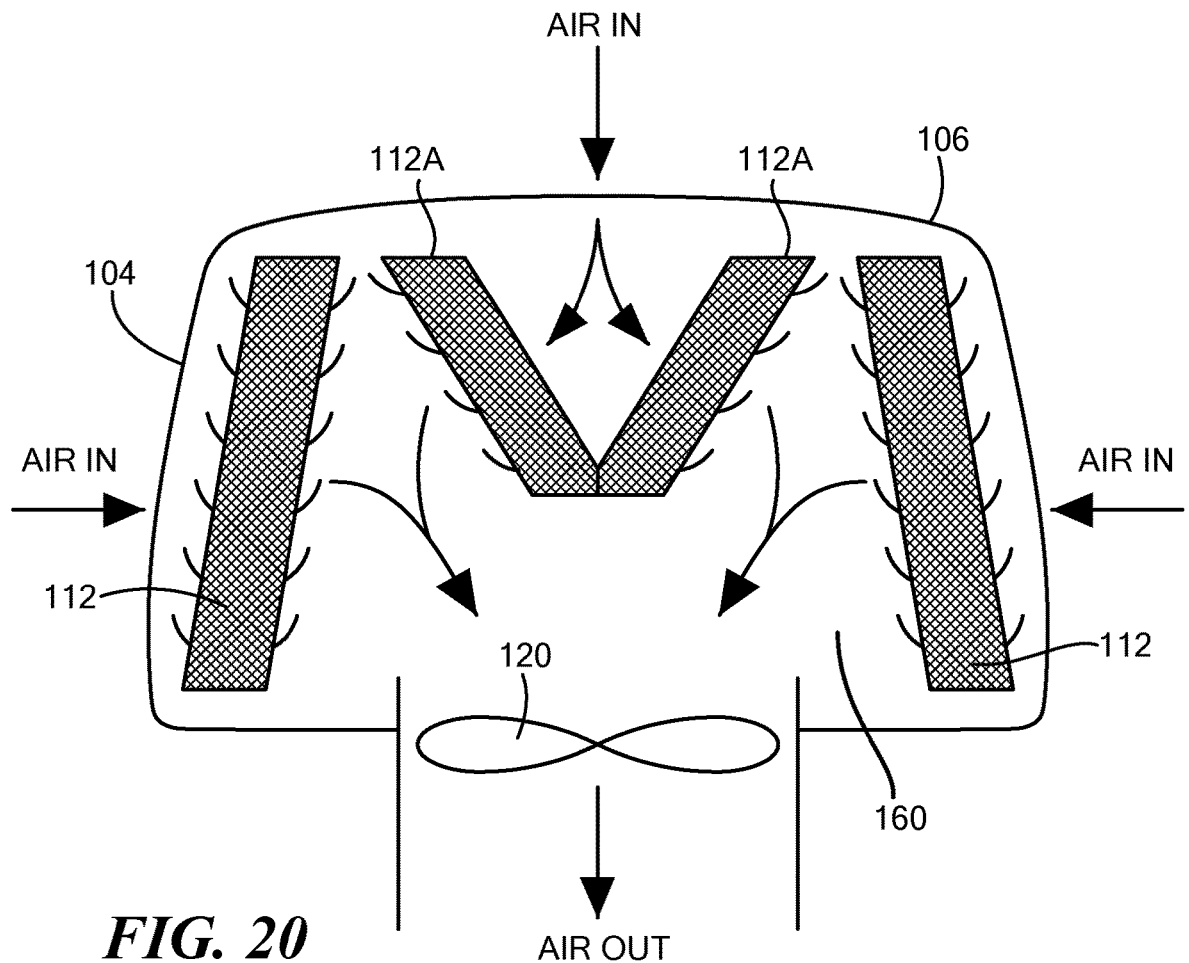
FIG. 20 shows a schematic cross-sectional view of an evaporative cooler having canted supplemental evaporative media pads and a perforated housing lid in accordance with the present disclosure.
Figure 21:
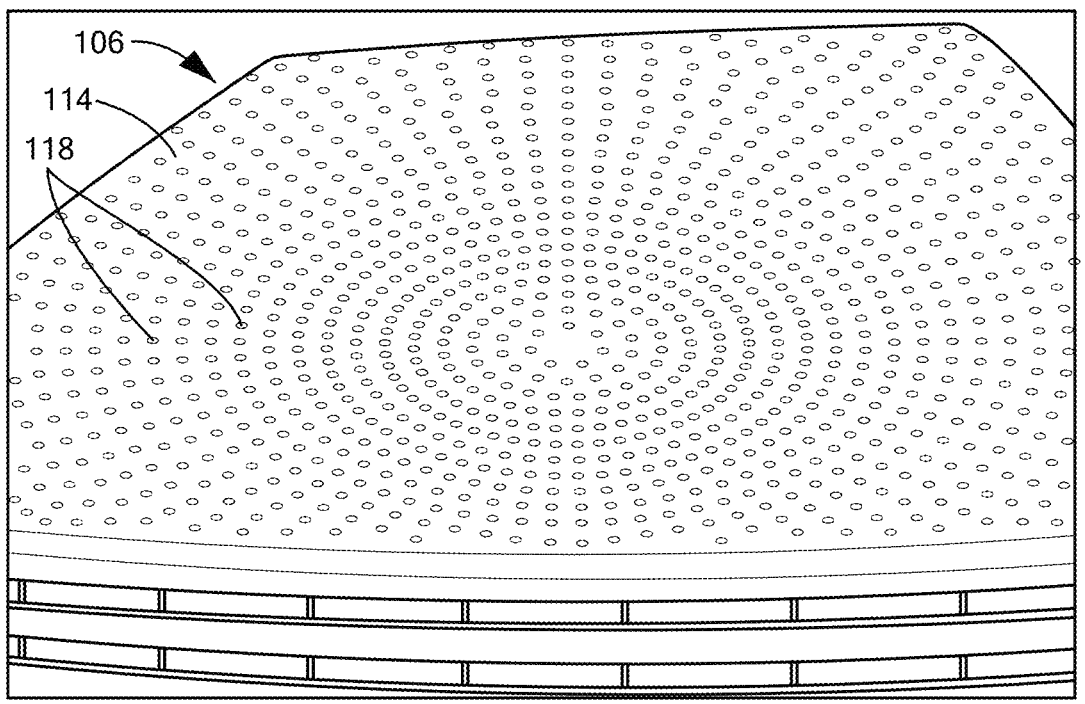
FIG. 21 shows a top view of a perforated housing lid for an evaporative cooler in accordance with the present disclosure.

As is most clearly seen in FIGS. 10 and 20, in one embodiment, the evaporative cooler 100 includes supplemental evaporative media pad(s) 112A within a chamber 160 defined by the outer or primary evaporative media pads 112. Unless specifically distinguished, the reference number 112 may be used herein to generally refer to both primary and supplemental evaporative media pads for simplicity. The supplemental evaporative media pad(s) 112A are smaller than the primary evaporative media pads 112, and are sized and configured to be located directly above the fan 120. In one embodiment, the internal retaining frame 110 is configured to retain the supplemental evaporative media pad(s) 112A such that they are canted or arranged at an angle relative to the direction of gravitational flow of water from the water distribution system lid 128. The supplemental evaporative media pad(s) 112A may be arranged at the same or different angles as each other relative to the direction of gravitational flow of water from the water distribution system lid 128. In one embodiment, the evaporative cooler 100 includes two supplemental evaporative media pads 112A that are arranged in a "V" shape relative to each other.

Further, the internal retaining frame 110 is configured to retain the supplemental evaporative media pads 112A such that they are aligned with and immediately beneath the water distribution system lid 128, and such that water flowing over at least the first inner edge 144A and the second inner edge 144B of the water distribution system lid 128 is distributed onto the supplemental evaporative media pads 112A (for example, as shown in FIG. 10). Likewise, the internal retaining frame 110 may be further configured to retain the primary evaporative media pads 112 in a vertical position and/or in a canted position. In one embodiment, at least one of the primary evaporative media pads 112 is retained at an angle relative to the direction of gravitational flow of water from the water distribution system lid 128 (for example, as shown in FIG. 11).

Figure 19:
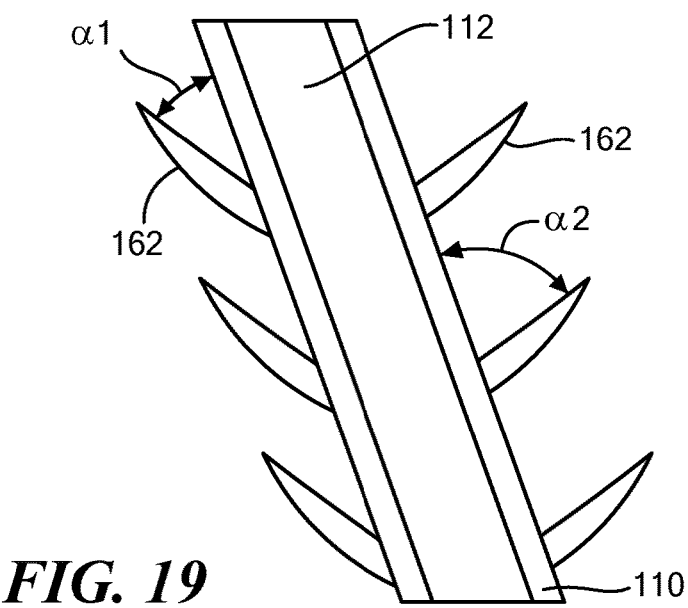
FIG. 19 shows a schematic cross-sectional view of an evaporative media pad retained in a retaining frame with angled louvers in accordance with the present disclosure.

If the evaporative cooler 100 includes canted evaporative media pad(s) (primary 112 and/or supplemental 112A), there is a risk that the gravity and/or airflow passing over the canted evaporative media pad(s) 112 will pull water downward from the canted evaporative media pad(s) 112, and that the water will travel through the ductwork into the building or structure on which the evaporative cooler 100 is mounted. This may cause damage to the building or structure, and can undesirably increase humidity of the air being delivered to the interior of the building and/or present algae, mold, and mildew problems within the ductwork. To retain water within the evaporative media pad(s) 112, in one embodiment, the internal retaining frame 110 includes angled louvers 162 that are configured to direct water back into the evaporative media pads 112. The internal retaining frame 110 is manufactured such that the angle of the angled louvers 162 is suitable for the mounting angle of the canted evaporative media pad(s) 112. In one non-limiting example, the internal retaining frame 110 may be configured to retain an evaporative media pad 112 at an angle of 65° relative to horizontal, and each angled louver 162 extending from the downward-facing surface of the evaporative media pad 112 may have an angle $\alpha_1$ of approximately 45° (±2°) relative to the downward-facing surface of the evaporative media pad 112, and each angled louver 162 extending from the upward-facing surface of the evaporative media pad 112 may have an angle $\alpha_2$ of approximately 60° (±2°) relative to the upward-facing surface of the evaporative media pad 112 (as shown in FIG. 19). If gravity and/or airflow passing over the evaporative media pad 112 pulls water downward from the surface of the evaporative media pad 112, the water will be collected by the angled louvers 162 and, via gravity, will be returned to the evaporative media pad instead of being released downward into the fan and/or ductwork.

Use of supplemental evaporative media pad(s) 112A increases the active cooling area and cooling capacity of the evaporative cooler 100. To maximize exposure of all evaporative media pads 112, and in particular of the supplemental evaporative media pad(s) 112A, in some embodiments, the housing 104 includes a perforated housing lid 106 having a plurality of airflow inlets 118 on at least the top surface 114 and, in some embodiments, at least one of the side surfaces 116. In some embodiments, the side surfaces 116 of the housing lid 106 and/or housing 104 include vents, apertures, holes, inlets, or other airflow inlets or openings 164 in addition to or instead of the plurality of airflow inlets 118 (that is, the perforation of the top surface 114). In one embodiment, at least some of the plurality of airflow inlets 118 in the top surface 114 of the housing lid 106 have a diameter that is less than at least one of the other airflow inlets 164 in the side surface(s) 116. Further, the plurality of airflow inlets 118 may have the same or different diameters.

For example, the airflow inlets 118 may have a gradient of decreasing inner diameters, with the airflow inlets 118 located at or proximate the center of the top surface 114 having a larger diameter than the airflow inlets 118 located at or proximate the edges of the top surface 114. In one embodiment, the airflow inlets 118 at or proximate the center of the top surface 114 each have a diameter of approximately 7 mm (±1 mm) and the airflow inlets 118 at or proximate the edges of the top surface 114 each have a diameter of approximately 3 mm (±1 mm). Airflow inlets 118 in between the center and the edges of the top surface 114 have a gradient or range of diameters between approximately 7 mm and approximately 3 mm, such that the airflow inlets 118 have an aesthetically pleasing appearance and give the impression of a smooth gradient between airflow inlets 118 with an ever-increasing diameter. In one embodiment, the larger airflow inlets 118 at or proximate the center of the top surface 114 are aligned with the center aperture 146 of the water distribution system lid 128 and/or the area of air intake, thereby maximizing the amount of air that enters the evaporative cooler 100 and the exposure of the evaporative media pad(s) 112 to air flowing in through the top surface 114 of the lid 106. Further, in one embodiment, the plurality of airflow inlets 118 are arranged such that the center points of adjacent airflow inlets 118 are spaced at a distance of approximately 8.5 mm (±2 mm), regardless of the diameter of the airflow inlets 118. In one embodiment, all of the airflow inlets 118, or at least the airflow inlets 118 at or proximate the edges of the top surface 114, smaller and/or are more densely arranged than other airflow inlets 164, such as slits or other apertures, and are small enough to prevent leaves and other debris from entering the evaporative cooler 100 through the perforated lid 106, but are large enough and numerous enough to allow sufficient airflow to pass therethrough. In one embodiment the plurality of airflow inlets 118 are arranged in a pattern, such as radially arranged about a center point or arranged in a grid. In another embodiment, the plurality of airflow inlets 118 are randomly arranged or scattered. Each of the plurality of airflow inlets 118 may have any cross-sectional shape, such as circular, square, polygonal (for example, hexagonal), oval, or the like. However, it will be understood that the plurality of airflow inlets 118 may have any size, shape, or configuration that allows air to enter the evaporative cooler 100 through the top surface 114 of the lid 106.

As is shown in FIG. 20, rotation of the fan 120 draws air into the housing 104, and in contact with the evaporative media pads 112, through the perforated housing lid 106, such as through the plurality of airflow inlets 118 in the top surface 114 and/or plurality of airflow inlets 118 and/or other airflow inlets 164 in at least one of the side surfaces 116. Currently known evaporative coolers 10 are incapable of providing the cooling capacity of the evaporative cooler 100 having a pressurized water distribution system 102, as currently known evaporative coolers 10 have a taller water distribution component that reduces room within the housing 12. As such, the housing cannot accommodate supplemental evaporative media pad(s). Further, currently known water distribution components would block air intake through the lid. Therefore, even if a currently known evaporative cooler 10 included supplemental evaporative media pad(s), cooling capacity would still be limited by the maximum air intake through the sides 14 of the housing 12 only. As the water distribution system lid 128 of the second embodiment of the evaporative cooler 100 includes a center aperture 146, air may flow through both the perforated housing lid 106 and the water distribution system lid 128, in addition to through the side surfaces 116 of the housing 104, and into contact with the primary 112 and supplemental 112A evaporative media pads.

Figure 22:
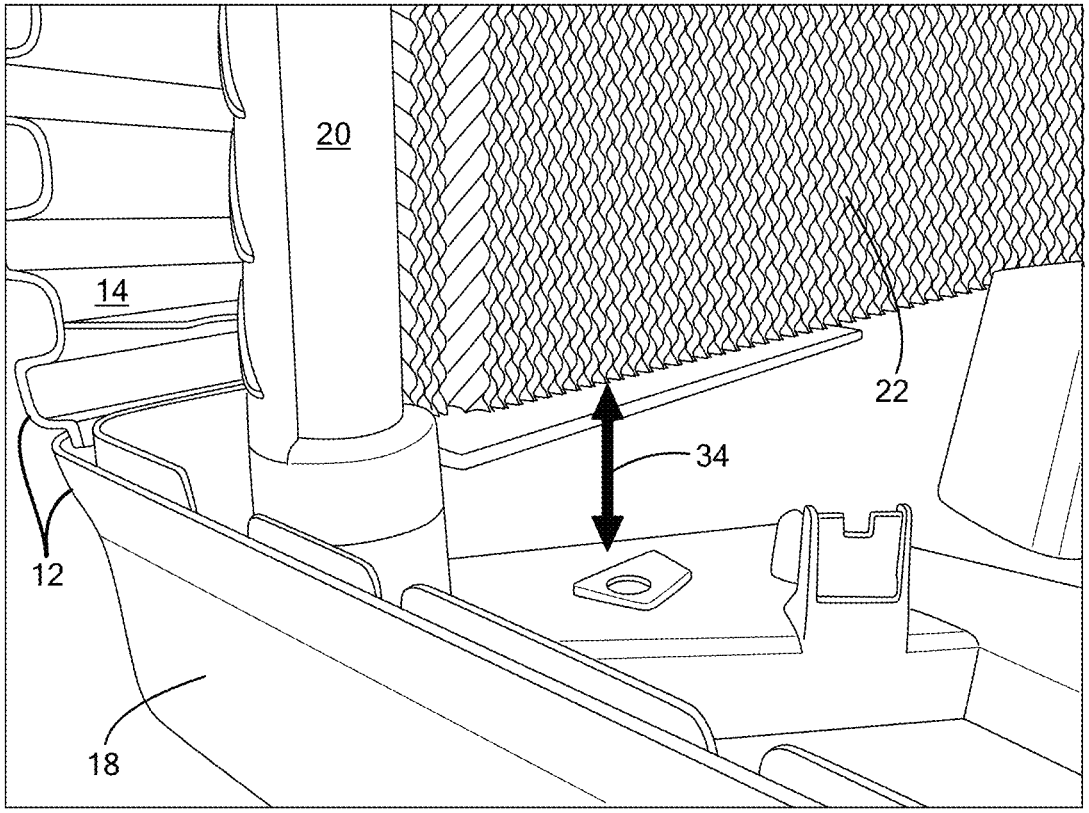
FIG. 22 shows a close-up view of a position of an evaporative media pad mounted to a retaining frame within a currently known evaporative cooler in accordance with the present disclosure.
Figure 23:
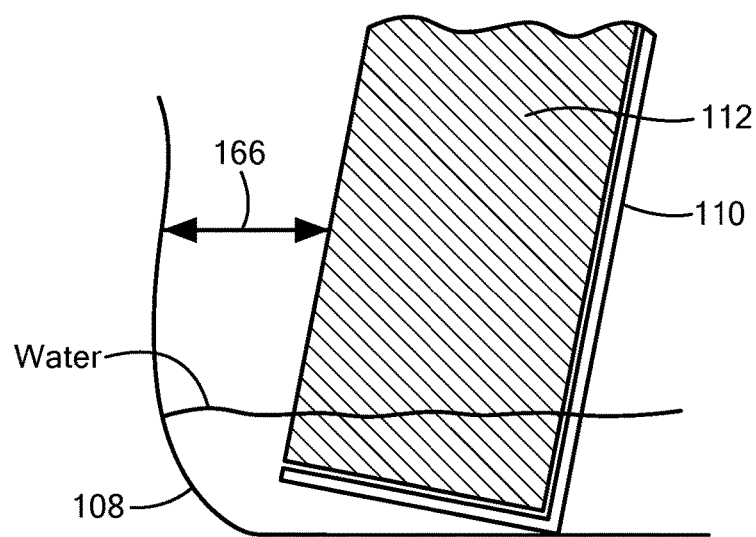
FIG. 23 shows a cross-sectional schematic view of a position of an evaporative media pad within an internal retaining frame for an evaporative cooler of the present disclosure in accordance with the present disclosure.
Figure 24:
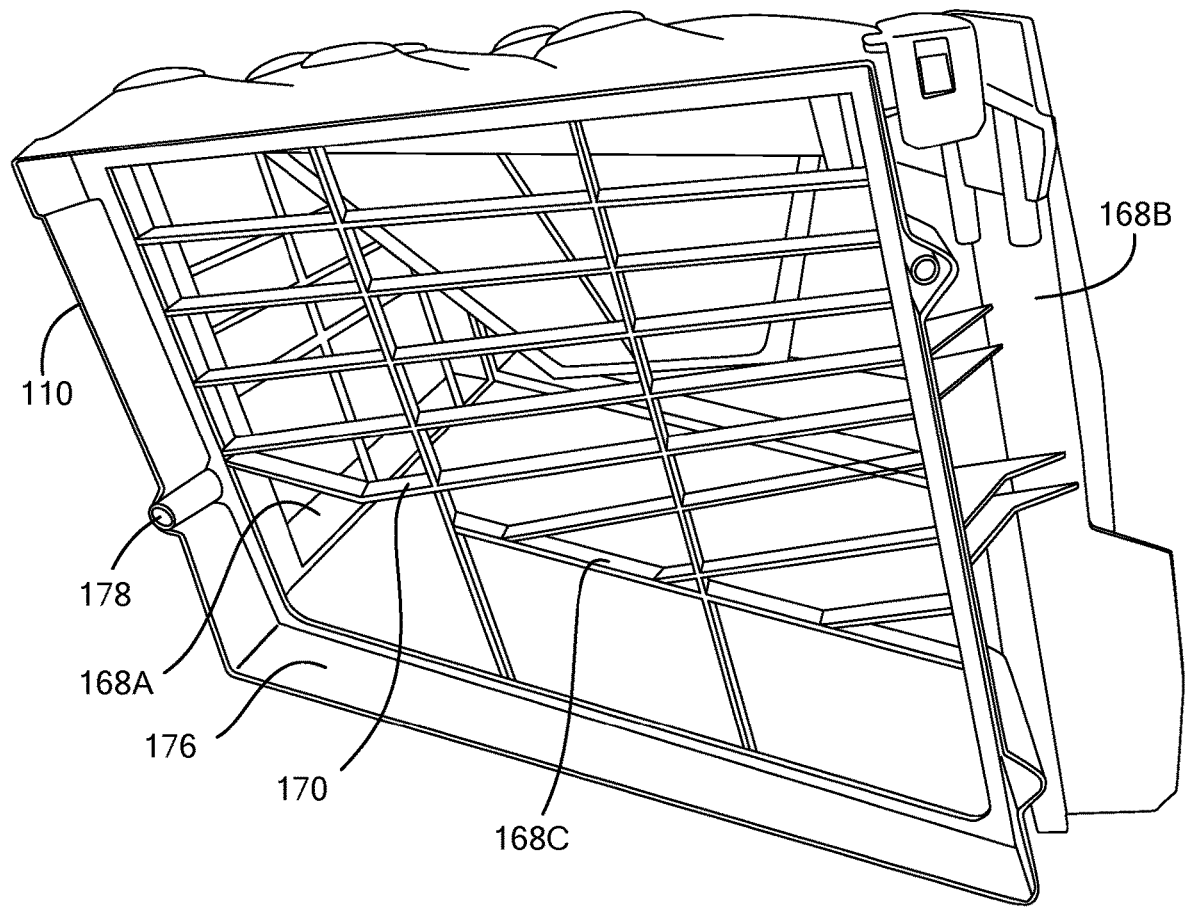
FIG. 24 shows an internal retaining frame for an evaporative cooler of the present disclosure in accordance with the present disclosure.

Referring now to FIGS. 22-27, an internal retaining frame 110 is shown that maximizes exposure of evaporative media pad(s) 112 to airflow. This internal retaining frame 110 may be used in either the first 50 or second 100 embodiment of evaporative cooler shown and described herein. Further, the internal retaining frame 110 optionally may include angled louvers 162 as shown in FIGS. 10, 11, and 19. In addition to the limitations discussed above, exposure of evaporative media pad to airflow is further limited in currently known evaporative coolers 10 by the way in which evaporative media pad are attached within the housing 12. For example, as shown in FIG. 22, evaporative media pads 22 in currently known evaporative coolers 10 are attached directly to an inner surface of the housing 12 (or, put another way, the retaining frame 20 defines the sides 14 of the housing 12). As a result of this configuration, the evaporative media pads 22 do not extend below the sides 14 of the housing 12 down into the reservoir 18, where the evaporative media pads 22 would be in contact with water within the reservoir 18. Additionally, even if a portion of the evaporative media pads 22 did extend below the sides of the housing, the lack of airflow holes in the reservoir 18 of the housing 12 means that such a portion would not be exposed to airflow, since the evaporative media pads 22 are attached directly to the housing 12. Thus, this gap 34 between the bottom of the evaporative media pads 22 and the bottom of the reservoir 18 represents wasted space that produces no cooling effect.

In contrast, the internal retaining frame 110 of the present disclosure is configured to allow the evaporative media pad(s) 112 to extend to the bottom of the reservoir 108 and also to expose the evaporative media pad(s) 112 to airflow. In particular, the internal retaining frame 110 is configured to position the evaporative media pad(s) 112 a distance from the inner surface of the sides 14 of the housing 104 such that the evaporative media pad(s) 112 are not only not directly coupled to the inner surface of the housing 104, but there is also a gap 166 between the inner surface of the side surfaces 116 of the housing 104 and the evaporative media pad(s) 112 through which air may circulate. For example, in this configuration the evaporative media pad(s) 112 may be exposed to a greater amount of airflow than in currently known evaporative coolers. In one non-limiting example, the evaporative media pad(s) 112 may be exposed to airflow entering the evaporative cooler through the plurality of airflow inlets 118 in the top surface 114 and/or plurality of airflow inlets 118 and/or other airflow inlets 164 in at least one of the side surfaces 116. In one embodiment, the gap 166 is approximately 30 mm. Additionally, the water surrounding a portion of the evaporative media pad(s) 112 creates a seal to prevent air bypass around the bottom of the evaporative media pad(s) 112 instead of through the evaporative media pad(s) 112, which would reduce evaporation of water within the evaporative media pad(s) 112 and, therefore, cooling capacity.

The internal retaining frame 110 is sized and configured to fit within the housing 104. In one embodiment, the internal retaining frame 110 includes four sides 168 that form a box configuration, each side 168 having a plurality of inner louvers 170, which may be angled. A first (or rear) side 168A of the internal retaining frame 110 and a second (or front) side 168B opposite the first side 168A of the internal retaining frame 110 each include a removable retaining frame component 172 for retaining the evaporative media pad(s) 112. The removable retaining frame components 172 include outer louvers 174, which may be angled. A third side 168C extending between the first 168A and second 168B sides and a fourth side 168D opposite the third side 168C and extending between the first 168A and second 168B sides each includes a border region 176. The border region 176 of each of the third 168C and fourth 168D sides includes one or more clips 178 or other components for retaining an evaporative media pad(s) 112 within the border region 176 and in contact with the inner louvers 170.

Figure 25:
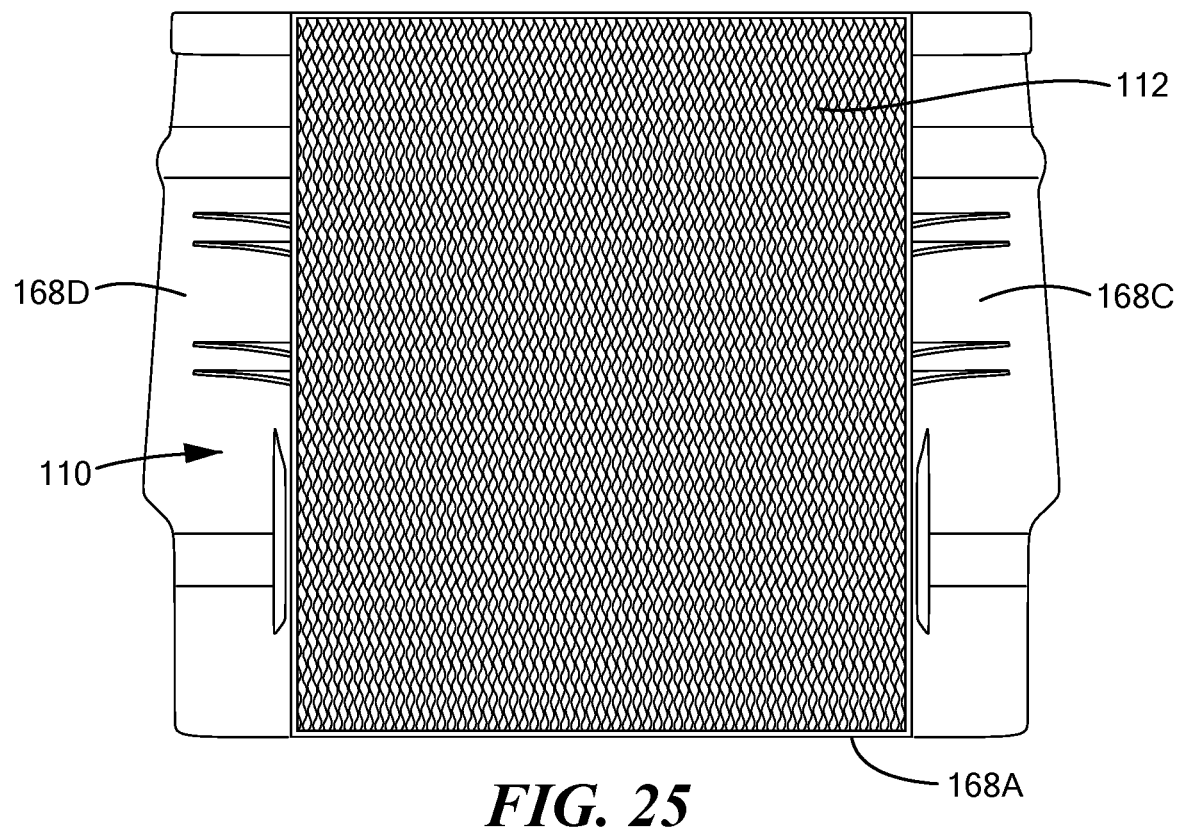
FIG. 25 shows an evaporative media pad partially retained within the internal retaining frame of FIG. 23 in accordance with the present disclosure.
Figure 26:
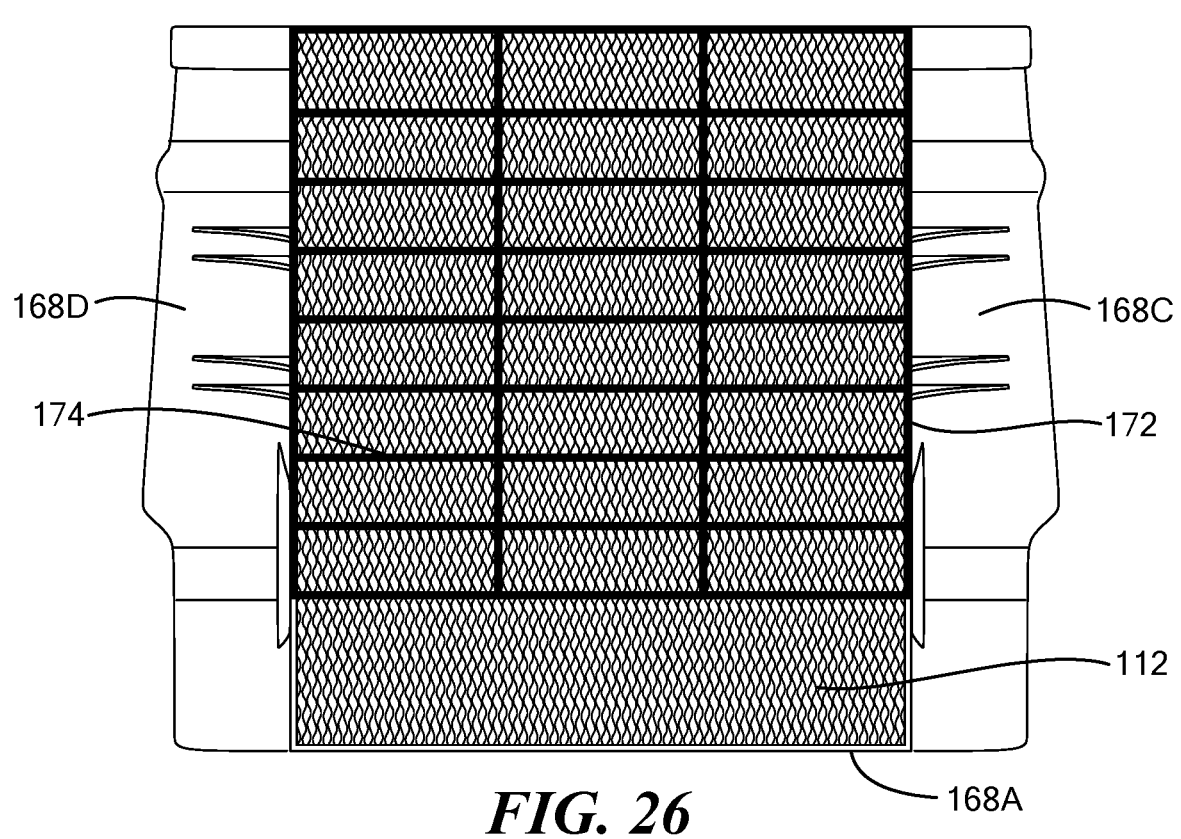
FIG. 26 shows an evaporative media pad fully retained within the internal retaining frame of FIG. 23 in accordance with the present disclosure.
Figure 27:
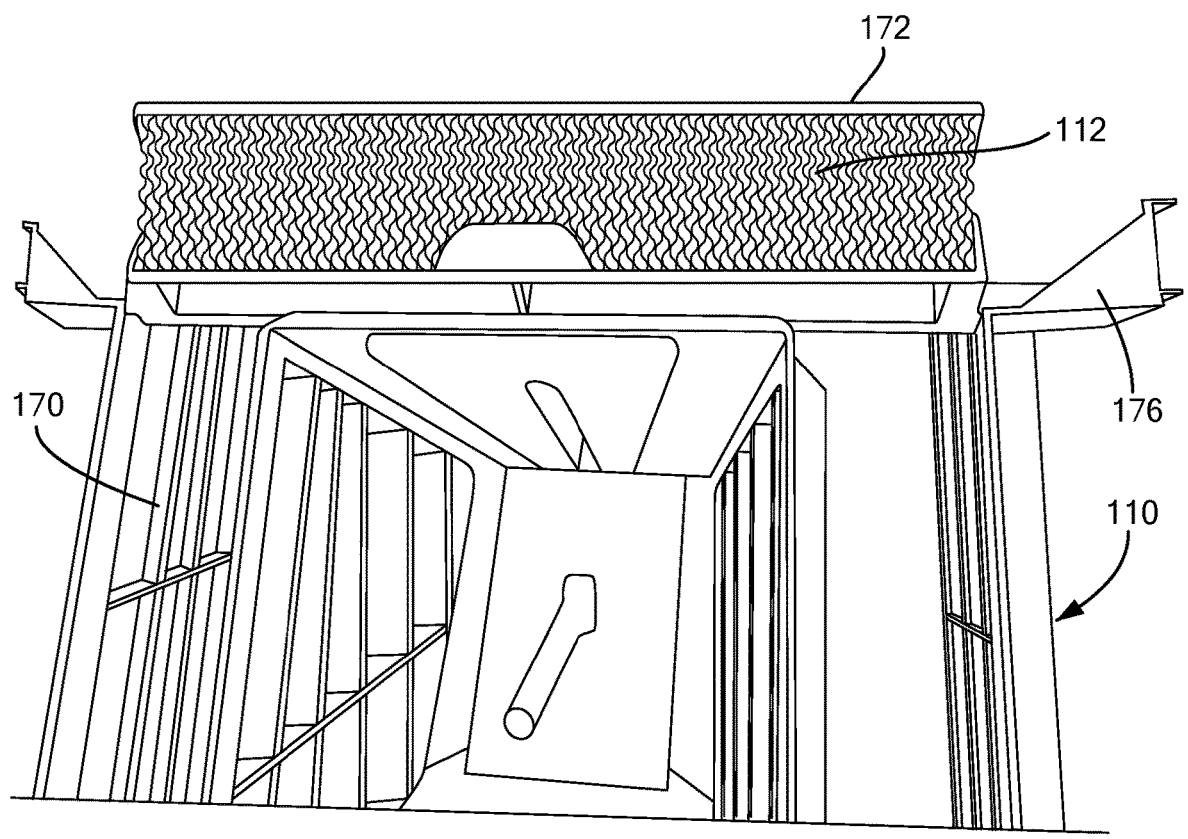
FIG. 27 shows a top view of an evaporative media pad fully retained within the internal retaining frame of FIG. 23 in accordance with the present disclosure.

FIGS. 25-27 illustrate an exemplary method of installing an evaporative media pad 112 to the first 168A and second 168B sides of the internal retaining frame 110. An evaporative media pad 112 may be placed on each of the first 168A and second 168B side of the internal retaining frame 110, with a first side of the evaporative media pad 112 being in contact with the inner louvers 170. Removable retaining frame components 172 are then positioned so that the outer louvers 174 are in contact with the second side of each the evaporative media pad 112, thereby sandwiching the evaporative media pads 112 between the first 168A and second 168B side of the internal retaining frame 110 and the removable retaining frame components 172. The removable retaining frame components 172 are configured to be removably attachable to the first 168A and second 168B sides of the internal retaining frame 110, such as by one or more clips, clamps, hinges, or other suitable mechanical couplings, thereby securing the evaporative media pad 112 within the internal retaining frame 110. An evaporative media pad 112 is then positioned within the border region of each of the third 168C and fourth 168D sides of the internal retaining frame 110, where the evaporative media pads 112 are secured by the clips 178 within the border regions 176. Additionally, if supplemental evaporative media pad(s) 112A are used, the internal retaining frame 110 also includes a central structure 180 for retaining the supplemental evaporative media pads 112A (for example, as shown in FIGS. 10 and 20).

Figure 28:
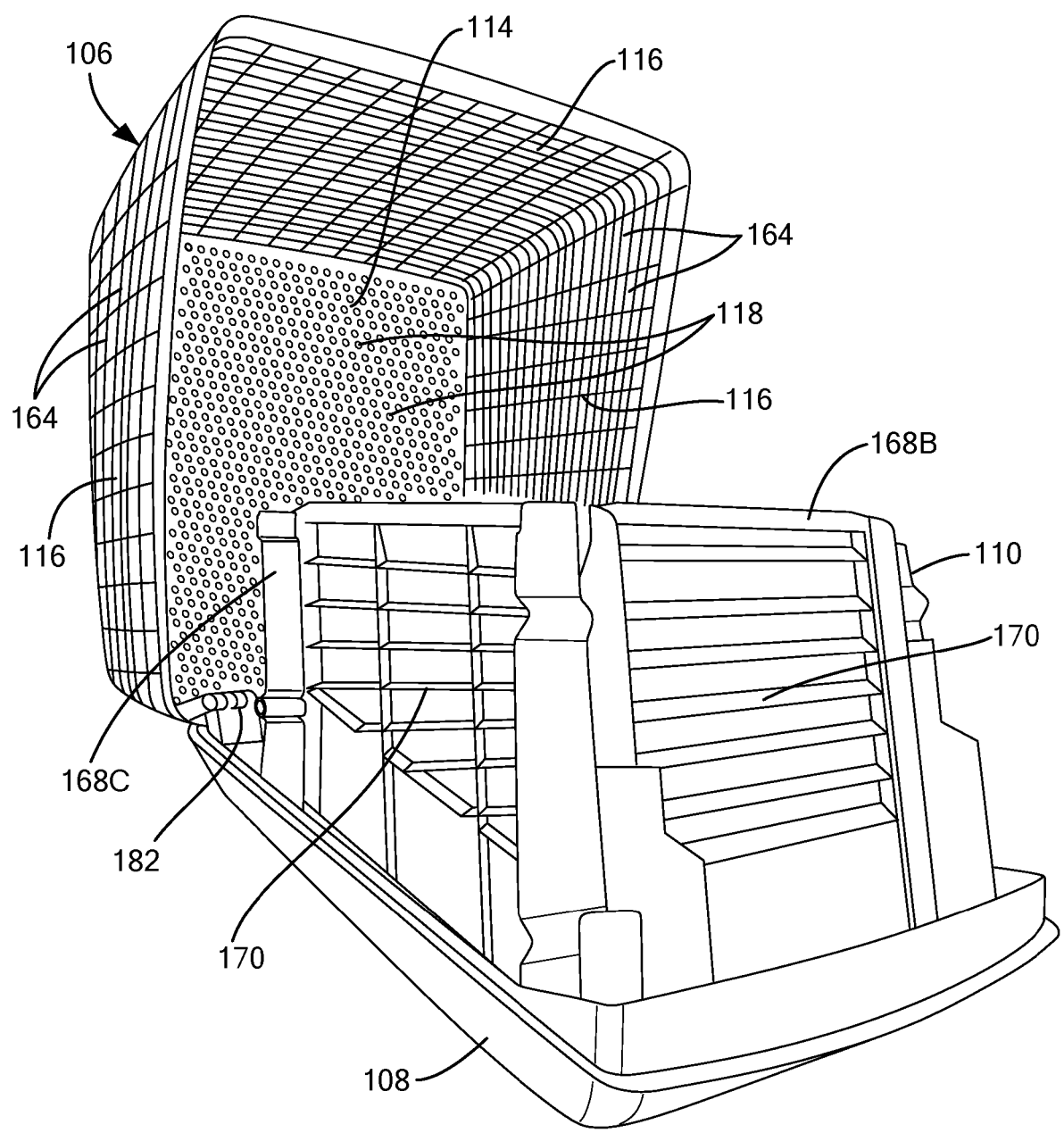
FIG. 28 shows the internal retaining frame of FIG. 23 within an evaporative cooler housing having a single-piece lid and the internal retaining frame of FIG. 23 in accordance with the present disclosure.

Thus, the evaporative media pad(s) 112 are securely positioned within the housing 104, but are not directly coupled to the housing 104. Consequently, a single-piece (unitary) housing lid 106 may be used, as shown in FIG. 28. In one embodiment, the single-piece housing lid 106 defines the top surface 114 and four side surfaces 116 of the housing 104 and is coupled to the reservoir 108 by one or more hinges, snaps, clamps, or other suitable connecting elements 182. In one non-limiting example, the lid 106 is hingedly connected to the reservoir 108 on one edge of the lid 106. Manufacture and assembly of a housing 104 with the single-piece housing lid 106 is less complex (for example, because a single-piece housing lid 106 does not require an evaporative pad retaining frame sub-assembly), reduces the number of housing components required, reduces weight and cost, and may provide aesthetic advantages over housings of currently known evaporative coolers 10. Further, the single-piece housing lid 106 may be perforated (may include a plurality of airflow inlets 118) to allow airflow downward through the housing lid, as discussed above.

As discussed above, advantageous features of the present disclosure, such as a pressurized water distribution system, internal retaining frame, perforated lid, and other features discussed herein, allows for an evaporative cooler having smaller dimensions, increased cooling capacity, and a more attractive appearance. To further enhance the aesthetics of the evaporative cooler, and to provide other advantages discussed below, the evaporative cooler may be configured to be mounted close to, and follow the contour of, a roof or other mounting surface.

Figure 29:
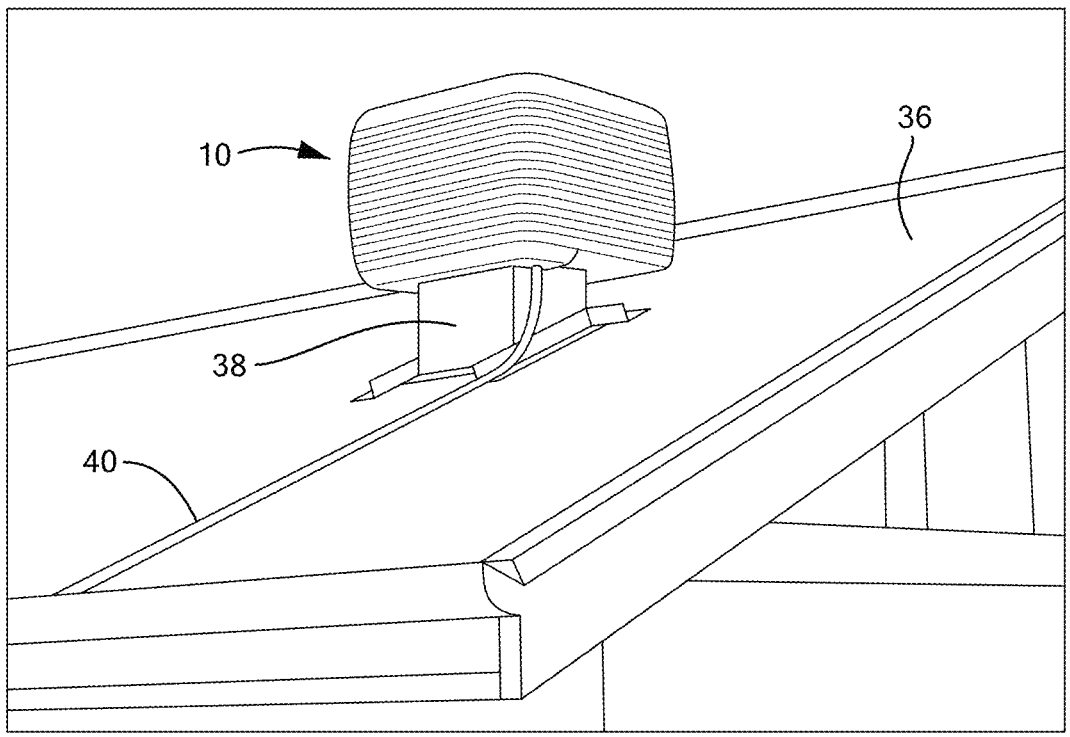
FIG. 29 shows a currently known evaporative cooler mounted on a roof.
Figure 30:
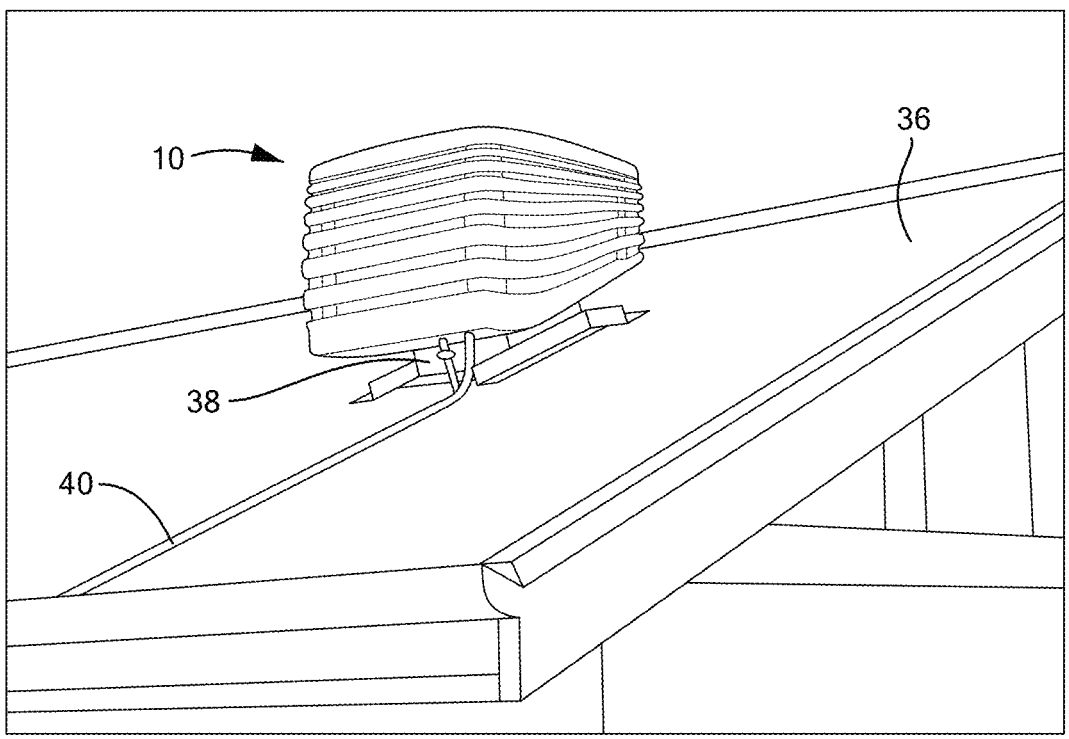
FIG. 30 shows a further currently known evaporative cooler mounted on a roof.

Referring to FIGS. 29 and 30, currently known evaporative coolers 10 are shown mounted to a roof 36. Each of these currently known evaporative coolers 10 is mounted a distance from the roof 36, exposing the roof jack, ductwork, and/or dropper 38. Such mounting is required for currently known evaporative coolers, as the evaporative media pad(s) 22 must be in a vertical position (that is, in a position that is parallel to, or at an angle of 0°) relative to the direction of gravitational flow of water from the gravity distribution element. To achieve even distribution of water onto the evaporative media pad(s) 22, the currently known evaporative cooler 10 must be mounted such that the lid 16 is horizontal. Although some currently known evaporative coolers 10, such as that shown in FIG. 30, include an angled reservoir 18 that comes closer to matching the contour of the roof 36, they still have an angular/boxy appearance and exposed ductwork and/or dropper 38. Additionally, electrical and plumbing conduits 40 to the currently known evaporative coolers 10 run on the outside of the roof 36, which is unattractive and exposes the conduits 40 to weather and damage.

Figure 31:
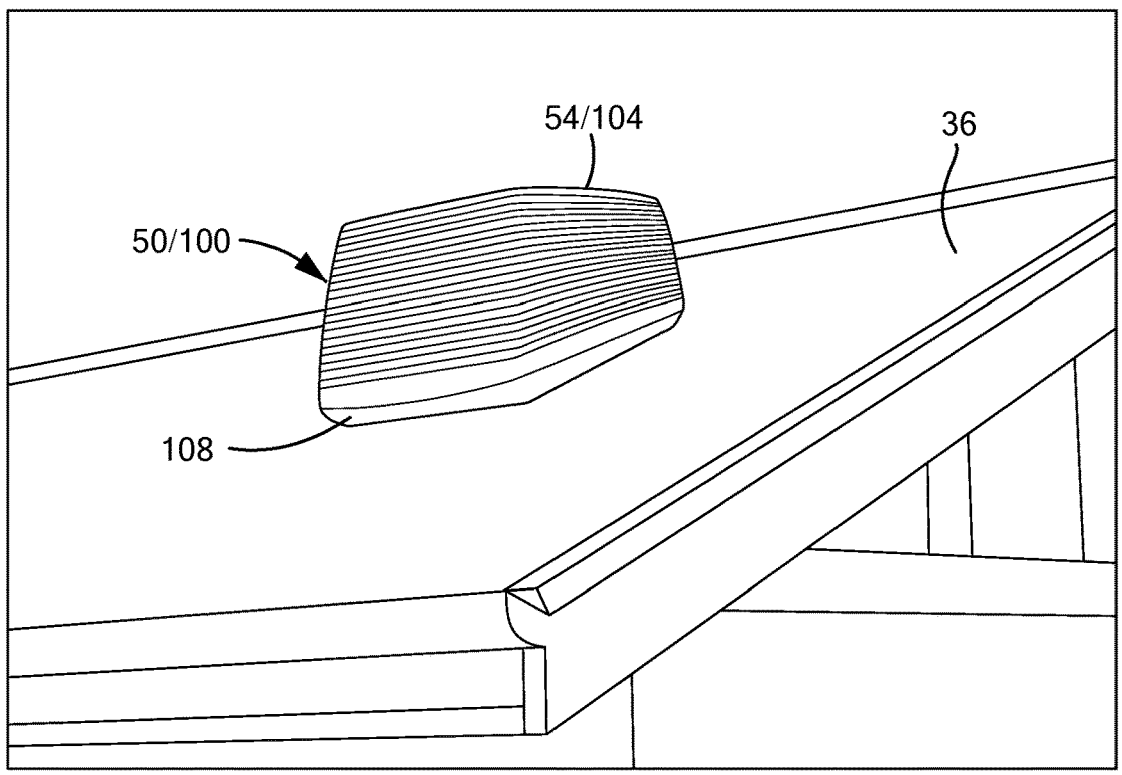
FIG. 31 shows an evaporative cooler of the present disclosure mounted on a roof.
Figure 32:
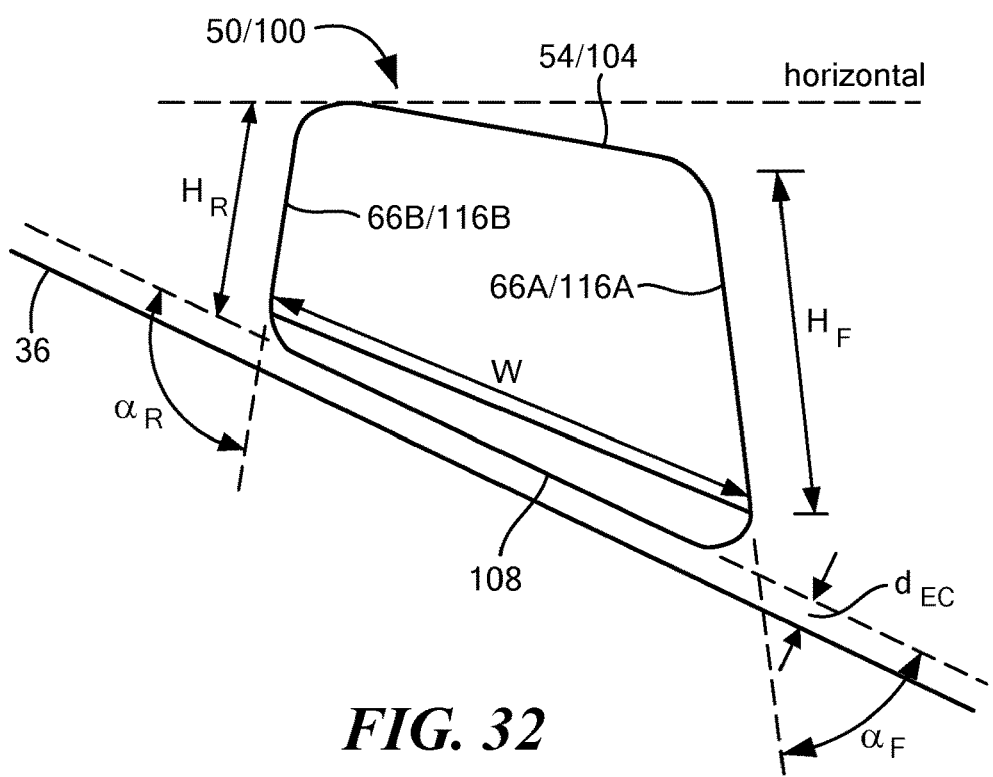
FIG. 32 shows a schematic view of an evaporative cooler of the present disclosure mounted on a roof.

Referring now to FIGS. 31 and 32, an evaporative cooler 50/100 of the present disclosure is shown that has a low profile and follows the contour of the roof 36 on which it is mounted. Put another way, in some embodiments the evaporative cooler 50/100 is positioned relative to the roof 36 (or other surface) such that an observer on the ground perceives no or little distance between the evaporative cooler 50/100 and the roof 36, thereby giving the evaporative cooler 50/100 an unobtrusive and visually appealing appearance. As discussed above, use of a pressurized water distribution system 52/102 allows the evaporative cooler 50/100 to be installed at angles of up to between approximately 5° and approximately 45° from horizontal and still allow for even distribution of water over the evaporative media pads 62/112 within. In one embodiment, the evaporative cooler 50/100 is mounted to the roof 36 of a building or structure using a dropper 184, such as a dropper 184 shown in FIG. 33. The dropper 184 simplifies installation and automatically levels the evaporative cooler 50/100 for even water distribution onto the evaporative media pad(s) 62/112. Further, in some embodiments the evaporative cooler 50/100 is positioned relative to the roof 36 such no part of the dropper 184 is visible to an observer on the ground.

In one embodiment, the dropper 184 is configured to position the evaporative cooler 50/100, when mounted to the dropper 184, such that the entire bottom of the evaporative cooler 50/100 (bottom of the reservoir 58/108) is parallel to and separated by a predetermined distance from the planar roof 36 or top surface of the building/structure. In one embodiment, the predetermined distance is approximately 0 mm to approximately 50 mm. In one embodiment, the predetermined distance is no more than 40 mm. In one embodiment, the predetermined distance is no more than 25 mm. In one embodiment, the predetermined distance is no more than 10 mm. In one embodiment, the predetermined distance is between approximately 10 mm and approximately 40 mm. In one embodiment, the predetermined distance is between approximately 20 mm and approximately 30 mm. In one embodiment, the predetermined distance is between approximately 5 mm and approximately 10 mm.

For simplicity of illustration, the evaporative cooler 50/100 is referred to herein as being mounted to a roof 36 of a building, regardless of the actual surface and/or structure to which the evaporative cooler is mounted. Further, it will be understood that if the portion of the roof 36 directly beneath the evaporative cooler 50/100 is not a planar surface, the dropper 184 is configured to position the entire bottom of the evaporative cooler 50/100 at the predetermined distance from the plane in which the portion of the roof 36 lies. In one embodiment, the predetermined distance is approximately 0 mm to approximately 50 mm. In one embodiment, the predetermined distance is no more than 40 mm. In one embodiment, the predetermined distance is no more than 25 mm. In one embodiment, the predetermined distance is no more than 10 mm. In one embodiment, the predetermined distance is between approximately 10 mm and approximately 40 mm. In one embodiment, the predetermined distance is between approximately 20 mm and approximately 30 mm. In one embodiment, the predetermined distance is between approximately 5 mm and approximately 10 mm The predetermined distance between the bottom of the evaporative cooler 50/100 and the roof 36 and/or the mounting angle of the evaporative cooler 50/100 may be determined at least in part by the dimensions and configuration of the housing 54/104. For example, the housing 54/104 may include at least a front height $H_F$, a rear height $H_R$, a bottom width W, an angle $\alpha_R$ between the rear surface 66B/116B and the plane of the roof 36, and an angle $\alpha_F$ between the front surface 66A/116A and the plane of the roof 36 (as shown in FIG. 32). In one non-limiting example, the rear surface 66A/116A of the evaporative cooler housing 54/104 may have a height $H_R$ of approximately 475 mm, the front surface 66A/116A of the evaporative cooler housing 54/104 may have a height $H_F$ of approximately 815 mm, and the bottom surface of the evaporative cooler (the bottom surface of the reservoir 58/108) may have a width W of approximately 1500 mm. Further, the dropper 184 may be further configured to position the evaporative cooler 50/100 such that the entire bottom surface of the evaporative cooler is a distance of approximately 0 mm to approximately 50 mm from the plane of the roof 36 surface, with the rear surface 66B/116B of the evaporative cooler 50/100 lying in a plane that is oriented at an angle $\alpha_R$ of approximately 102° (±5°) from the plane of the roof 36 and the front surface 66A/116A of the evaporative cooler 50/100 lying in a plane that is oriented at an angle $\alpha_F$ of approximately 60° (±5°) from the plane of the roof 36. However, it will be understood that the predetermined distance may have another suitable value, such as no more than 40 mm; no more than 25 mm; no more than 10 mm; between approximately 10 mm and approximately 40 mm; between approximately 20 mm and approximately 30 mm; and between approximately 5 mm and approximately 10 mm. This low-profile configuration of the mounted evaporative cooler 50/100 may provide a better visual appearance than configurations of mounted currently known evaporative coolers 10. Further, the pressurized water distribution system 52/102 within the evaporative cooler 50/100 will still provide even water distribution to the evaporative media pad(s) 62/112, even when the roof is pitched by an angle of up to approximately 45° form horizontal.

In another embodiment, the dropper 184 is configured to position the evaporative cooler 50/100, when mounted to the dropper 184, such that the bottom surface of the evaporative cooler (the bottom surface of the reservoir 58/108) is a varying distance from the roof 36 (that is, the bottom surface of the evaporative cooler is not parallel to the roof 36), as may be required for roofs having a very steep pitch (such as greater than approximately 45° from horizontal) to maintain even water distribution onto the evaporative media pads 62/112. For example, the bottom surface of the evaporative cooler proximate the rear surface 66B/116B may be approximately 0 mm to approximately 50 mm from the roof 36 surface, whereas the bottom surface of the evaporative cooler proximate the front surface 66A/116A may be approximately 0 mm to approximately 50 mm from the roof 36 surface.

To further enhance the visual appearance of the mounted evaporative cooler 50/100, the reservoir 58/108 of the housing 54/104 is, in some embodiments, darker than the housing lid 56/106 to provide visual separation. Further, the housing 54/104 and/or housing lid 56/106 (for example, if the housing lid 56/106 is a single-piece lid that defines the sides and top of the housing 54/104) may be constructed so that no visible surface is parallel to the roof 36 and/or roof features.

Figure 33:
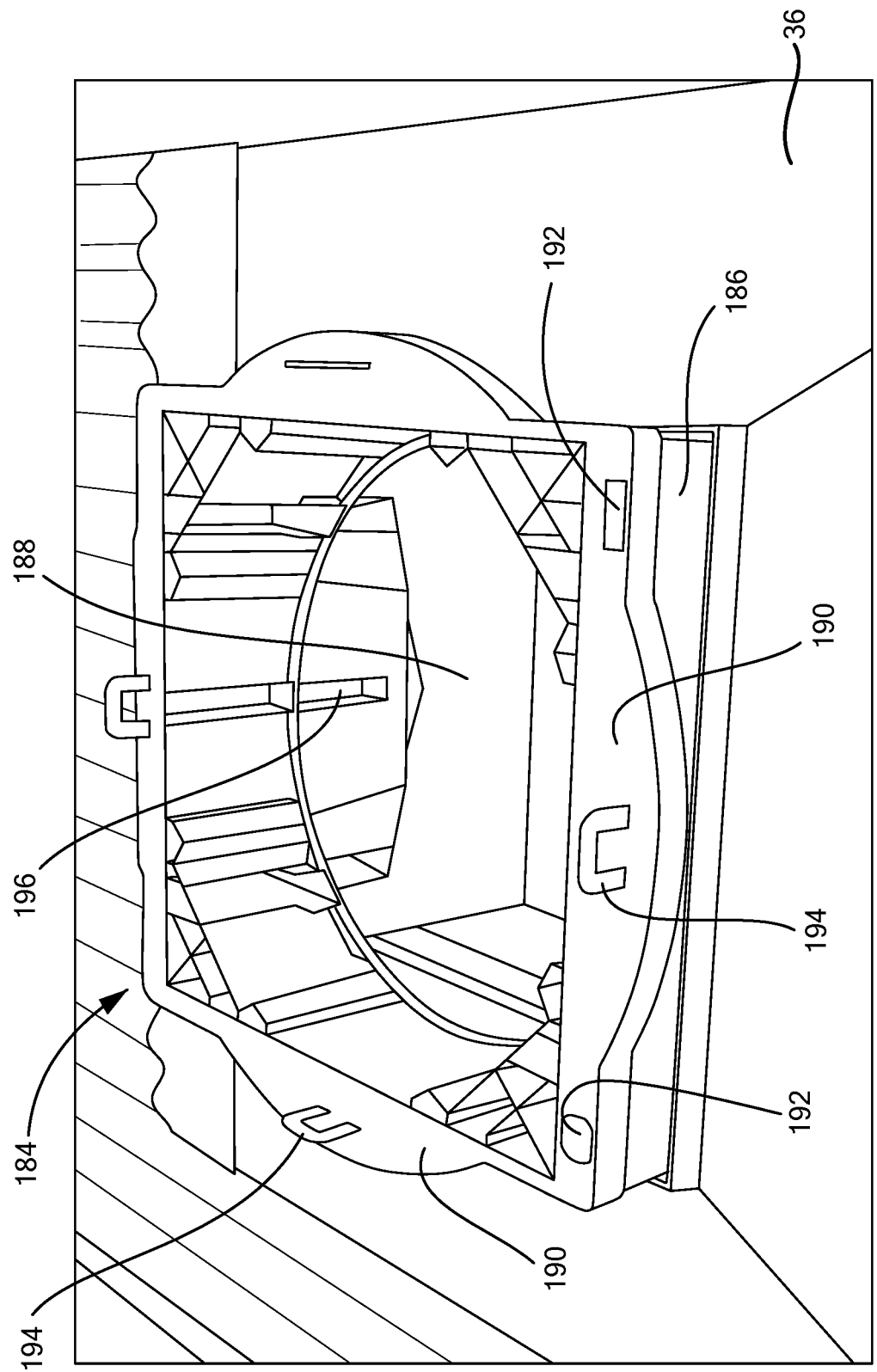
FIG. 33 shows a dropper for an evaporative cooler of the present disclosure.

As shown in FIG. 33, the dropper 184 is sized and configured to fit within an opening in the roof 36 and to be attached thereto. The dropper 184 generally includes a neck portion 186 defining an aperture 188, a mounting surface 190 at a first end (an end of the dropper that extends above the roof 36), one or more conduit apertures 192, and one or more mounting elements 194 in, on, or integrated with the mounting surface 190. The neck portion 186 may have a circular, square, rectangular, or other cross-sectional shape. In one embodiment, the neck portion 186 is configured to extend above the roof 36 by approximately 0 mm to approximately 50 mm around an entire circumference or perimeter of the neck portion 186. In another embodiment, the neck portion 186 is configured to extend from the roof 36 by varying distances around the circumference or perimeter of the neck portion 186, to allow the lid 56/106 of the evaporative cooler 50/100, when mounted to the dropper, to be maintained at an angle of between approximately 0° and approximately 45° from horizontal, regardless of the pitch of the roof 36.

The mounting surface 190 may be a flange or flat surface extending outward from (or orthogonal to) the neck portion 186, providing a surface on which the bottom surface of the evaporative cooler housing 54/104 may be supported. The mounting surface 190 includes one or more mounting elements 194 for securely but removably coupling the evaporative cooler 50/100 to the dropper 184 and, thereby, the roof. In one embodiment, the mounting surface 190 includes a plurality of mounting elements 194 that extend upward from the mounting surface 190 (that is, that extend toward the bottom surface of the evaporative cooler housing). Although not shown, the bottom surface and/or the side surfaces of the evaporative cooler housing may include a plurality of corresponding mounting elements that are configured to lockingly engage with the plurality of mounting elements 194 on the mounting surface 190. These engageable mounting elements 194 simplify installation and removal of the evaporative cooler 50/100 by enabling quick and easy coupling and uncoupling of the evaporative cooler 50/100 to the dropper 184.

When installing the evaporative cooler 50/100, the electrical and plumbing conduits may be fed through the conduit apertures 192 in the dropper 184 from within the building or structure to the evaporative cooler 50/100. Passing these conduits through the dropper 184 to the evaporative cooler 50/100 eliminates the need to pass the conduits to the evaporative cooler 50/100 on the surface of the roof 36 and outside the building or structure, which can not only greatly enhance the visual appearance of the mounted evaporative cooler 50/100, but also reduce or prevent damage to the conduits by weather and other hazards. The neck portion 186 further includes a second end opposite the first end, which is configured to be in communication with or coupled to internal ductwork within the building or structure. The neck portion 186 further includes one or more securing points 196 for securing the dropper 184 to the building or structure.

Figure 34:
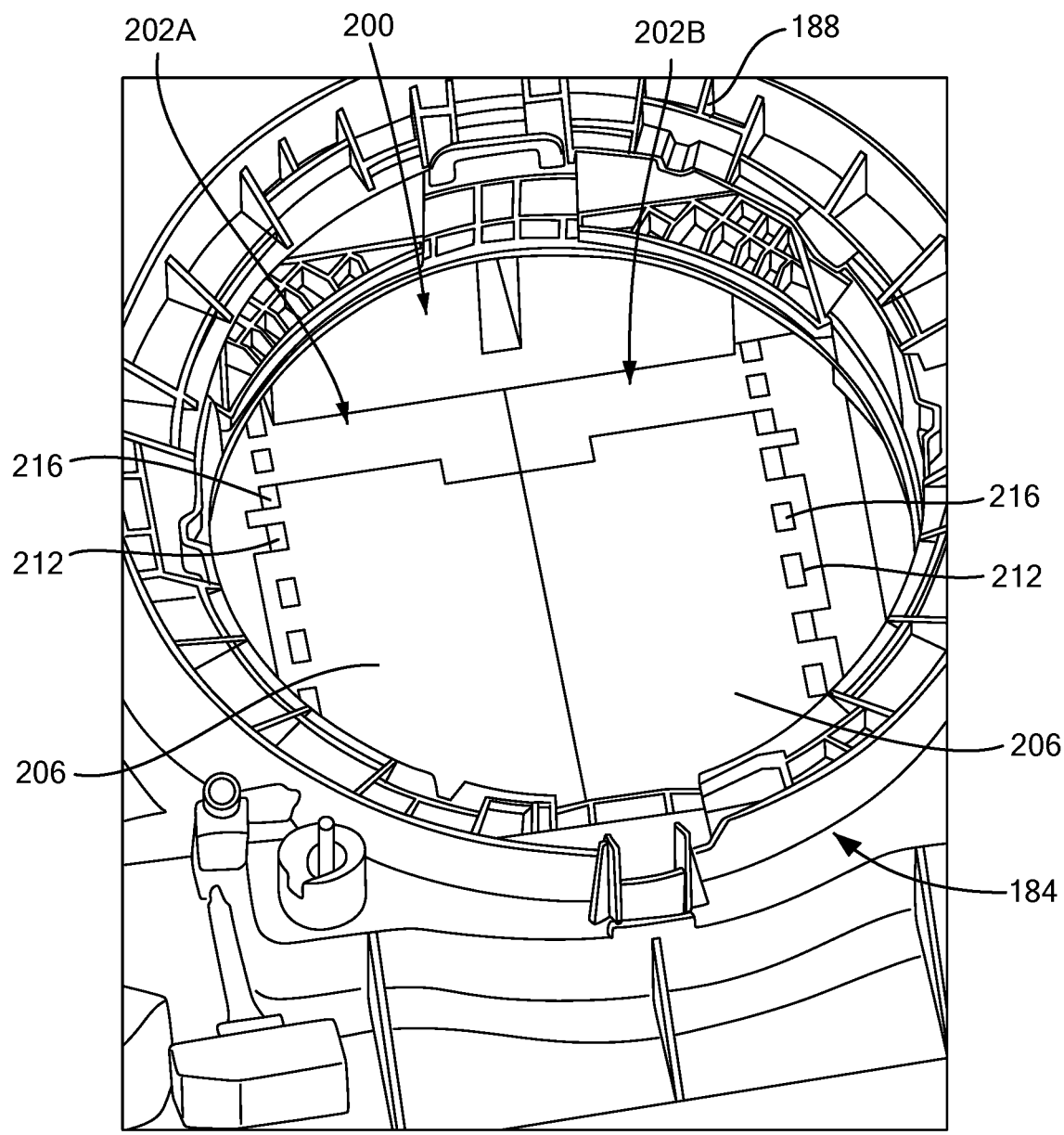
FIGS. 34 and 34A show a weatherproof sealing assembly in a closed position in accordance with the present disclosure.
Figure 34A:
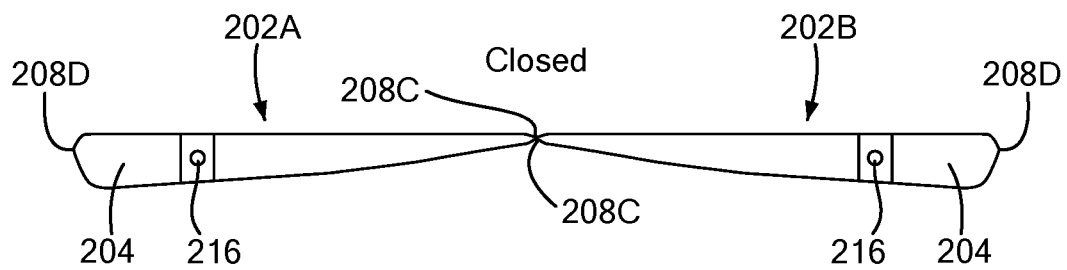
Figure 36:
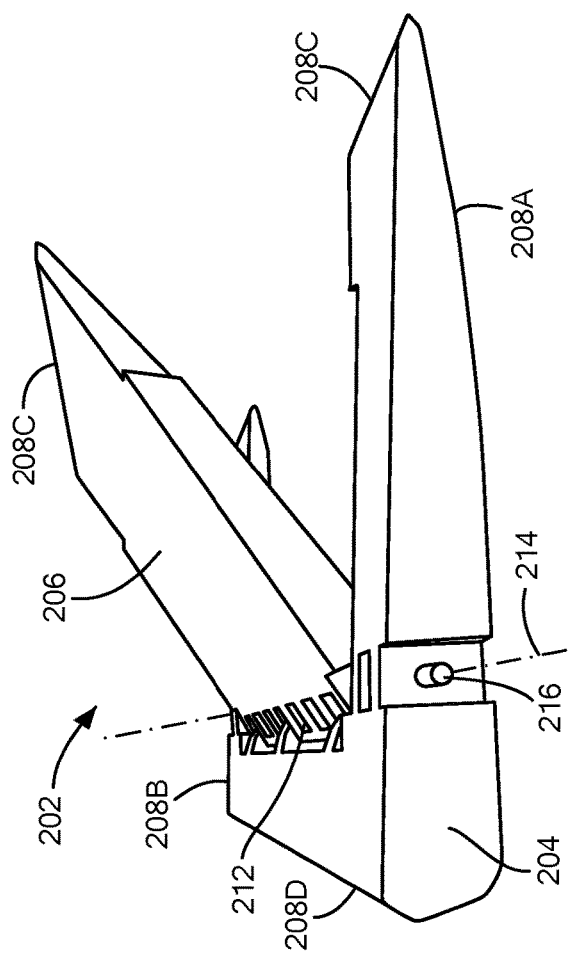
FIG. 36 shows the flap assembly of the weatherproof sealing assembly of FIG. 34 in an open position in accordance with the present disclosure.
Figure 36A:
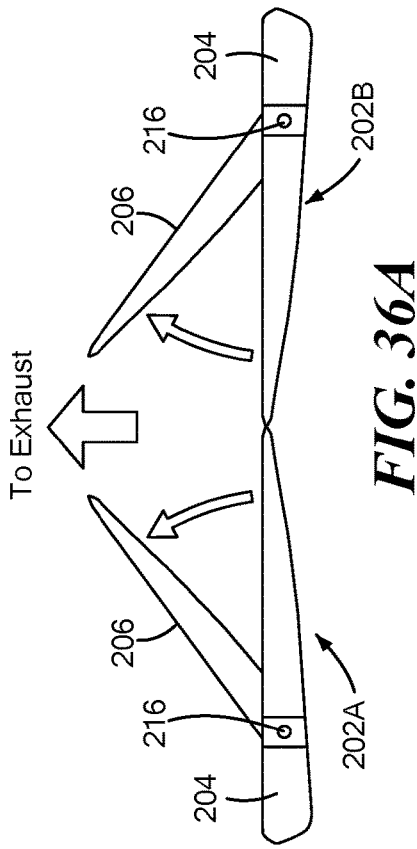
FIG. 36A shows a side view of the weatherproof sealing assembly in a second open position in accordance with the present disclosure.
Figure 35:
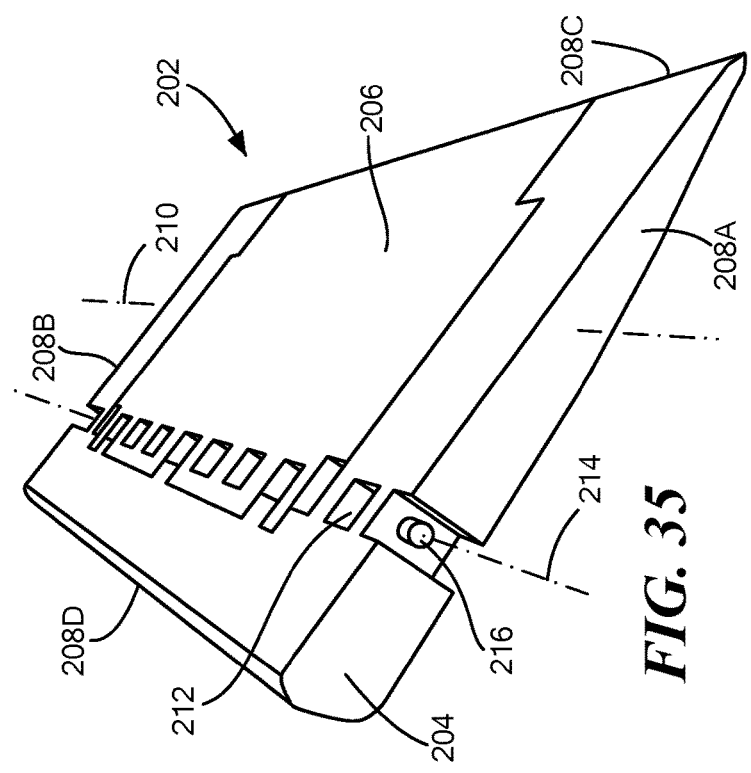
FIG. 35 shows a flap assembly of the weatherproof sealing assembly of FIG. 34 in a first closed position in accordance with the present disclosure.
Figure 35A:
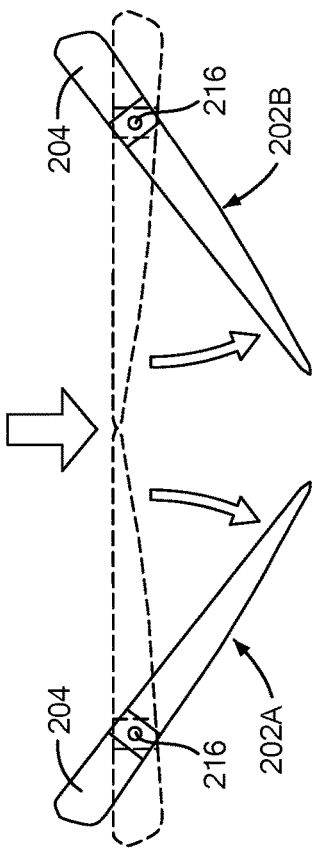
FIG. 35A shows a side view of the weatherproof sealing assembly in a first open position in accordance with the present disclosure.

Referring now to FIGS. 34-36A, a weatherproof sealing assembly 200 for an evaporative cooler is shown. In one embodiment, the weatherproof sealing assembly 200 may be used with an evaporative cooler 50/100 such as those described herein. The weatherproof sealing assembly 200 generally includes at least one flap assembly 202. FIG. 34 shows a weatherproof sealing assembly 200 positioned within a dropper 184 (for example, 184, the dropper shown in FIG. 33), as viewed through the aperture 188, with the weatherproof sealing assembly 200 being in a closed position. FIG. 34A shows a side view of the weatherproof sealing assembly in the closed position. FIG. 35 shows a flap assembly 202 in a first open position and FIG. 35A shows a side view of the weatherproof sealing assembly 200 in the first open position. FIG. 36 shows the flap assembly 202 in a second open position and FIG. 36A shows a side view of the weatherproof sealing assembly 200 in the second open position.

Continuing to refer to FIGS. 34-36A, in one embodiment the weatherproof sealing assembly 200 includes a first flap assembly 202A and a second flap assembly 202B, and the first and second flap assemblies 202A, 202B are secured within the dropper 184 such that the weatherproof sealing assembly 200 spans at least one aperture of the dropper 184 and the first and second flap assemblies 202A, 202B are in contact with each other to prevent the flow of air or liquid therethrough when the weatherproof sealing assembly 200 is in a closed position. In one embodiment, in the closed position the weatherproof sealing assembly 200 lies in a plane that is orthogonal to the longitudinal axis of the dropper 184 (as shown in FIG. 34A). In another embodiment, the weatherproof sealing assembly 200 lies in a plane that is parallel or at least substantially parallel to the area of the roof 36 to which the dropper 184 and evaporative cooler 50/100 are attached. In one non-limiting example, the weatherproof sealing assembly 200 may be in the closed position when the fan 120 is off and the evaporative cooler 50/100 is not in use. As is discussed in greater detail below, the weatherproof sealing assembly 200 is transitionable between any of the closed position (shown in FIGS. 34 and 34A), the first open position (shown in FIGS. 35 and 35A), and the second open position (shown in FIGS. 36 and 36A), depending on the state of operation of the evaporative cooler 50/100. For example, when the state of operation of the evaporative cooler 50/100 is a normal mode, that is, the fan 120 operates in a first or forward direction to draw air into the evaporative cooler 50/100 and pass the air into the building to which the evaporative cooler 50/100 is attached, the flap assemblies 202A, 202B are in the first open position so the air can pass therethrough in the direction indicated by the large open arrow in the center of FIG. 35A. Further, when the state of operation of the evaporative cooler 50/100 is reverse mode, that is, the fan 120 operates in a second or reverse direction to draw air from the building and out of the evaporative cooler 50/100, the flap assemblies 202A, 202B are in the second open position so the air can pass therethrough in the direction indicated by the large open arrow in the center of FIG. 36A.

In one embodiment, each flap assembly 202 includes a frame portion 204 hingedly connected to the dropper 184 (or other component of the evaporative cooler 50/100 and/or the building to which the evaporative cooler 50/100 is attached) and a flap 206 hingedly connected to the frame portion 204.

In one non-limiting example, the flap assembly 202 has a generally rectangular shape with four edges 208A-208D and a longitudinal axis 210, and the flap 206 defines at least one edge 208C of the flap assembly 202 when the flap assembly 202 is in the closed position or the first open position. Further, in one embodiment the frame portion 204 and the flap 206 each define at least one conduit (in one embodiment, at least one tubular conduit) such that the frame portion 204 and the flap 206 together define a tubular rod conduit 212 extending along an axis (referred to herein as the axis of rotation 214) parallel to the longitudinal axis 210 of the flap assembly 202 from a first edge 208A to an opposite second edge 208B. In one embodiment, the rod conduit 212 has a circular, or at least substantially circular, cross-sectional shape and extends through the flap 206 at an eccentric or off-center location. To assemble the flap assembly 202, a rod 216 is inserted into the rod conduit 212, thereby coupling the flap 206 to the frame portion 204 and the frame portion 204 to the dropper 184, with the frame portion 204 and the flap 206 each being independently rotatable about the axis of rotation 214 relative to the dropper 184 and to each other. When the weatherproof sealing assembly 200 is assembled, the axis of rotation of the first flap assembly 202A and the axis of rotation of the second flap assembly 202B are parallel or at least substantially parallel. In one embodiment, each flap assembly 202 has a tapered cross-sectional shape, with the narrower end including at least a portion of the flap 206 and at least a portion of the frame portion 204 and the thicker end including only the frame portion 204. However, it will be understood that the weatherproof sealing assembly 200, flap assemblies 202, and/or flaps 206 may have any size, shape, or configuration that allows the flaps 206 to be transitionable between the open positions and the closed position and that, when the flaps 206 are in a closed position, allows the weatherproof sealing assembly 200 to prevent the passage of water and debris through the dropper 184 and into the building, and that, when the flaps 206 are in the first or second open position, allows the weatherproof sealing assembly 200 to allow air to pass therethrough in either direction.

Continuing to refer to FIGS. 34-36, both the frame portion 204 and the flap 206 are independently rotatable relative to each other and relative to the dropper 184. In one embodiment the weatherproof sealing assembly 200 is coupled to the dropper 184 at a location that is inside the dropper, such as within the neck portion 186 at a location that is at or proximate the aperture 188 below the fan 120 when the evaporative cooler 50/100 is installed on a roof of a building. When installed into the dropper 184, the weatherproof sealing assembly 200 extends across an entirety, or substantially an entirety, of an inner diameter of the dropper 184, and with the edges 208C of each flap assembly 202 being adjacent or in contact with each other. When the flaps 206 are in the closed position (shown in FIG. 34), the frame portions 204 and the flaps 206 of the first and second flap assemblies 202A, 202B are coplanar or at least substantially coplanar to prevent water and debris from passing through the dropper 184 and into the building to which the evaporative cooler is attached. When the frame portions 204 and/or the flaps 206 are in an open position (shown in FIGS. 35 and 36), the weatherproof sealing assembly 200 defines an opening and the frame portion 204 and the flaps 206 are not coplanar. Thus, each flap assembly may be said to have a "flap within a flap" configuration.

Continuing to refer to FIGS. 34-36, if the evaporative cooler 50/100 is operated in a normal mode, the flap assemblies 202A, 202B are rotated about the axis of rotation 214 downward (toward the building and away from the housing 54/104) relative to the plane in which the flap assemblies 202A, 202B lie when the weatherproof sealing assembly 200 is in the closed position, as indicated by the smaller open arrows in FIG. 35A. Put another way, the frame portion 204 and the flap 206 of each flap assembly 202 are coplanar and rotated together as a single unit about the axis of rotation 214 to create an aperture through which air, such as air cooled by the evaporative cooler 50/100 may be drawn downward and into the building. Each flap assembly 202 is rotated relative to the plane in which the flap assembly 202 lies when in the closed position. Further, when the evaporative cooler 50/100 is operated in the normal mode, the first flap assembly 202A and the second flap assembly 202B are angled relative to each other and are not coplanar.

If the evaporative cooler 50/100 is operated in a reverse mode, the frame portion 204 and the flap 206 of each flap assembly 202 are rotated independently of each other. In the reverse mode, the flap assemblies 202A, 202B are positioned such that the frame portions 204 of the flap assemblies 202A, 202B are aligned (that is, are coplanar or at least substantially coplanar), but the flaps 206 are not coplanar with each other. Instead, the flaps 206 are rotated about the axis of rotation 214 so the flaps 206 open upward relative to the frame assemblies 204 away from the building toward the housing 54/104 to create an aperture though which air, such as warm air from the building and/or the building's ductwork, may be drawn from the building and expelled or exhausted from the evaporative cooler 50/100. Put another way, the flaps 206 are rotated relative to the plane in which the frame portions 204 lie. Thus, unlike currently known weatherproof flashing, the weatherproof sealing assembly 200 of the present disclosure advantageously allows for airflow both from and to the building to which the evaporative cooler 50/100 is attached. When the fan 120 of the evaporative cooler 50/100 is operated in a reverse mode, warm air is drawn from the building and the exhausted air may also advantageously blow leaves and other debris from the outer surface of the evaporative cooler, both of which features may help increase the life of the evaporative cooler 50/100 and improve overall cooling efficiency.

In one embodiment, the rod 216 in each flap assembly 202 are operatively coupled to an actuation mechanism within or coupled to the dropper 184. Actuation of the actuation mechanism, such as by a remote control, causes the frame portions 204 and/or the flaps 206 to rotate about the axis of rotation 214, thereby opening the weatherproof sealing assembly 200 to allow air to pass therethrough. In one non-limiting example, the weatherproof sealing assembly 200 may be transitioned to the first and/or second open position by the actuation mechanism when the fan 120 is operated in either the normal mode or the reverse mode. Additionally or alternatively, the frame portions 204 and/or the flaps 206 may be passively transitioned between the closed and open positions by the force of normal or reverse air flow. For example, in one embodiment the frame portion 204 of the flap assembly 202 is weighted such that it is biased toward the closed position. When the fan 120 is off and no air is flowing through the weatherproof sealing assembly 200. Air flowing in the normal direction may then easily cause the weighted frame portions 204 of the flap assemblies 202 to open downward (as shown in FIG. 35A), and the flaps 206 move likewise to follow the frame portions 204. Similarly, air flowing in the reverse direction may not be enough to overcome the weighted bias of the frame portions 204 in the opposite direction, but is enough to cause the unweighted flaps 206 to move with the flow of air to open upward (as shown in FIG. 36A).

Figure 37:
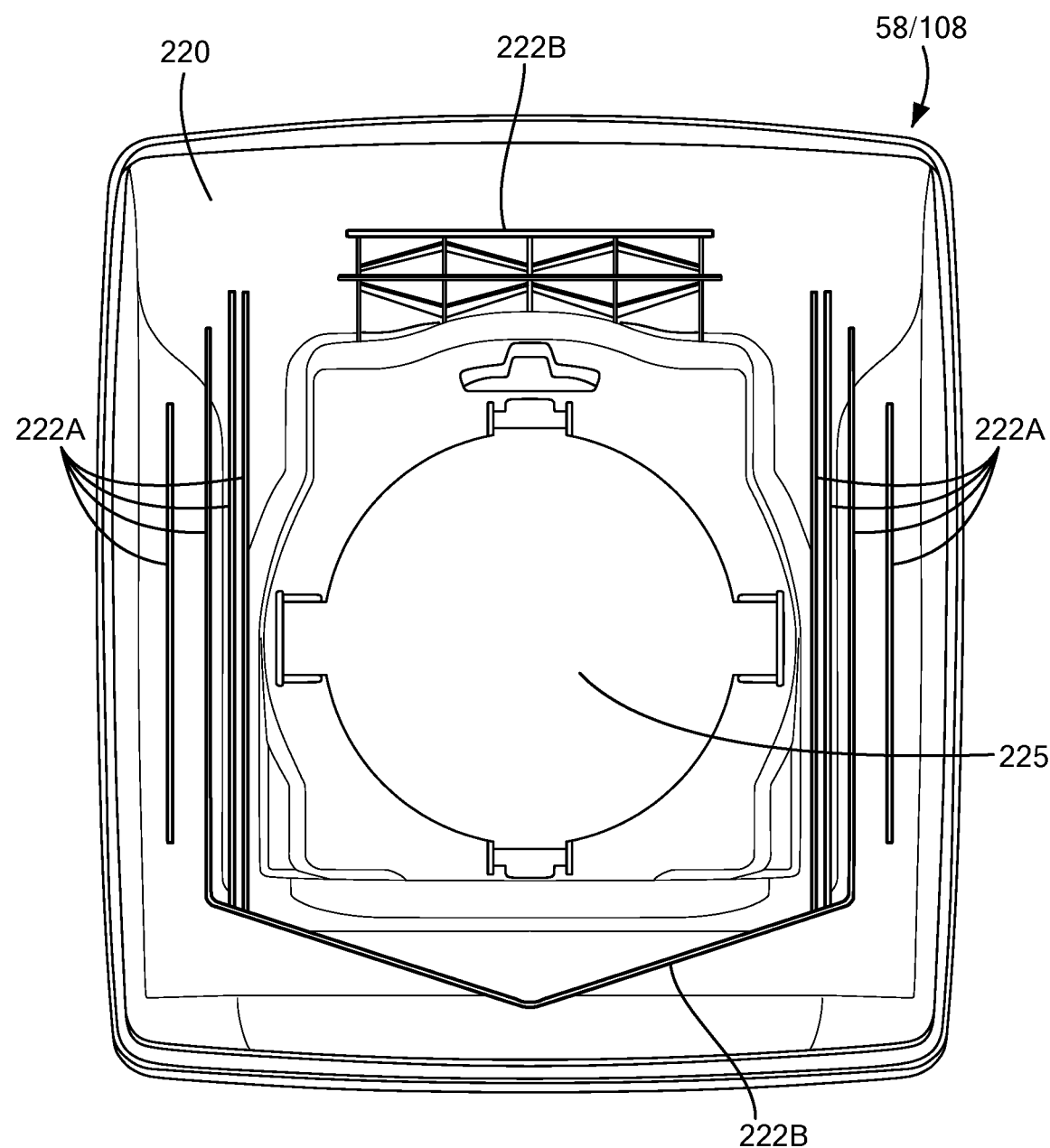
FIG. 37 shows a bottom surface of a reservoir of an evaporative cooler of the present disclosure.
Figure 38:
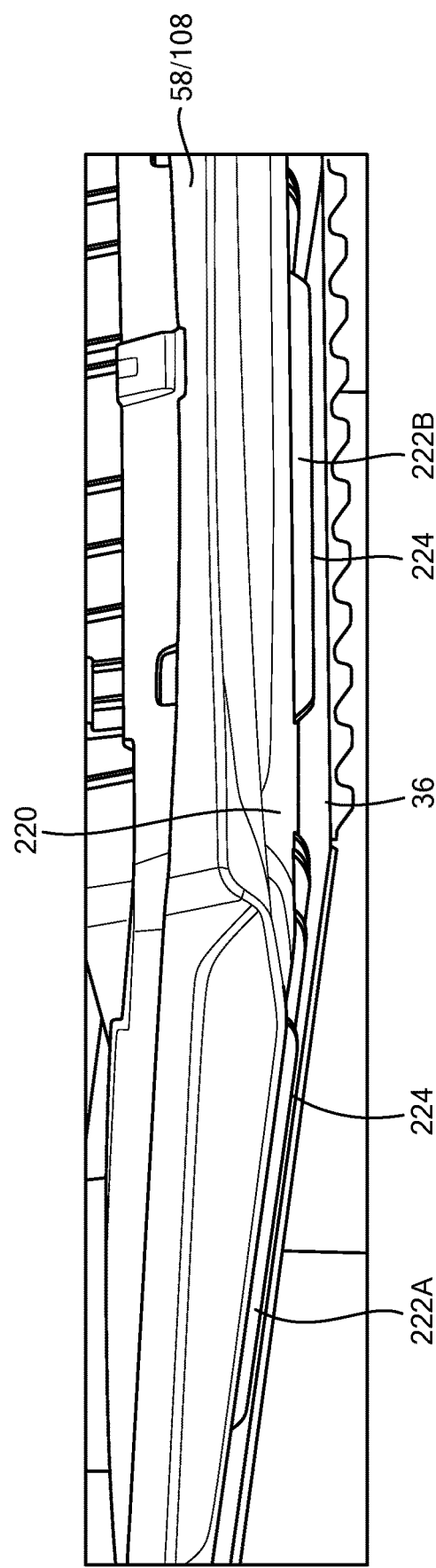
FIG. 38 shows a close-up view of the bottom surface of the reservoir of FIG. 37 in contact with a roof in accordance with the present disclosure.

Referring now to FIGS. 37 and 38, a bottom surface 220 of a reservoir 58/108 is shown. FIG. 37 shows the bottom surface 220 of the reservoir 58/108 that includes a plurality of ribs 222 and FIG. 38 shows an evaporative cooler 50/100 on a roof surface. The bottom surface 220 is the surface of the reservoir 58/108 that is closest to the roof 36 when the evaporative cooler 50/100 is installed on the roof 36. In one embodiment, the bottom surface 220 includes at least one elongate projection, referred to herein as at least one rib 222, having a linear, angular, curvilinear, or other shape. Each rib 222 has a first edge, a second edge opposite the first edge, and a height therebetween. In one embodiment, the first edge is coupled to or meets the bottom surface 200 of the reservoir 58/108 at the second edge is a free edge 224. Put another way, the free edge 224 of each rib 222 is located a distance, corresponding to the height, from the bottom surface 220 of the reservoir 58/108. When the evaporative cooler 50/100 is installed on a roof 36 of a building, the free edges of the ribs 222 are in contact with the roof 36 (and/or with surface features of the roof 36) and space the evaporative cooler 50/100 a distance from the roof 36 that is at least partially defined by the height of the ribs 222, or by the height of the rib(s) 222 having the largest height. Further, water, leaves, and other debris may pass freely along the roof 36 through the spaces between the ribs 222 and beneath the evaporative cooler 50/100. Thus, the evaporative cooler 50/100 does not prevent or impede normal flow of leaves and debris along the roof 36, which could otherwise result in damp spots on the roof where leaves and water gather. Further, the ribs 222 allow the evaporative cooler 50/100 to be mounted to the roof 36 at a consistent mounting height regardless of the roofing material(s) used.

In the exemplary configuration of ribs 222 shown in FIG. 37, at least two ribs 222A are located on opposite sides of a dropper aperture 225 in the reservoir 58/108 and parallel or at least substantially parallel to the sides 66C/116C and 66D/116D of the evaporative cooler 50/100. In one exemplary configuration, the bottom surface 220 further includes at least one rib 222B on opposite sides of the dropper aperture 225 and parallel or at least substantially parallel to the sides 66A/116A and 66B/116B of the evaporative cooler 50/100. In one embodiment, the ribs 222A, 222B are linear. In another embodiment, at least one rib 222B is bent or V-shaped. In one embodiment, at least one rib 222A is connected to, integrated with, or continues into at least one rib 222B. In one embodiment, the rib(s) 222 are removably attached to the bottom surface 220 of the reservoir 58/108, allowing the user to selectively remove one or more ribs 222 to accommodate irregularities in the roof surface while preserving a consistent mounting height. However, it will be understood that the bottom surface 220 may have any number and/or configuration of ribs 222 and that the ribs 222 may have any size and/or shape that allows the evaporative cooler 50/100 to be installed on a roof without impediment.

Figure 39:
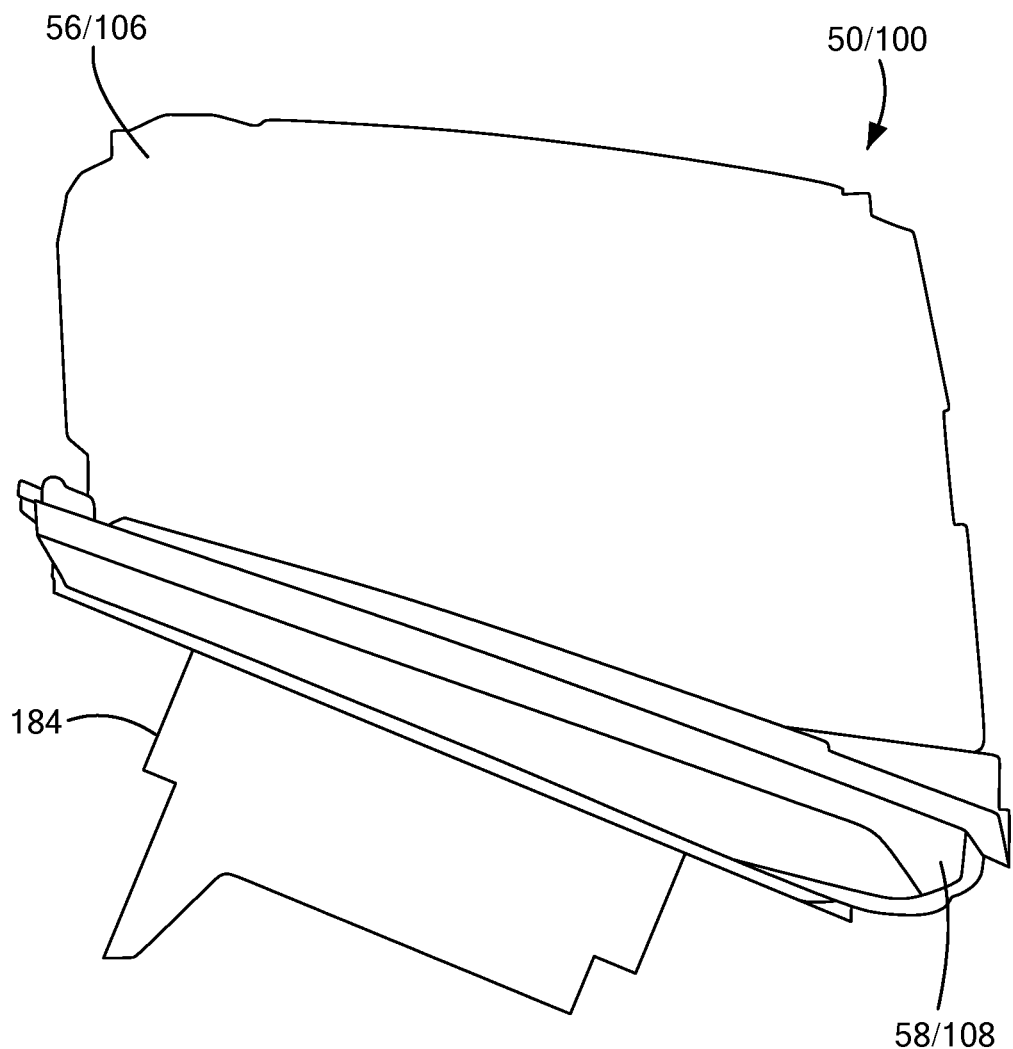
FIG. 39 shows a first step in a method of mounting an evaporative cooler to a roof in accordance with the present disclosure, wherein an evaporative cooler is attached to a dropper.
Figure 40:
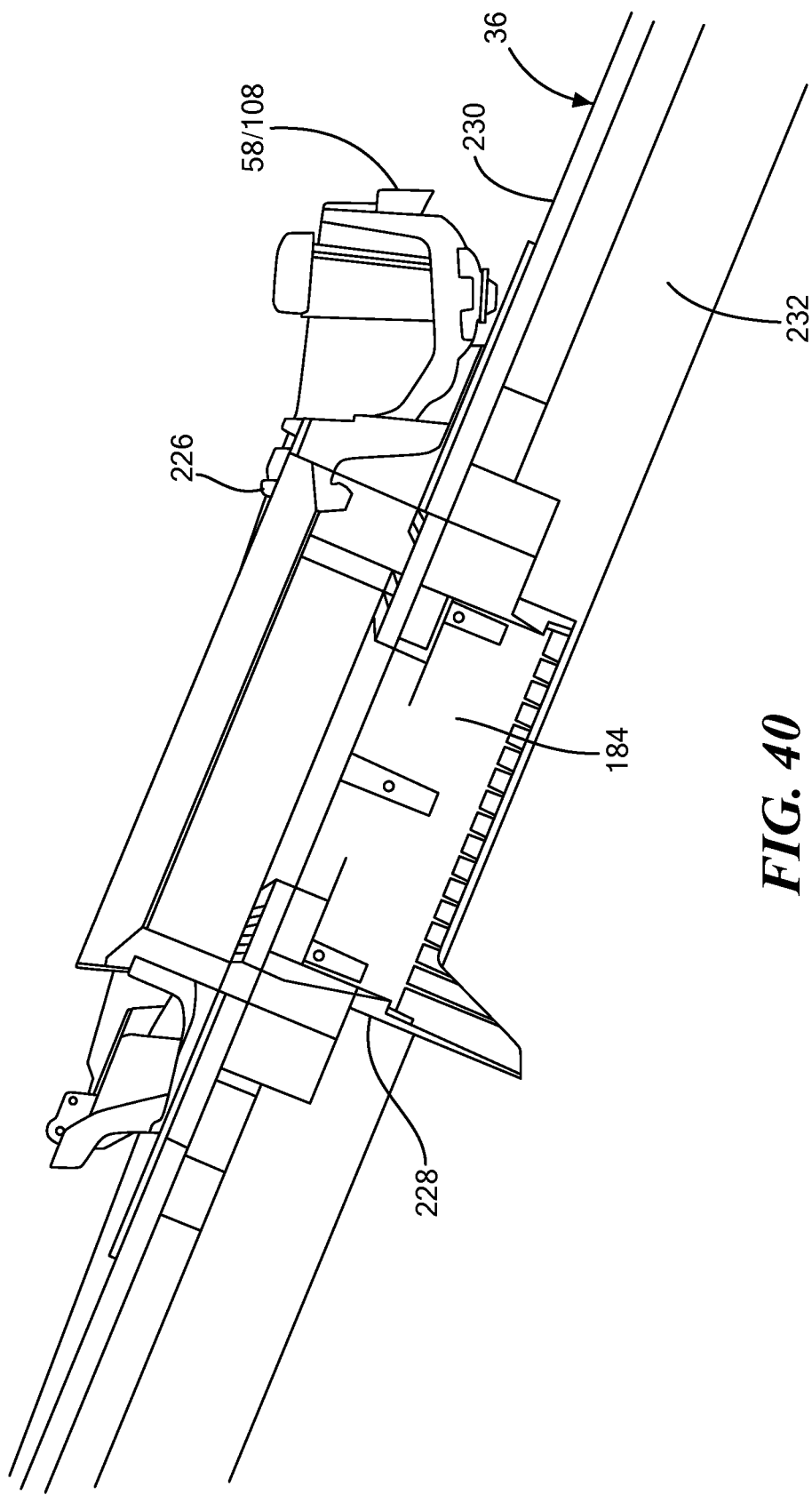
FIG. 40 shows a second step in a method of mounting an evaporative cooler to a roof in accordance with the present disclosure, wherein the dropper and a reservoir only (cross-sectional view shown) of the evaporative cooler are attached to a roof.
Figure 41:
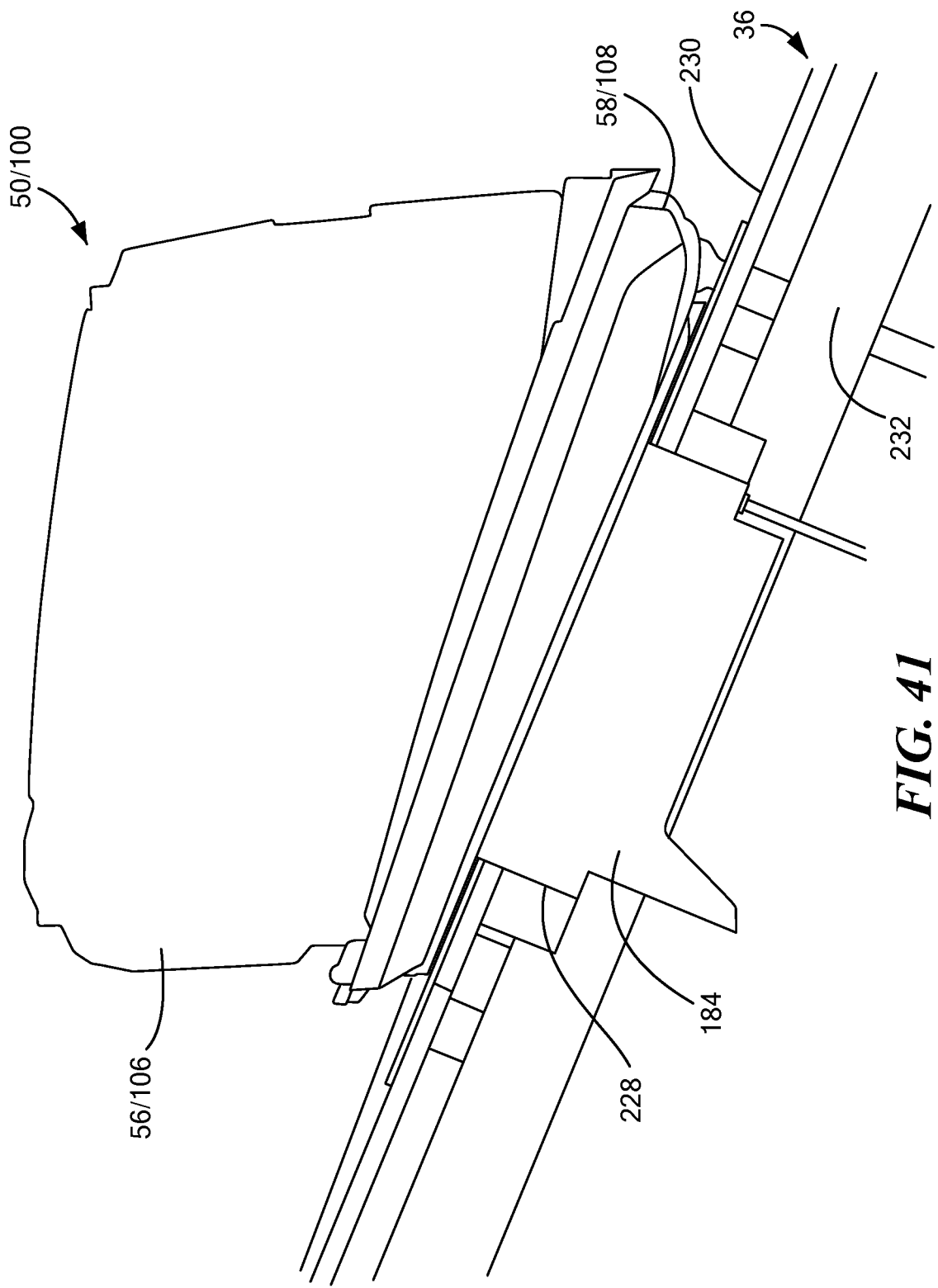
FIG. 41 shows a third step in a method of mounting an evaporative cooler to a roof in accordance with the present disclosure, wherein the evaporative cooler and dropper are attached to the roof.

Referring now to FIGS. 39-41, a method of mounting an evaporative cooler 50/100 to a roof 36 is shown. In one embodiment, the method generally includes coupling the dropper 184 to at least a portion of the evaporative cooler 50/100 before the dropper 184 is installed into the roof 36. This is in contrast to currently used methods, in which the evaporative cooler is attached to the dropper after the dropper is installed, and eliminates the need for levelling the dropper mounting after installation for attachment of the evaporative cooler. In a first step, as shown in FIG. 39, the dropper 184 is attached to the reservoir 58/108 of the evaporative cooler 50/100 using one or more attachment elements (such as the mounting elements 194 shown in FIG. 33) before the evaporative cooler 50/100 is installed on a roof 36. In one embodiment, the dropper 184 is removably or permanently attached to the reservoir 58/108 using a plurality of clips. However, it will be understood that other attachment elements may be used and/or methods such as friction fit, chemical or thermal bonding, adhesives, or the like. Alternatively, in another embodiment the dropper 184 and reservoir 58/108 are manufactured together as a single integrated piece. Although the dropper 184 is shown in FIG. 39 as being attached to an assembled evaporative cooler 50/100, it will be understood that the dropper 184 may be attached to the reservoir 58/108 before the reservoir 58/108 is attached to the lid 56/106.

In a second step, as shown in FIG. 40, the dropper 184, attached to the reservoir 58/108, is inserted into an installation hole or aperture 228 in the roof 36 until at least a portion of the reservoir 58/108 is brought into contact with the outer surface 230 of the roof 36. In one embodiment, the bottom surface 220 of the reservoir 58/108 includes one or more ribs 222 (such as those shown in FIGS. 37 and 38), and the dropper 184 is inserted into the installation aperture 228 until the free edge 224 of at least one rib 222 is brought into contact with the outer surface 230 of the roof 36. Once the reservoir 58/108 is sufficiently seated on the outer surface 230 of the roof 36, the dropper 184 is then secured to the roof structure or framework 232. In one non-limiting example, screws are used to couple the dropper 184 to the roof structure 232. Thus, unlike currently used methods of installing an evaporative cooler, the reservoir 58/108 is properly seated on the roof 36 before the dropper 184 is secured to the roof 36, which eliminates the need for the complicated and time-consuming task of levelling the dropper 184 so it is positioned such that the evaporative cooler, once attached to the dropper, will be properly seated on the roof.

In an optional step, the reservoir 58/108 is removed from the dropper 184 once the dropper 184 is secured to the roof structure 232, and weatherproof flashing, such as the weatherproof sealing assembly 200 shown in FIGS. 34-36, is installed in the dropper 184. If the reservoir 58/108 was removed, it is reattached to the dropper 184 prior to the third step. In the third step, as shown in FIG. 41, the lid 56/106 and other components of the evaporative cooler 50/100 are attached to the reservoir 58/108. Put another way, once the dropper 184 has been mounted to the roof 36, the evaporative cooler 50/100 is assembled such that it is attached to the dropper 184 and thereby secured to the roof 36.

EMBODIMENTS

In one embodiment, a pressurized water distribution system for an evaporative cooler comprises: a pressurized flow path portion including at least one pressurized water channel, a plurality of outlet holes, and at least one inlet hole; a plurality of caps, each of the plurality of caps being configured to direct a flow of fluid from a corresponding one of the plurality of outlet holes; and a non-pressurized flow path portion including at least one non-pressurized flow path in fluid communication with at least one of the plurality of outlet holes.

In one aspect of the embodiment, the pressurized water distribution system further comprises a water distribution system lid, the water distribution system lid at least partially defining the at least one pressurized water channel, the plurality of outlet holes, and the at least one inlet hole.

In one aspect of the embodiment, each of the plurality of caps is rotatably couplable to the water distribution system lid.

In one aspect of the embodiment, each of the plurality of caps includes a first hooked portion and a second hooked portion and the water distribution system lid includes a first post and a second post proximate each of the plurality of outlet holes, the first and second hooked portions being releasably engageable with the first and second posts. In one aspect of the embodiment, the first and second hooked portions are radially opposed to each other and the first and second posts are radially opposed to each other.

In one aspect of the embodiment, the at least one pressurized water channel includes a plurality of pressurized water channels, each of the plurality of pressurized water channels being in fluid communication with a corresponding one of the plurality of outlet holes, the water distribution system lid defining a plurality of non-pressurized gravity distribution water channels. In one aspect of the embodiment, each of the plurality of caps is configured to direct a flow of fluid from a corresponding one of the plurality of outlet holes into at least one of the plurality of non-pressurized gravity distribution water channels.

In one embodiment, a weatherproof sealing assembly for an evaporative cooler system comprises: at least one flap assembly, each of the at least one flap assembly being transitionable between a closed position, a first open position, and a second open position.

In one aspect of the embodiment, the at least one flap assembly is in the first open position when a flow of air therethrough is in a first direction and the at least one flap assembly is in the second open position when the flow of air therethrough is in a second direction opposite the first direction.

In one aspect of the embodiment, each of the at least one flap assembly includes: an axis of rotation; a frame portion; and a flap rotatably coupled to the fame portion, the frame portion and the flap being independently rotatable relative to each other and transitionable between the closed position, the first open position, and the second open position.

In one aspect of the embodiment, the at least one flap assembly includes a first flap assembly and a second flap assembly, the first flap assembly comprising a first frame portion, a first flap, and a first axis of rotation, and the second flap assembly comprising a second frame portion, a second flap, and a second axis of rotation. In one aspect of the embodiment: when the weatherproof sealing assembly is in the closed position, the first flap assembly and the second flap assembly are at least substantially coplanar; when the weatherproof sealing assembly is in the first open position, the first flap assembly and the second flap assembly are not coplanar, the first flap assembly being rotated about the first axis of rotation to open in a first direction relative to a plane in which the weatherproof sealing assembly lies when the weatherproof sealing assembly is in the closed position and the second flap assembly being rotated about the second axis of rotation to open in the first direction relative to the plane in which the weatherproof sealing assembly lies when the weatherproof sealing assembly is in the closed position; and when the weatherproof sealing assembly is in the second open position, the first frame portion and the second frame portion are at least substantially coplanar, the first flap being rotated to open toward a second direction opposite the first direction relative to the plane in which the weatherproof sealing assembly lies when the weatherproof sealing assembly is in the closed position, and the second flap being rotated to open toward the second direction relative to the plane in which the weatherproof sealing assembly lies when the weatherproof sealing assembly is in the closed position.

In one aspect of the embodiment, the first flap assembly further includes a first longitudinal axis and the second flap assembly further includes a second longitudinal axis, the first axis of rotation and the second axis of rotation being at least substantially parallel to each other and to the first longitudinal axis and to the second longitudinal axis.

In one aspect of the embodiment, the first flap at least partially defines a first edge of the first flap assembly and the second flap at least partially defines a first edge of the second flap assembly, the first edge of the first flap assembly being immediately adjacent the first edge of the second flap assembly when the weatherproof sealing assembly is in the closed position.

In one embodiment, a method of installing a cooling system on a roof of a building comprises: coupling a reservoir of the cooling system to a dropper; and then inserting the dropper into an installation aperture in the roof such that a bottom surface of the reservoir is in contact with an exterior surface of the roof.

In one aspect of the embodiment, the method further comprises securing at least a portion of the dropper to a structure of the roof. In one aspect of the embodiment, the method further comprises assembling the cooling system while the reservoir is coupled to the dropper and the dropper is secured to the structure of the roof.

In one embodiment, a reservoir for an evaporative cooler comprises: a bottom surface, the bottom surface including a dropper aperture and a plurality of ribs extending from the bottom surface at at least one location proximate the dropper aperture, each of the plurality of ribs having a free edge that is a distance from the bottom surface.

In one aspect of the embodiment, the plurality of ribs includes: a first plurality of ribs on opposite sides of the dropper aperture and extending in a first direction; and a second plurality of ribs on opposite sides of the dropper aperture and extending in a second direction that is different than the first direction.

In one embodiment, an evaporative cooler comprises: a housing including a top surface and at least one side surface; and a lid, the lid defining the top surface and the at least one side surface, the lid including a plurality of airflow apertures on the top surface.

In one aspect of the embodiment, the plurality of airflow apertures are arranged in a density of approximately 10 to approximately 15 airflow inlets per 6 in$^2$.

In one aspect of the embodiment, the housing further includes a reservoir, the lid being hingedly connected to the reservoir.

In one embodiment, an evaporative cooler mounted to a roof of a building comprises: a first surface having a first height; a second surface having a second height; a third surface extending between the first surface and the second surface, the third surface being at least substantially parallel to the roof, the third surface having a first width; and a fourth surface opposite the third surface and extending between the first surface and the second surface, the fourth surface having a second width that is different than the first width, the roof lying in a plane, the third surface being positioned a predetermined distance from the roof, the first surface being oriented at a first angle from the plane in which the roof lies and the second surface being oriented at a second angle from the plane in which the roof lies, the first angle and the second angle being different.

In one aspect of the embodiment, the first height is approximately 815 mm, the second height is approximately 475 mm, and the first width is approximately 1500 mm.

In one aspect of the embodiment, the first angle is approximately 60° and the second angle is approximately 102°.

In one aspect of the embodiment, the predetermined distance is between approximately 0 mm and approximately 50 mm. In one aspect of the embodiment, the predetermined distance is between approximately 5 mm and approximately 10 mm.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An evaporative cooler mounted to a roof of a building, the evaporative cooler comprising:
   a first surface having a first height;
   a second surface having a second height;
   a third surface extending between the first surface and the second surface, the third surface being at least substantially parallel to the roof, the third surface having a first width; and
   a fourth surface opposite the third surface and extending between the first surface and the second surface, the fourth surface having a second width that is different than the first width,
   the roof lying in a plane, the third surface being positioned a predetermined distance from the roof, the first surface being oriented at a first angle from the plane in which the roof lies and the second surface being oriented at a second angle from the plane in which the roof lies, the first angle and the second angle being different.

2. The evaporative cooler of claim 1, wherein the first height is approximately 815 mm, the second height is approximately 475 mm, and the first width is approximately 1500 mm.

3. The evaporative cooler of claim 2, wherein the first angle is approximately 60° and the second angle is approximately 102°.

4. The evaporative cooler of claim 1, wherein the predetermined distance is between approximately 0 mm and approximately 50 mm.

5. The evaporative cooler of claim 4, wherein the predetermined distance is between approximately 5 mm and approximately 10 mm.

* * * * *